US012435334B2

(12) United States Patent
Baram et al.

(10) Patent No.: US 12,435,334 B2
(45) **Date of Patent: *Oct. 7, 2025**

(54) DIFFERENTIAL KNOCKOUT OF AN ALLELE OF A HETEROZYGOUS ELANE GENE-II

(71) Applicant: EmendoBio Inc., Wilmington, DE (US)

(72) Inventors: David Baram, Tel Aviv (IL); Lior Izhar, Tel Aviv (IL); Asael Herman, Ness-Ziona (IL); Rafi Emmanuel, Ramla (IL); Michal Golan Mashiach, Ness-Ziona (IL); Joseph Georgeson, Rehovot (IL)

(73) Assignee: EmendoBio Inc., Wilmington, DE (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/090,804

(22) Filed: Nov. 5, 2020

(65) Prior Publication Data

US 2021/0155929 A1 May 27, 2021

Related U.S. Application Data

(60) Provisional application No. 62/931,641, filed on Nov. 6, 2019.

(51) Int. Cl.

*C12N 15/113* (2010.01)
*C12N 9/64* (2006.01)
*C12N 15/90* (2006.01)

(52) U.S. Cl.

CPC .......... *C12N 15/113* (2013.01); *C12N 9/6448* (2013.01); *C12N 15/90* (2013.01); *C12N 2310/20* (2017.05); *C12N 2800/80* (2013.01)

(58) Field of Classification Search

CPC .... C12N 15/113; C12N 9/6448; C12N 15/90; C12N 2310/20; C12N 2800/80; C12N 9/22; C12N 15/907; C12N 2320/34; C12N 15/1137

See application file for complete search history.

(56) References Cited

U.S. PATENT DOCUMENTS

| | | | |
|---|---|---|---|
| 2011/0023143 | A1 | 1/2011 | Weinstein et al. |
| 2018/0155688 | A1 | 6/2018 | Seet et al. |
| 2019/0024086 | A1 | 1/2019 | Lande et al. |
| 2021/0130804 | A1 | 5/2021 | Baram |
| 2021/0363547 | A1 | 11/2021 | Baram |
| 2022/0387515 | A1 | 12/2022 | Baram |

FOREIGN PATENT DOCUMENTS

| | | | |
|---|---|---|---|
| WO | WO 2018/085460 | A2 | 5/2018 |
| WO | WO 2019/217294 | A1 | 11/2019 |
| WO | WO 2020/112979 | A2 | 6/2020 |
| WO | WO 2023/281083 | A1 | 1/2023 |

OTHER PUBLICATIONS

Li et al. ("Battling CRISPR-Cas9 off-target genome editing." Cell Biology and Toxicology 35 (2019): 403-406).*
Shu et al. Characteristics of Severe Congenital Neutropenia Caused by Novel ELANE Gene Mutations. The Pediatric Infectious Disease Journal 34(2):p. 203-207, Feb. 2015.*
Yan et al. ("CRISPR-Cas12 and Cas13: the lesser known siblings of CRISPR-Cas9." Cell biology and toxicology 35 (2019): 489-492).*
International Search Report issued Mar. 31, 2021 in connection with PCT International Application No. PCT/US2020/059186.
Written Opinion (form PCT/ISA/237) issued Mar. 31, 2021 in connection with PCT International Application No. PCT/US2020/059186.
Arun et al., "Spectrum of ELANE mutations in congenital neutropenia; a single-centre study in patients of Indian origin." Journal of Clinical Pathology, Aug. 31, 2018, vol. 71, iss. 12, pp. 1046-1051.

* cited by examiner

*Primary Examiner* — Kimberly Chong
(74) *Attorney, Agent, or Firm* — Potomac Law Group, PLLC; Jamaica Potts Szeliga

(57) ABSTRACT

Methods for inactivating in a cell a mutant allele of the elastase, neutrophil expressed gene (ELANE gene) gene having a mutation associated with severe congenital neutropenia (SCN) or cyclic neutropenia (CyN) and which cell is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising introducing to the cell a composition comprising:
a CRISPR nuclease or a sequence encoding the CRISPR nuclease; and
a first RNA molecule comprising a guide sequence portion having 17-30 nucleotides,
wherein a complex of the CRISPR nuclease and the first RNA molecule affects a double strand break in the mutant allele of the ELANE gene the method optionally further comprising introduction of a second RNA molecule comprising a guide sequence portion capable of complexing with a CRISPR nuclease, wherein the complex of the second RNA molecule and CRISPR nuclease affects a second double strand break in the ELANE gene.

7 Claims, 5 Drawing Sheets

Specification includes a Sequence Listing.

| RSID | Heterozygous Frequency |
|---|---|
| rs10414837 | 33% |
| rs3761005 | 46% |
| rs1683564 | 42% |

SEQUENCE LISTING

```
<160> NUMBER OF SEQ ID NOS: 448

<210> SEQ ID NO 1
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 1

aacuccugcc cugccuaccc                                                    20


<210> SEQ ID NO 2
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 2

aggaggggua ggcagggcag                                                    20


<210> SEQ ID NO 3
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 3

aggcagggca ggaguucccu                                                    20


<210> SEQ ID NO 4
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 4

cuaccaggga acuccugccc                                                    20


<210> SEQ ID NO 5
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 5

gaacuccugc ccugccuacc                                                    20


<210> SEQ ID NO 6
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 6
```

gagggguagg cagggcagga 20

<210> SEQ ID NO 7
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 7
gcagggcagg aguucccugg 20

<210> SEQ ID NO 8
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 8
ggaacuccug cccugccuac 20

<210> SEQ ID NO 9
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 9
ggcagggcag gaguucccug 20

<210> SEQ ID NO 10
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 10
uaccagggaa cuccugcccu 20

<210> SEQ ID NO 11
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 11
ucuaccaggg aacuccugcc 20

<210> SEQ ID NO 12
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 12
accagggagc uccugcccug 20

<210> SEQ ID NO 13
<211> LENGTH: 20
<212> TYPE: RNA

<213> ORGANISM: Artificial Sequence
<220> FEATURE:
<223> OTHER INFORMATION: ELANE RNA guide

<400> SEQUENCE: 13
aggcagggca ggagcucccu 20

<210> SEQ ID NO 14
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 14
agggcaggag cucccuggua 20

<210> SEQ ID NO 15
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 15
cagggcagga gcucccuggu 20

<210> SEQ ID NO 16
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 16
ccagggagcu ccugcccugc 20

<210> SEQ ID NO 17
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 17
cuaccaggga gcuccugccc 20

<210> SEQ ID NO 18
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 18
cuucuaccag ggagcuccug 20

<210> SEQ ID NO 19
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 19
gagcuccugc ccugccuacc 20

<210> SEQ ID NO 20
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 20
gcagggcagg agcucccugg 20

<210> SEQ ID NO 21
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 21
ggcagggcag gagcucccug 20

<210> SEQ ID NO 22
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 22
guaggcaggg caggagcucc 20

<210> SEQ ID NO 23
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 23
uaccagggag cuccugcccu 20

<210> SEQ ID NO 24
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 24
uaggcagggc aggagcuccc 20

<210> SEQ ID NO 25
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 25
ucuaccaggg agcuccugcc 20

<210> SEQ ID NO 26
<211> LENGTH: 20
<212> TYPE: RNA
<213> ORGANISM: Artificial Sequence
<220> FEATURE:

```
<223> OTHER INFORMATION: ELANE RNA guide

<400> SEQUENCE: 26

uucuaccagg gagcuccugc                                                20


<210> SEQ ID NO 27
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 27

ccacaggcac agaccaccac                                                20


<210> SEQ ID NO 28
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 28

gggcguggug gucugugccu                                                20


<210> SEQ ID NO 29
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 29

ccugcuguga ccauaacacc                                                20


<210> SEQ ID NO 30
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 30

cugcugugac cauaacaccc                                                20


<210> SEQ ID NO 31
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 31

ucuacaccug cugugaccau                                                20


<210> SEQ ID NO 32
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 32

uguuaugguc acagcaggug                                                20
```

<210> SEQ ID NO 33
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 33
accagcucuc aaagcaacac 20

<210> SEQ ID NO 34
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 34
agcucucaaa gcaacacuuu 20

<210> SEQ ID NO 35
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 35
aauucccaac cucaggugau 20

<210> SEQ ID NO 36
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 36
auucccaacc ucaggugaua 20

<210> SEQ ID NO 37
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 37
gaauucccaa ccucagguga 20

<210> SEQ ID NO 38
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 38
ggaauuccca accucaggug 20

<210> SEQ ID NO 39
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 39 gggugguauca ccugagguug 20

<210> SEQ ID NO 40
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 40
gguguaucac cugagguugg 20

<210> SEQ ID NO 41
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 41
guaucaccug agguugggaa 20

<210> SEQ ID NO 42
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 42
guguaucacc ugagguuggg 20

<210> SEQ ID NO 43
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 43
uggaauuccc aaccucaggu 20

<210> SEQ ID NO 44
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 44
uguaucaccu gagguuggga 20

<210> SEQ ID NO 45
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 45
uucccaaccu caggugauac 20

<210> SEQ ID NO 46
<211> LENGTH: 20

<212> TYPE: RNA
<213> ORGANISM: Artificial Sequence
<220> FEATURE:
<223> OTHER INFORMATION: ELANE RNA guide

<400> SEQUENCE: 46
cgcuguaucu uuggaagggg 20

<210> SEQ ID NO 47
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 47
ccugggccag gcuggagucc 20

<210> SEQ ID NO 48
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 48
gucaggacuc cagccuggcc 20

<210> SEQ ID NO 49
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 49
aggcuggagu cuugacguga 20

<210> SEQ ID NO 50
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 50
caagacucca gccuggccca 20

<210> SEQ ID NO 51
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 51
ccugggccag gcuggagucu 20

<210> SEQ ID NO 52
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 52
gucaagacuc cagccuggcc 20

<210> SEQ ID NO 53
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 53
guggucacgu caagacucca 20

<210> SEQ ID NO 54
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 54
ucaagacucc agccuggccc 20

<210> SEQ ID NO 55
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 55
ucccccacga uguuccagcu 20

<210> SEQ ID NO 56
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 56
augguggggg agaugggaag 20

<210> SEQ ID NO 57
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 57
cauggugggg gagaugggaa 20

<210> SEQ ID NO 58
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 58
cuucccaucu cccccaccau 20

<210> SEQ ID NO 59
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 59
gaacauggug ggggagaugg 20

<210> SEQ ID NO 60
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 60
ucccccacca uguuccagcu 20

<210> SEQ ID NO 61
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 61
ugguggggga gaugggaaga 20

<210> SEQ ID NO 62
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 62
uugcagcugg aacauggugg 20

<210> SEQ ID NO 63
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 63
ccuuucccgc agcugggacu 20

<210> SEQ ID NO 64
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 64
acacagcugc auguggccgg 20

<210> SEQ ID NO 65
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 65
acagcugcau guggccggua 20

<210> SEQ ID NO 66
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 66
acccagggcc cugugcuacc 20

<210> SEQ ID NO 67
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 67
agcacagggc ccuggguaaa 20

<210> SEQ ID NO 68
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 68
agcugcaugu ggccgguagc 20

<210> SEQ ID NO 69
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 69
agggcccugu gcuaccggcc 20

<210> SEQ ID NO 70
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 70
aguuuaccca gggcccugug 20

<210> SEQ ID NO 71
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 71
auguggccgg uagcacaggg 20

<210> SEQ ID NO 72
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 72
cacagcugca uguggccggu 20

<210> SEQ ID NO 73
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 73
cagcugcaug uggccgguag 20

<210> SEQ ID NO 74
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 74
cagggcccug ugcuaccggc 20

<210> SEQ ID NO 75
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 75
caguuuaccc agggcccugu 20

<210> SEQ ID NO 76
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 76
cauguggccg guagcacagg 20

<210> SEQ ID NO 77
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 77
ccagggcccu gugcuaccgg 20

<210> SEQ ID NO 78
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 78
cccagggccc ugugcuaccg 20

<210> SEQ ID NO 79

<211> LENGTH: 20
<212> TYPE: RNA
<213> ORGANISM: Artificial Sequence
<220> FEATURE:
<223> OTHER INFORMATION: ELANE RNA guide

<400> SEQUENCE: 79
cccugugcua ccggccacau 20

<210> SEQ ID NO 80
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 80
ccgguagcac agggcccugg 20

<210> SEQ ID NO 81
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 81
ccugugcuac cggccacaug 20

<210> SEQ ID NO 82
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 82
cgguagcaca gggcccuggg 20

<210> SEQ ID NO 83
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 83
cucaguuuac ccagggcccu 20

<210> SEQ ID NO 84
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 84
cugcaugugg ccgguagcac 20

<210> SEQ ID NO 85
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 85
cugugcuacc ggccacaugc 20

<210> SEQ ID NO 86
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 86
gacacagcug cauguggccg 20

<210> SEQ ID NO 87
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 87
gcauguggcc gguagcacag 20

<210> SEQ ID NO 88
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 88
gcccugugcu accggccaca 20

<210> SEQ ID NO 89
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 89
gccgguagca cagggcccug 20

<210> SEQ ID NO 90
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 90
gcuaccggcc acaugcagcu 20

<210> SEQ ID NO 91
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 91
gcugcaugug gccgguagca 20

<210> SEQ ID NO 92
<211> LENGTH: 20
<212> TYPE: RNA

<213> ORGANISM: Artificial Sequence
<220> FEATURE:
<223> OTHER INFORMATION: ELANE RNA guide

<400> SEQUENCE: 92
ggcccugugc uaccggccac 20

<210> SEQ ID NO 93
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 93
ggccgguagc acagggcccu 20

<210> SEQ ID NO 94
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 94
gggcccugug cuaccggcca 20

<210> SEQ ID NO 95
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 95
gguagcacag ggcccugggu 20

<210> SEQ ID NO 96
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 96
guagcacagg gcccugggua 20

<210> SEQ ID NO 97
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 97
gugcuaccgg ccacaugcag 20

<210> SEQ ID NO 98
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 98
guggccggua gcacagggcc 20

<210> SEQ ID NO 99
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 99
guuuacccag ggcccugugc 20

<210> SEQ ID NO 100
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 100
uacccagggc ccugugcuac 20

<210> SEQ ID NO 101
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 101
uagcacaggg cccuggguaa 20

<210> SEQ ID NO 102
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 102
ucaguuuacc cagggcccug 20

<210> SEQ ID NO 103
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 103
ugcauguggc cgguagcaca 20

<210> SEQ ID NO 104
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 104
ugcuaccggc cacaugcagc 20

<210> SEQ ID NO 105
<211> LENGTH: 20
<212> TYPE: RNA
<213> ORGANISM: Artificial Sequence
<220> FEATURE:

<223> OTHER INFORMATION: ELANE RNA guide

<400> SEQUENCE: 105
uggccgguag cacagggccc 20

<210> SEQ ID NO 106
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 106
ugugcuaccg gccacaugca 20

<210> SEQ ID NO 107
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 107
uguggccggu agcacagggc 20

<210> SEQ ID NO 108
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 108
uuacccaggg cccugugcua 20

<210> SEQ ID NO 109
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 109
uuuacccagg gcccugugcu 20

<210> SEQ ID NO 110
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 110
acccagggcc ccgugauacc 20

<210> SEQ ID NO 111
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 111
acggggcccu ggguaaacug 20

<210> SEQ ID NO 112
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 112
aguuuaccca gggccccgug 20

<210> SEQ ID NO 113
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 113
aucacggggc ccuggguaaa 20

<210> SEQ ID NO 114
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 114
cacggggccc uggguaaacu 20

<210> SEQ ID NO 115
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 115
caguuuaccc agggccccgu 20

<210> SEQ ID NO 116
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 116
cccagggccc cgugauaccg 20

<210> SEQ ID NO 117
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 117
ccgguaucac ggggcccugg 20

<210> SEQ ID NO 118
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 118
ccucaguuua cccagggccc 20

<210> SEQ ID NO 119
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 119
cggggcccug gguaaacuga 20

<210> SEQ ID NO 120
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 120
cgguaucacg gggcccuggg 20

<210> SEQ ID NO 121
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 121
cucaguuuac ccagggcccc 20

<210> SEQ ID NO 122
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 122
cugccucagu uuacccaggg 20

<210> SEQ ID NO 123
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 123
gccgguauca cggggcccug 20

<210> SEQ ID NO 124
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 124
gccucaguuu acccagggcc 20

<210> SEQ ID NO 125
<211> LENGTH: 20

<212> TYPE: RNA
<213> ORGANISM: Artificial Sequence
<220> FEATURE:
<223> OTHER INFORMATION: ELANE RNA guide

<400> SEQUENCE: 125
ggccgguauc acggggcccu 20

<210> SEQ ID NO 126
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 126
gguaucacgg ggcccugggu 20

<210> SEQ ID NO 127
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 127
guaucacggg gcccugggua 20

<210> SEQ ID NO 128
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 128
guuuacccag ggccccguga 20

<210> SEQ ID NO 129
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 129
uacccagggc cccgugauac 20

<210> SEQ ID NO 130
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 130
uaucacgggg cccuggguaa 20

<210> SEQ ID NO 131
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 131
ucacggggcc cuggguaaac 20

<210> SEQ ID NO 132
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 132
ucaguuuacc cagggccccg 20

<210> SEQ ID NO 133
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 133
ugccucaguu uacccagggc 20

<210> SEQ ID NO 134
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 134
uggccgguau cacggggccc 20

<210> SEQ ID NO 135
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 135
uuacccaggg ccccgugaua 20

<210> SEQ ID NO 136
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 136
uuuacccagg gccccgugau 20

<210> SEQ ID NO 137
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 137
gacauuugaa ugcgauugug 20

<210> SEQ ID NO 138
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 138 aguuggggguu ugaaaaccgg 20

<210> SEQ ID NO 139
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 139
ccccccuccc cgguuuucaa 20

<210> SEQ ID NO 140
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 140
cccccucccc gguuuucaaa 20

<210> SEQ ID NO 141
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 141
ccccuccccg guuuucaaac 20

<210> SEQ ID NO 142
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 142
cccuccccgg uuuucaaacc 20

<210> SEQ ID NO 143
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 143
ccuccccggu uuucaaaccc 20

<210> SEQ ID NO 144
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 144
cuccccgguu uucaaacccc 20

<210> SEQ ID NO 145
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 145
gaguuggggu uugaaaaccg 20

<210> SEQ ID NO 146
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 146 ggggguuugaa aaccggggag 20

<210> SEQ ID NO 147
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 147
ggguuugaaa accggggagg 20

<210> SEQ ID NO 148
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 148
gguuugaaaa ccggggaggg 20

<210> SEQ ID NO 149
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 149 guuggggguuu gaaaaccggg 20

<210> SEQ ID NO 150
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 150
guuugaaaac cggggagggg 20

<210> SEQ ID NO 151
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 151 uggggguuuga aaaccgggga 20

<210> SEQ ID NO 152
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 152
uugaaaaccg gggagggggg 20

<210> SEQ ID NO 153
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 153 uuggggguuug aaaaccgggg 20

<210> SEQ ID NO 154
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 154
uuugaaaacc ggggaggggg 20

<210> SEQ ID NO 155
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 155
agggcgaccu gcgacccccc 20

<210> SEQ ID NO 156
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 156
cccccggguu uucaaacccc 20

<210> SEQ ID NO 157
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 157
gggguuugaa aaccgggggg 20

<210> SEQ ID NO 158

<211> LENGTH: 20
<212> TYPE: RNA
<213> ORGANISM: Artificial Sequence
<220> FEATURE:
<223> OTHER INFORMATION: ELANE RNA guide

<400> SEQUENCE: 158 uggggguuuga aaaccggggg 20

<210> SEQ ID NO 159
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 159
aacccagagg gcgaccugcg 20

<210> SEQ ID NO 160
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 160
acccagaggg cgaccugcga 20

<210> SEQ ID NO 161
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 161
agagggcgac cugcgacccc 20

<210> SEQ ID NO 162
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 162
cagagggcga ccugcgaccc 20

<210> SEQ ID NO 163
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 163
ccagagggcg accugcgacc 20

<210> SEQ ID NO 164
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 164
cccagagggc gaccugcgac 20

<210> SEQ ID NO 165
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 165
gaacccagag ggcgaccugc 20

<210> SEQ ID NO 166
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 166
gagggcgacc ugcgaccccc 20

<210> SEQ ID NO 167
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 167
ggggggucgc aggucgcccu 20

<210> SEQ ID NO 168
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 168
gggggucgca ggucgcccuc 20

<210> SEQ ID NO 169
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 169
ggggucgcag gucgcccucu 20

<210> SEQ ID NO 170
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 170
gggucgcagg ucgcccucug 20

<210> SEQ ID NO 171
<211> LENGTH: 20
<212> TYPE: RNA

<213> ORGANISM: Artificial Sequence
<220> FEATURE:
<223> OTHER INFORMATION: ELANE RNA guide

<400> SEQUENCE: 171
ggucgcaggu cgcccucugg 20

<210> SEQ ID NO 172
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 172
gucgcagguc gcccucuggg 20

<210> SEQ ID NO 173
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 173
ugaacccaga gggcgaccug 20

<210> SEQ ID NO 174
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 174
uugaacccag agggcgaccu 20

<210> SEQ ID NO 175
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 175
acccagaggg cgaccugcgc 20

<210> SEQ ID NO 176
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 176
agagggcgac cugcgccccc 20

<210> SEQ ID NO 177
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 177
cagagggcga ccugcgcccc 20

<210> SEQ ID NO 178
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 178
ccagagggcg accugcgccc 20

<210> SEQ ID NO 179
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 179
cccagagggc gaccugcgcc 20

<210> SEQ ID NO 180
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 180
ggcgcagguc gcccucuggg 20

<210> SEQ ID NO 181
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 181
gggcgcaggu cgcccucugg 20

<210> SEQ ID NO 182
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 182
ggggcgcagg ucgcccucug 20

<210> SEQ ID NO 183
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 183
gggggcgcag gucgcccucu 20

<210> SEQ ID NO 184
<211> LENGTH: 20
<212> TYPE: RNA
<213> ORGANISM: Artificial Sequence
<220> FEATURE:

<223> OTHER INFORMATION: ELANE RNA guide

<400> SEQUENCE: 184
agccccaugu cuacaaaaau 20

<210> SEQ ID NO 185
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 185
gccccauguc uacaaaaaua 20

<210> SEQ ID NO 186
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 186
accgcaccug gcaauuuuuu 20

<210> SEQ ID NO 187
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 187
caccgcaccu ggcaauuuuu 20

<210> SEQ ID NO 188
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 188
aggggcugcc ggaguccccc 20

<210> SEQ ID NO 189
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 189
agggggacuc cggcagcccc 20

<210> SEQ ID NO 190
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 190
cagggggacu ccggcagccc 20

<210> SEQ ID NO 191
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 191
gggcugccgg agucccccug 20

<210> SEQ ID NO 192
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 192
ggggcugccg gaguccccu 20

<210> SEQ ID NO 193
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 193
gggggacucc ggcagccccu 20

<210> SEQ ID NO 194
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 194
ugccggaguc ccccugugga 20

<210> SEQ ID NO 195
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 195
ugccuccaca gggggacucc 20

<210> SEQ ID NO 196
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 196
aaggggcugc cugagucccc 20

<210> SEQ ID NO 197
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 197
acagggggac ucaggcagcc 20

<210> SEQ ID NO 198
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 198
acucaggcag ccccuugguc 20

<210> SEQ ID NO 199
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 199
agaccaaggg gcugccugag 20

<210> SEQ ID NO 200
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 200
aggggcugcc ugaguccccc 20

<210> SEQ ID NO 201
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 201
agggggacuc aggcagcccc 20

<210> SEQ ID NO 202
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 202
caaggggcug ccugaguccc 20

<210> SEQ ID NO 203
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 203
cacaggggga cucaggcagc 20

<210> SEQ ID NO 204
<211> LENGTH: 20

<212> TYPE: RNA
<213> ORGANISM: Artificial Sequence
<220> FEATURE:
<223> OTHER INFORMATION: ELANE RNA guide

<400> SEQUENCE: 204
caggcagccc cuuggucugc 20

<210> SEQ ID NO 205
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 205
cagggggacu caggcagccc 20

<210> SEQ ID NO 206
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 206
ccaaggggcu gccugagucc 20

<210> SEQ ID NO 207
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 207
ccacaggggg acucaggcag 20

<210> SEQ ID NO 208
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 208
cucaggcagc cccuuggucu 20

<210> SEQ ID NO 209
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 209
cuccacaggg ggacucaggc 20

<210> SEQ ID NO 210
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 210
gaccaagggg cugccugagu 20

<210> SEQ ID NO 211
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 211
gacucaggca gccccuuggu 20

<210> SEQ ID NO 212
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 212
gcagaccaag gggcugccug 20

<210> SEQ ID NO 213
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 213
ggcugccuga gucccccugu 20

<210> SEQ ID NO 214
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 214
gggacucagg cagccccuug 20

<210> SEQ ID NO 215
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 215
gggcugccug agucccccug 20

<210> SEQ ID NO 216
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 216
ggggacucag gcagccccuu 20

<210> SEQ ID NO 217
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 217
ggggcugccu gagucccccu 20

<210> SEQ ID NO 218
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 218
ucaggcagcc ccuuggucug 20

<210> SEQ ID NO 219
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 219
uccacagggg gacucaggca 20

<210> SEQ ID NO 220
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 220
ugcagaccaa ggggcugccu 20

<210> SEQ ID NO 221
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 221
ugccuccaca gggggacuca 20

<210> SEQ ID NO 222
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 222
ugccugaguc ccccugugga 20

<210> SEQ ID NO 223
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 223
aaacccccgc uccauuaaaa 20

<210> SEQ ID NO 224
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 224
acauggcaaa acccccgcuc 20

<210> SEQ ID NO 225
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 225
auggcaaaac ccccgcucca 20

<210> SEQ ID NO 226
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 226
cauggcaaaa cccccgcucc 20

<210> SEQ ID NO 227
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 227
uaauggagcg gggguuuugc 20

<210> SEQ ID NO 228
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 228
uggcaaaacc cccgcuccau 20

<210> SEQ ID NO 229
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 229
uuaauggagc gggggguuuug 20

<210> SEQ ID NO 230
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 230
uuuaauggag cgggggguuuu 20

<210> SEQ ID NO 231
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 231
aagccuggcc caguggcuua 20

<210> SEQ ID NO 232
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 232
agccuggccc aguggcuuac 20

<210> SEQ ID NO 233
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 233
aggcguaagc cacugggcca 20

<210> SEQ ID NO 234
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 234
auugcaggcg uaagccacug 20

<210> SEQ ID NO 235
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 235
caagccuggc ccaguggcuu 20

<210> SEQ ID NO 236
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 236
caggcguaag ccacugggcc 20

<210> SEQ ID NO 237

<211> LENGTH: 20
<212> TYPE: RNA
<213> ORGANISM: Artificial Sequence
<220> FEATURE:
<223> OTHER INFORMATION: ELANE RNA guide

<400> SEQUENCE: 237
ccuggcccag uggcuuacgc 20

<210> SEQ ID NO 238
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 238
cuggcccagu ggcuuacgcc 20

<210> SEQ ID NO 239
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 239
gauugcaggc guaagccacu 20

<210> SEQ ID NO 240
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 240
gcaggcguaa gccacugggc 20

<210> SEQ ID NO 241
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 241
gcccaguggc uuacgccugc 20

<210> SEQ ID NO 242
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 242
gccuggccca guggcuuacg 20

<210> SEQ ID NO 243
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 243
ggcccagugg cuuacgccug 20

<210> SEQ ID NO 244
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 244
ggcguaagcc acugggccag 20

<210> SEQ ID NO 245
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 245
ugcaggcgua agccacuggg 20

<210> SEQ ID NO 246
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 246
uggcccagug gcuuacgccu 20

<210> SEQ ID NO 247
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 247
uugcaggcgu aagccacugg 20

<210> SEQ ID NO 248
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 248
agacguaagc cacugggcca 20

<210> SEQ ID NO 249
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 249
auugcagacg uaagccacug 20

<210> SEQ ID NO 250
<211> LENGTH: 20
<212> TYPE: RNA

<213> ORGANISM: Artificial Sequence
<220> FEATURE:
<223> OTHER INFORMATION: ELANE RNA guide

<400> SEQUENCE: 250
cagacguaag ccacugggcc 20

<210> SEQ ID NO 251
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 251
ccaguggcuu acgucugcaa 20

<210> SEQ ID NO 252
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 252
cccaguggcu uacgucugca 20

<210> SEQ ID NO 253
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 253
ccuggcccag uggcuuacgu 20

<210> SEQ ID NO 254
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 254
cuggcccagu ggcuuacguc 20

<210> SEQ ID NO 255
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 255
gacguaagcc acugggccag 20

<210> SEQ ID NO 256
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 256
gauugcagac guaagccacu 20

<210> SEQ ID NO 257
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 257
gcagacguaa gccacugggc 20

<210> SEQ ID NO 258
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 258
gcccaguggc uuacgucugc 20

<210> SEQ ID NO 259
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 259
ggauugcaga cguaagccac 20

<210> SEQ ID NO 260
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 260
ggcccagugg cuuacgucug 20

<210> SEQ ID NO 261
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 261
gggauugcag acguaagcca 20

<210> SEQ ID NO 262
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 262
ugcagacgua agccacuggg 20

<210> SEQ ID NO 263
<211> LENGTH: 20
<212> TYPE: RNA
<213> ORGANISM: Artificial Sequence
<220> FEATURE:

<223> OTHER INFORMATION: ELANE RNA guide

<400> SEQUENCE: 263
uggcccagug gcuuacgucu 20

<210> SEQ ID NO 264
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 264
uugcagacgu aagccacugg 20

<210> SEQ ID NO 265
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 265
gcagacuagu cuugaacucc 20

<210> SEQ ID NO 266
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 266
acuagucuug aacucccgau 20

<210> SEQ ID NO 267
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 267
agacuagucu ugaacucccg 20

<210> SEQ ID NO 268
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 268
agaucgggag uucaagacua 20

<210> SEQ ID NO 269
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 269
cagacuaguc uugaacuccc 20

<210> SEQ ID NO 270
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 270
gacuagucuu gaacucccga 20

<210> SEQ ID NO 271
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 271
gagaucggga guucaagacu 20

<210> SEQ ID NO 272
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 272
gaucgggagu ucaagacuag 20

<210> SEQ ID NO 273
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 273
ugagaucggg aguucaagac 20

<210> SEQ ID NO 274
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 274
ccgccugccu gggccuccca 20

<210> SEQ ID NO 275
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 275
cgccugccug ggccucccaa 20

<210> SEQ ID NO 276
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 276
cucuuuggga ggcccaggca 20

<210> SEQ ID NO 277
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 277
acgacagagc aagacucugu 20

<210> SEQ ID NO 278
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 278
gacgacagag caagacucug 20

<210> SEQ ID NO 279
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 279
ugcgacagag ucuugcucug 20

<210> SEQ ID NO 280
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 280
ugauccaugg ugaagagaaa 20

<210> SEQ ID NO 281
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 281
auggugaaga gaaaagcagg 20

<210> SEQ ID NO 282
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 282
cauggugaag agaaaagcag 20

<210> SEQ ID NO 283
<211> LENGTH: 20

<212> TYPE: RNA
<213> ORGANISM: Artificial Sequence
<220> FEATURE:
<223> OTHER INFORMATION: ELANE RNA guide

<400> SEQUENCE: 283
cccccugcuu uucucuucac 20

<210> SEQ ID NO 284
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 284
gaagagaaaa gcagggggaa 20

<210> SEQ ID NO 285
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 285
gagguucccc cugcuuuucu 20

<210> SEQ ID NO 286
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 286
ggugaagaga aaagcagggg 20

<210> SEQ ID NO 287
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 287
guucccccug cuuuucucuu 20

<210> SEQ ID NO 288
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 288
ucccccugcu uuucucuuca 20

<210> SEQ ID NO 289
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 289 gucccgcac cauggauuaa 20

<210> SEQ ID NO 290
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 290
ugcauuaauc cauggugcgg 20

<210> SEQ ID NO 291
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 291
aauccauggu gcagggacca 20

<210> SEQ ID NO 292
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 292
cuucuggucc cugcaccaug 20

<210> SEQ ID NO 293
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 293
uaauccaugg ugcagggacc 20

<210> SEQ ID NO 294
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 294 uucuggucccc ugcaccaugg 20

<210> SEQ ID NO 295
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 295
aucaagccac accugaaggc 20

<210> SEQ ID NO 296
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 296
gaucaagcca caccugaagg 20

<210> SEQ ID NO 297
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 297
ggaucaagcc acaccugaag 20

<210> SEQ ID NO 298
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 298
guccgccuuc aggugugg cu 20

<210> SEQ ID NO 299
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 299
uccgccuuca ggugugg cuu 20

<210> SEQ ID NO 300
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 300
aaaguucagg gaugccgccu 20

<210> SEQ ID NO 301
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 301
aagccacacc ugaaggcggc 20

<210> SEQ ID NO 302
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 302
aaggcggcau cccugaacuu 20

<210> SEQ ID NO 303
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 303
aaguucaggg augccgccuu 20

<210> SEQ ID NO 304
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 304
acaccugaag gcggcauccc 20

<210> SEQ ID NO 305
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 305
accugaaggc ggcaucccug 20

<210> SEQ ID NO 306
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 306
agccacaccu gaaggcggca 20

<210> SEQ ID NO 307
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 307
aggcggcauc ccugaacuuu 20

<210> SEQ ID NO 308
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 308
agggaugccg ccuucaggug 20

<210> SEQ ID NO 309
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 309
aguucaggga ugccgccuuc 20

<210> SEQ ID NO 310
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 310
auggaaaguu cagggaugcc 20

<210> SEQ ID NO 311
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 311
cacaccugaa ggcggcaucc 20

<210> SEQ ID NO 312
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 312
caccugaagg cggcaucccu 20

<210> SEQ ID NO 313
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 313
cagggaugcc gccuucaggu 20

<210> SEQ ID NO 314
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 314
ccacaccuga aggcggcauc 20

<210> SEQ ID NO 315
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 315
ccugaaggcg gcaucccuga 20

<210> SEQ ID NO 316

<211> LENGTH: 20
<212> TYPE: RNA
<213> ORGANISM: Artificial Sequence
<220> FEATURE:
<223> OTHER INFORMATION: ELANE RNA guide

<400> SEQUENCE: 316
cggcaucccu gaacuuucca 20

<210> SEQ ID NO 317
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 317
cugaaggcgg caucccugaa 20

<210> SEQ ID NO 318
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 318
gaaaguucag ggaugccgcc 20

<210> SEQ ID NO 319
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 319
gaaggcggca ucccugaacu 20

<210> SEQ ID NO 320
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 320
gaugccgccu ucaggugugg 20

<210> SEQ ID NO 321
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 321
gccacaccug aaggcggcau 20

<210> SEQ ID NO 322
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 322
gccgccuuca ggugugg cuu 20

<210> SEQ ID NO 323
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 323
gcggcauccc ugaacuuucc 20

<210> SEQ ID NO 324
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 324
ggaaaguuca gggaugccgc 20

<210> SEQ ID NO 325
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 325
ggaugccgcc uucaggugug 20

<210> SEQ ID NO 326
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 326
ggcggcaucc cugaacuuuc 20

<210> SEQ ID NO 327
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 327
gggaugccgc cuucaggugu 20

<210> SEQ ID NO 328
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 328
guucagggau gccgccuuca 20

<210> SEQ ID NO 329
<211> LENGTH: 20
<212> TYPE: RNA

<213> ORGANISM: Artificial Sequence
<220> FEATURE:
<223> OTHER INFORMATION: ELANE RNA guide

<400> SEQUENCE: 329
uauggaaagu ucagggaugc 20

<210> SEQ ID NO 330
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 330
ucagggaugc cgccuucagg 20

<210> SEQ ID NO 331
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 331
ugaaggcggc aucccugaac 20

<210> SEQ ID NO 332
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 332
ugccgccuuc aggugugggcu 20

<210> SEQ ID NO 333
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 333
uggaaaguuc agggaugccg 20

<210> SEQ ID NO 334
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 334
uucagggaug ccgccuucag 20

<210> SEQ ID NO 335
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 335
agccccagag gccacaggga 20

<210> SEQ ID NO 336
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 336
ccagaggcca cagggacaga 20

<210> SEQ ID NO 337
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 337
gccccagagg ccacagggac 20

<210> SEQ ID NO 338
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 338
ggccucuggg gcuugacacc 20

<210> SEQ ID NO 339
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 339
ucugucccug uggccucugg 20

<210> SEQ ID NO 340
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 340
ugucucuguc ccuguggccu 20

<210> SEQ ID NO 341
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 341
aagccccaga ggacacaggg 20

<210> SEQ ID NO 342
<211> LENGTH: 20
<212> TYPE: RNA
<213> ORGANISM: Artificial Sequence
<220> FEATURE:

<223> OTHER INFORMATION: ELANE RNA guide

<400> SEQUENCE: 342
agaggacaca gggacagaga 20

<210> SEQ ID NO 343
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 343
aggacacagg gacagagaca 20

<210> SEQ ID NO 344
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 344
caagccccag aggacacagg 20

<210> SEQ ID NO 345
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 345
cucugucccu guguccucug 20

<210> SEQ ID NO 346
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 346
cugucccugu guccucuggg 20

<210> SEQ ID NO 347
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 347
cuuugucucu gucccugugu 20

<210> SEQ ID NO 348
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 348
gaggacacag ggacagagac 20

<210> SEQ ID NO 349
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 349
gccccagagg acacagggac 20

<210> SEQ ID NO 350
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 350
ggacacaggg acagagacaa 20

<210> SEQ ID NO 351
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 351
gucccugugu ccucuggggc 20

<210> SEQ ID NO 352
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 352
ucaagcccca gaggacacag 20

<210> SEQ ID NO 353
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 353
ugucccugug uccucugggg 20

<210> SEQ ID NO 354
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 354
uuugucucug ucccuguguc 20

<210> SEQ ID NO 355
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 355
gggacucugg guguggugaa 20

<210> SEQ ID NO 356
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 356
ggggacucug ggugugguga 20

<210> SEQ ID NO 357
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 357
cugggugacu cugggugugg 20

<210> SEQ ID NO 358
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 358
uucaccacac ccagagucac 20

<210> SEQ ID NO 359
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 359
agccccucca ggugggcagg 20

<210> SEQ ID NO 360
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 360
cagccccucc aggugggcag 20

<210> SEQ ID NO 361
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 361
ccagccccuc caggugggca 20

<210> SEQ ID NO 362
<211> LENGTH: 20

<212> TYPE: RNA
<213> ORGANISM: Artificial Sequence
<220> FEATURE:
<223> OTHER INFORMATION: ELANE RNA guide

<400> SEQUENCE: 362
ccccuccagg ugggcaggaa 20

<210> SEQ ID NO 363
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 363
ccccuuccug cccaccugga 20

<210> SEQ ID NO 364
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 364
cccuccaggu gggcaggaag 20

<210> SEQ ID NO 365
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 365
ccuccaggug ggcaggaagg 20

<210> SEQ ID NO 366
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 366
ccugcccacc uggaggggcu 20

<210> SEQ ID NO 367
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 367
ccuuccugcc caccuggagg 20

<210> SEQ ID NO 368
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 368
cuccagcccc uccaggugggc 20

<210> SEQ ID NO 369
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 369
cuuccugccc accuggaggg 20

<210> SEQ ID NO 370
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 370
gcccaccugg aggggcugga 20

<210> SEQ ID NO 371
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 371
guccuccagc cccuccaggu 20

<210> SEQ ID NO 372
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 372
uccagccccu ccaggugggc 20

<210> SEQ ID NO 373
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 373
uccuccagcc ccuccaggug 20

<210> SEQ ID NO 374
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 374
uccugcccac cuggaggggc 20

<210> SEQ ID NO 375
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 375
ugcccaccug gaggggcugg 20

<210> SEQ ID NO 376
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 376
uuccugccca ccuggagggg 20

<210> SEQ ID NO 377
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 377
agccccgcca ggugggcagg 20

<210> SEQ ID NO 378
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 378
cagccccgcc aggugggcag 20

<210> SEQ ID NO 379
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 379
ccaccuggcg gggcuggagg 20

<210> SEQ ID NO 380
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 380
ccagccccgc cagguggca 20

<210> SEQ ID NO 381
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 381
cccaccuggc ggggcuggag 20

<210> SEQ ID NO 382
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 382
ccccgccagg ugggcaggaa 20

<210> SEQ ID NO 383
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 383
ccccuuccug cccaccuggc 20

<210> SEQ ID NO 384
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 384
cccuuccugc ccaccuggcg 20

<210> SEQ ID NO 385
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 385
ccuccagccc cgccaggugg 20

<210> SEQ ID NO 386
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 386
ccugcccacc uggcggggcu 20

<210> SEQ ID NO 387
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 387
ccuggcgggg cuggaggacc 20

<210> SEQ ID NO 388
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 388
ccuuccugcc caccuggcgg 20

<210> SEQ ID NO 389
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 389
cgccaggugg gcaggaaggg 20

<210> SEQ ID NO 390
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 390
cggacggucc uccagccccg 20

<210> SEQ ID NO 391
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 391
cgguccucca gccccgccag 20

<210> SEQ ID NO 392
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 392
cuccagcccc gccagguggg 20

<210> SEQ ID NO 393
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 393
cugcccaccu ggcggggcug 20

<210> SEQ ID NO 394
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 394
cuggcggggc uggaggaccg 20

<210> SEQ ID NO 395

<211> LENGTH: 20
<212> TYPE: RNA
<213> ORGANISM: Artificial Sequence
<220> FEATURE:
<223> OTHER INFORMATION: ELANE RNA guide

<400> SEQUENCE: 395
cuuccugccc accuggcggg 20

<210> SEQ ID NO 396
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 396
gacgguccuc cagccccgcc 20

<210> SEQ ID NO 397
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 397
gcccaccugg cggggcugga 20

<210> SEQ ID NO 398
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 398
gccccgccag gugggcagga 20

<210> SEQ ID NO 399
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 399
gcggggcugg aggaccgucc 20

<210> SEQ ID NO 400
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 400
ggacgguccu ccagccccgc 20

<210> SEQ ID NO 401
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 401
ggcggggcug gaggaccguc 20

<210> SEQ ID NO 402
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 402
gguccuccag ccccgccagg 20

<210> SEQ ID NO 403
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 403
uccagccccg ccaggugggc 20

<210> SEQ ID NO 404
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 404
uccugcccac cuggcggggc 20

<210> SEQ ID NO 405
<211> LENGTH: 20
<212> TYPE: RNA
<213> ORGANISM: Artificial Sequence
<220> FEATURE:
<223> OTHER INFORMATION: ELANE RNA guide

<400> SEQUENCE: 405
ugcccaccug gcggggcugg 20

<210> SEQ ID NO 406
<211> LENGTH: 20
<212> TYPE: RNA
<213> ORGANISM: Artificial Sequence
<220> FEATURE:
<223> OTHER INFORMATION: g36 ELANE Guide RNA

<400> SEQUENCE: 406 uaggggiguu auggucacag 20

<210> SEQ ID NO 407
<211> LENGTH: 20
<212> TYPE: RNA
<213> ORGANISM: Artificial Sequence
<220> FEATURE:
<223> OTHER INFORMATION: g37 ELANE Guide RNA

<400> SEQUENCE: 407
cacagcgggu guagacuccg 20

<210> SEQ ID NO 408
<211> LENGTH: 20
<212> TYPE: RNA

<213> ORGANISM: Artificial Sequence
<220> FEATURE:
<223> OTHER INFORMATION: g38 ELANE Guide RNA

<400> SEQUENCE: 408
acagcgggug uagacuccga 20

<210> SEQ ID NO 409
<211> LENGTH: 20
<212> TYPE: RNA
<213> ORGANISM: Artificial Sequence
<220> FEATURE:
<223> OTHER INFORMATION: g39 ELANE Guide RNA

<400> SEQUENCE: 409
cagcgggugu agacuccgag 20

<210> SEQ ID NO 410
<211> LENGTH: 20
<212> TYPE: RNA
<213> ORGANISM: Artificial Sequence
<220> FEATURE:
<223> OTHER INFORMATION: g40 ELANE Guide RNA

<400> SEQUENCE: 410
agcgggugua gacuccgagg 20

<210> SEQ ID NO 411
<211> LENGTH: 20
<212> TYPE: RNA
<213> ORGANISM: Artificial Sequence
<220> FEATURE:
<223> OTHER INFORMATION: g41 ELANE Guide RNA

<400> SEQUENCE: 411
ccguugcagc uggaacaucg 20

<210> SEQ ID NO 412
<211> LENGTH: 20
<212> TYPE: RNA
<213> ORGANISM: Artificial Sequence
<220> FEATURE:
<223> OTHER INFORMATION: g42 ELANE Guide RNA

<400> SEQUENCE: 412
cguugcagcu ggaacaucgu 20

<210> SEQ ID NO 413
<211> LENGTH: 20
<212> TYPE: RNA
<213> ORGANISM: Artificial Sequence
<220> FEATURE:
<223> OTHER INFORMATION: g43 ELANE Guide RNA

<400> SEQUENCE: 413
guugcagcug gaacaucgug 20

<210> SEQ ID NO 414
<211> LENGTH: 20
<212> TYPE: RNA
<213> ORGANISM: Artificial Sequence
<220> FEATURE:
<223> OTHER INFORMATION: g44 ELANE Guide RNA

<400> SEQUENCE: 414
uugcagcugg aacaucgugg 20

<210> SEQ ID NO 415
<211> LENGTH: 20
<212> TYPE: RNA
<213> ORGANISM: Artificial Sequence
<220> FEATURE:
<223> OTHER INFORMATION: g45 ELANE Guide RNA

<400> SEQUENCE: 415
cuggaacauc gugggggaga 20

<210> SEQ ID NO 416
<211> LENGTH: 20
<212> TYPE: RNA
<213> ORGANISM: Artificial Sequence
<220> FEATURE:
<223> OTHER INFORMATION: g46 ELANE Guide RNA

<400> SEQUENCE: 416
uggaacaucg ugggggagau 20

<210> SEQ ID NO 417
<211> LENGTH: 20
<212> TYPE: RNA
<213> ORGANISM: Artificial Sequence
<220> FEATURE:
<223> OTHER INFORMATION: g47 ELANE Guide RNA

<400> SEQUENCE: 417 aucgugggggg agaugggaag 20

<210> SEQ ID NO 418
<211> LENGTH: 20
<212> TYPE: RNA
<213> ORGANISM: Artificial Sequence
<220> FEATURE:
<223> OTHER INFORMATION: g57 ELANE Guide RNA

<400> SEQUENCE: 418
ggagucccag cugcgggaaa 20

<210> SEQ ID NO 419
<211> LENGTH: 20
<212> TYPE: RNA
<213> ORGANISM: Artificial Sequence
<220> FEATURE:
<223> OTHER INFORMATION: g58 ELANE Guide RNA

<400> SEQUENCE: 419
gcugcgggaa agggauuccc 20

<210> SEQ ID NO 420
<211> LENGTH: 20
<212> TYPE: RNA
<213> ORGANISM: Artificial Sequence
<220> FEATURE:
<223> OTHER INFORMATION: g59 ELANE Guide RNA

<400> SEQUENCE: 420
gggaaucccu uucccgcagc 20

<210> SEQ ID NO 421
<211> LENGTH: 20
<212> TYPE: RNA
<213> ORGANISM: Artificial Sequence
<220> FEATURE:

<223> OTHER INFORMATION: g60 ELANE Guide RNA

<400> SEQUENCE: 421
ggaaucccuu ucccgcagcu 20

<210> SEQ ID NO 422
<211> LENGTH: 20
<212> TYPE: RNA
<213> ORGANISM: Artificial Sequence
<220> FEATURE:
<223> OTHER INFORMATION: g27 ELANE Guide RNA

<400> SEQUENCE: 422
caaaugucag auaaucaaug 20

<210> SEQ ID NO 423
<211> LENGTH: 20
<212> TYPE: RNA
<213> ORGANISM: Artificial Sequence
<220> FEATURE:
<223> OTHER INFORMATION: g28 ELANE Guide RNA

<400> SEQUENCE: 423
aaaugucaga uaaucaaugu 20

<210> SEQ ID NO 424
<211> LENGTH: 20
<212> TYPE: RNA
<213> ORGANISM: Artificial Sequence
<220> FEATURE:
<223> OTHER INFORMATION: g67 ELANE Guide RNA

<400> SEQUENCE: 424
accaaggcuc agggcguugg 20

<210> SEQ ID NO 425
<211> LENGTH: 20
<212> TYPE: RNA
<213> ORGANISM: Artificial Sequence
<220> FEATURE:
<223> OTHER INFORMATION: g32 ELANE Guide RNA

<400> SEQUENCE: 425
ccuguugcug caguccgggc 20

<210> SEQ ID NO 426
<211> LENGTH: 20
<212> TYPE: RNA
<213> ORGANISM: Artificial Sequence
<220> FEATURE:
<223> OTHER INFORMATION: g33 ELANE Guide RNA

<400> SEQUENCE: 426
ccagcccgga cugcagcaac 20

<210> SEQ ID NO 427
<211> LENGTH: 20
<212> TYPE: RNA
<213> ORGANISM: Artificial Sequence
<220> FEATURE:
<223> OTHER INFORMATION: g34 ELANE Guide RNA

<400> SEQUENCE: 427
ucccuccuag ggucuagcca 20

<210> SEQ ID NO 428
<211> LENGTH: 20
<212> TYPE: RNA
<213> ORGANISM: Artificial Sequence
<220> FEATURE:
<223> OTHER INFORMATION: g35 ELANE Guide RNA

<400> SEQUENCE: 428
aguccgggcu gggagcgggu 20

<210> SEQ ID NO 429
<211> LENGTH: 20
<212> TYPE: RNA
<213> ORGANISM: Artificial Sequence
<220> FEATURE:
<223> OTHER INFORMATION: g29 ELANE Guide RNA

<400> SEQUENCE: 429
auguuuauug ugccagaugc 20

<210> SEQ ID NO 430
<211> LENGTH: 20
<212> TYPE: RNA
<213> ORGANISM: Artificial Sequence
<220> FEATURE:
<223> OTHER INFORMATION: g30 ELANE Guide RNA

<400> SEQUENCE: 430
gugggcagcu gaggugaccc 20

<210> SEQ ID NO 431
<211> LENGTH: 20
<212> TYPE: RNA
<213> ORGANISM: Artificial Sequence
<220> FEATURE:
<223> OTHER INFORMATION: g31 ELANE Guide RNA

<400> SEQUENCE: 431
cacccacacu cuccagcauc 20

<210> SEQ ID NO 432
<211> LENGTH: 20
<212> TYPE: RNA
<213> ORGANISM: Artificial Sequence
<220> FEATURE:
<223> OTHER INFORMATION: g61 ELANE Guide RNA

<400> SEQUENCE: 432
ugucaagccc cagaggccac 20

<210> SEQ ID NO 433
<211> LENGTH: 20
<212> TYPE: RNA
<213> ORGANISM: Artificial Sequence
<220> FEATURE:
<223> OTHER INFORMATION: g62 ELANE Guide RNA

<400> SEQUENCE: 433
gucaagcccc agaggccaca 20

<210> SEQ ID NO 434
<211> LENGTH: 20
<212> TYPE: RNA
<213> ORGANISM: Artificial Sequence
<220> FEATURE:
<223> OTHER INFORMATION: g63 ELANE Guide RNA

<400> SEQUENCE: 434
gucucugucc cuguggccuc 20

<210> SEQ ID NO 435
<211> LENGTH: 20
<212> TYPE: RNA
<213> ORGANISM: Artificial Sequence
<220> FEATURE:
<223> OTHER INFORMATION: g64 ELANE Guide RNA

<400> SEQUENCE: 435
ucucuguccc uguggccucu 20

<210> SEQ ID NO 436
<211> LENGTH: 20
<212> TYPE: RNA
<213> ORGANISM: Artificial Sequence
<220> FEATURE:
<223> OTHER INFORMATION: g65 ELANE Guide RNA

<400> SEQUENCE: 436
cucugucccu guggccucug 20

<210> SEQ ID NO 437
<211> LENGTH: 20
<212> TYPE: DNA
<213> ORGANISM: Artificial Sequence
<220> FEATURE:
<223> OTHER INFORMATION: g39 REF ELANE Guide RNA

<400> SEQUENCE: 437
cagcgggtgt agactccgag 20

<210> SEQ ID NO 438
<211> LENGTH: 20
<212> TYPE: DNA
<213> ORGANISM: Artificial Sequence
<220> FEATURE:
<223> OTHER INFORMATION: g39 ALT ELANE Guide RNA

<400> SEQUENCE: 438
cagcaggtgt agactccgag 20

<210> SEQ ID NO 439
<211> LENGTH: 20
<212> TYPE: DNA
<213> ORGANISM: Artificial Sequence
<220> FEATURE:
<223> OTHER INFORMATION: g58 REF ELANE Guide RNA

<400> SEQUENCE: 439
gctgcgggaa agggattccc 20

<210> SEQ ID NO 440
<211> LENGTH: 20
<212> TYPE: DNA
<213> ORGANISM: Artificial Sequence
<220> FEATURE:
<223> OTHER INFORMATION: g58 ALT ELANE Guide RNA

<400> SEQUENCE: 440
gctgcgggaa tgggattccc 20

<210> SEQ ID NO 441
<211> LENGTH: 20

<212> TYPE: DNA
<213> ORGANISM: Artificial Sequence
<220> FEATURE:
<223> OTHER INFORMATION: g62 REF ELANE Guide RNA

<400> SEQUENCE: 441
gtcaagcccc agaggccaca 20

<210> SEQ ID NO 442
<211> LENGTH: 20
<212> TYPE: DNA
<213> ORGANISM: Artificial Sequence
<220> FEATURE:
<223> OTHER INFORMATION: g62 ALT ELANE Guide RNA

<400> SEQUENCE: 442
gtcaagcccc agaggacaca 20

<210> SEQ ID NO 443
<211> LENGTH: 20
<212> TYPE: DNA
<213> ORGANISM: Artificial Sequence
<220> FEATURE:
<223> OTHER INFORMATION: g35 ELANE Guide RNA

<400> SEQUENCE: 443
agtccgggct gggagcgggt 20

<210> SEQ ID NO 444
<211> LENGTH: 20
<212> TYPE: RNA
<213> ORGANISM: Artificial Sequence
<220> FEATURE:
<223> OTHER INFORMATION: Example Guide RNA

<400> SEQUENCE: 444
aaaaaaacac aaugugggga 20

<210> SEQ ID NO 445
<211> LENGTH: 17
<212> TYPE: RNA
<213> ORGANISM: Artificial Sequence
<220> FEATURE:
<223> OTHER INFORMATION: 17 nucleotide guide sequence 1

<400> SEQUENCE: 445
aaaacacaau gugggga 17

<210> SEQ ID NO 446
<211> LENGTH: 17
<212> TYPE: RNA
<213> ORGANISM: Artificial Sequence
<220> FEATURE:
<223> OTHER INFORMATION: 17 nucleotide guide sequence 2

<400> SEQUENCE: 446
aaaaacacaa ugugggg 17

<210> SEQ ID NO 447
<211> LENGTH: 17
<212> TYPE: RNA
<213> ORGANISM: Artificial Sequence
<220> FEATURE:
<223> OTHER INFORMATION: 17 nucleotide guide sequence 3

<400> SEQUENCE: 447

-continued

```
aaaaaacaca auguggg                                                  17


<210> SEQ ID NO 448
<211> LENGTH: 17
<212> TYPE: RNA
<213> ORGANISM: Artificial Sequence
<220> FEATURE:
<223> OTHER INFORMATION: 17 nucleotide guide sequence 4

<400> SEQUENCE: 448

aaaaaaacac aaugugg                                                  17
```

DIFFERENTIAL KNOCKOUT OF AN ALLELE OF A HETEROZYGOUS ELANE GENE-II

This application claims the benefit of U.S. Provisional Application No. 62/931,641 filed Nov. 6, 2019, the contents of which are hereby incorporated by reference.

Throughout this application, various publications are referenced, including referenced in parenthesis. The disclosures of all publications mentioned in this application in their entireties are hereby incorporated by reference into this application in order to provide additional description of the art to which this invention pertains and of the features in the art which can be employed with this invention.

REFERENCE TO SEQUENCE LISTING

This application incorporates-by-reference nucleotide sequences which are present in the file named "201105_91191-A_Sequence_Listing_AWG.txt", which is 84 kilobytes in size, and which was created on Oct. 12, 2020 in the IBM-PC machine format, having an operating system compatibility with MS-Windows, which is contained in the text file filed Nov. 5, 2020 as part of this application.

BACKGROUND OF INVENTION

There are several classes of DNA variation in the human genome, including insertions and deletions, differences in the copy number of repeated sequences, and single nucleotide polymorphisms (SNPs). A SNP is a DNA sequence variation occurring when a single nucleotide (adenine (A), thymine (T), cytosine (C), or guanine (G)) in the genome differs between human subjects or paired chromosomes in an individual. Over the years, the different types of DNA variations have been the focus of the research community either as markers in studies to pinpoint traits or disease causation or as potential causes of genetic disorders. SNPs are usually considered benign and not causing disease.

A genetic disorder is caused by one or more abnormalities in the genome. Genetic disorders may be regarded as either "dominant" or "recessive." Recessive genetic disorders are those which require two copies (i.e., two alleles) of the abnormal/defective gene to be present. In contrast, a dominant genetic disorder involves a gene or genes which exhibit(s) dominance over a normal (functional/healthy) gene or genes. As such, in dominant genetic disorders only a single copy (i.e., allele) of an abnormal gene is required to cause or contribute to the symptoms of a particular genetic disorder. Such mutations include, for example, gain-of-function mutations in which the altered gene product possesses a new molecular function or a new pattern of gene expression. Gain-of-function mutations are generally dominant negative mutations. An example of a dominant negative mutation is haploinsufficiency where one allele is mutated and loses its function and the single wild type allele left does not generate enough protein to be sufficient for a specific cellular function. Other examples include dominant negative mutations which have a gene product that acts antagonistically to the wild-type allele.

Neutropenia

Neutropenia is defined as a reduction in the absolute number of neutrophils in the blood circulation and commonly diagnosed by measuring the absolute neutrophil count (ANC) in peripheral blood. The severity of neutropenia is characterized as mild with an ANC of 1000-1500/μL, moderate with an ANC of 500-1000/μL, or severe with an ANC of less than 500/μL (Boxer 2012).

Neutropenia can be classified as congenital (hereditary) or acquired. The two main types of the congenital condition, commonly of autosomal dominant inheritance, are cyclic neutropenia (CyN) and severe congenital neutropenia (SCN). Cyclic neutropenia is characterized by fluctuating neutrophil counts from normal levels to zero while severe congenital neutropenia (SCN) is characterized by very low ANC (500/μL) observed at birth, maturation arrest of the myelopoiesis in bone marrow at the promyelocyte/myelocyte stage, and early onset of bacterial infections (Carlsson et al. 2012; Horwitz et al. 2013).

SCN may be diagnosed by measuring a very low ANC in the blood and examining bone marrow aspirate to identify myeloid maturation arrest (Dale 2017). SCN is usually diagnosed before age 6 months, while diagnosis for CyN is generally raised during the second year of life, or later, and the main clinical manifestation is recurrent acute stomatologic disorders. Bone marrow examination is often necessary to rule out malignant hemopathies, determine cellularity, assess myeloid maturation, and detect signs of a precise etiology, with cytogenetic bone marrow studies now crucial when SCN is suspected. Antineutrophil antibody assay, immunoglobulin assay (Ig GAM), lymphocyte immunophenotyping, pancreatic markers (serum trypsinogen and fecal elastase) and liposoluble vitamin levels (vitamins A, E and D) are also of interest in assessing SCN and CyN (See Donadieu 2011).

SCN can be autosomal-recessive (HAX1, G6PC3), autosomal-dominant (ELANE, GFI1), or X-linked (WAS) forms of inheritance or occur sporadically (Carlsson et al. 2012; Boxer 2012).

Cyclic and congenital neutropenia are most frequently caused by mutations in the "elastase, neutrophil expressed gene" (ELANE gene)—the gene for neutrophil elastase. "ELANE gene mutations are identified in 40-55% of SCN patients and males and females are equally affected (Donadieu et al. 2011; Dale 2017). Mutations in the ELANE gene are associated with autosomal-dominant and sporadic cases of SCN (Carlsson et al. 2012). To date, more than 200 different ELANE mutations have been identified, which are randomly distributed over all exons as well as in intron 3 and intron 4 (Skokowa et al. 2017). More than 120 distinct ELANE gene mutations related to CyN and SCN are now known, for example C151Y and G214R particularly associated with a poor prognosis. (See Makaryan et al. 2012; see also Germeshausen et al. 2013 for a comprehensive list of ELANE mutations related to CyN and SCN).

ELANE encodes neutrophil elastase (NE) which is involved in the function of neutrophil extracellular traps (networks of fibers that bind pathogens). Some studies suggest that the product of mutant ELANE acts to disrupt neutrophil production in the bone marrow and cause neutropenia. These studies indicate that mutations in NE initiate the unfolded protein response (UPR) leading to cell loss in the process of neutrophil formation in the marrow (Makaryan et al. 2017).

Current Treatments

Granulocyte colony-stimulating factor (G-CSF) is considered the first-line treatment for SCN (Connelly, Choi, and Levine 2012). G-CSF stimulates the production of more neutrophils and delays their apoptosis (Schïffer and Klein 2007). Overall survival is now estimated to exceed 80%, including patients developing malignancies, although 10% of SCN patients still die from severe bacterial infections or sepsis (Skokowa et al. 2017). Although G-CSF therapy is successful in preventing mortality from sepsis, long-term treatment was identified to be associated with an increased risk of developing myelodysplastic syndrome (MDS) or leukemia in SCN patients. The most common leukemia in SCN is AML, but acute lymphoid leukemia (ALL), juvenile myelomonocytic leukemia (JMML), chronic myelomonocytic leukemia (CMML), and bi-phenotypic leukemia are also reported in the literature (Connelly, Choi, and Levine 2012). It was previously demonstrated that patients who had a robust response to G-CSF (doses≤8 μg/kg/day) had a cumulative incidence of 15% for developing MDS/leukemia after 15 years on G-CSF, while an incidence of 34% was reported in patients with poor response to G-CSF despite high doses (Rosenberg et al. 2010).

Hematopoietic stem cell transplant (HSCT) is an alternative, curative therapy for patients who do not respond to G-CSF therapy or who develop AML/MDS. However, patients with chronic neutropenia who undergo HCT are at increased risk of developing infectious complications such as fungal and graft-versus-host disease (Skokowa et al. 2017). Moreover, HCT requires a matched related donor for successful survival but most patients will not have an available matched donor (Connelly, Choi, and Levine 2012).

SUMMARY OF THE INVENTION

Disclosed is an approach for knocking out the expression of a dominant-mutant allele by disrupting the dominant-mutant allele or degrading the resulting mRNA.

The present disclosure provides a method for utilizing at least one naturally occurring heterozygous nucleotide difference or polymorphism (e.g., single nucleotide polymorphism (SNP)) for distinguishing/discriminating between two alleles of a gene, one allele bearing a mutation such that it encodes a mutated protein causing a disease phenotype ("mutant allele"), and the other allele encoding for a functional protein ("functional allele").

Embodiments of the present invention provide methods for utilizing at least one heterozygous SNP in a gene expressing a dominant mutant allele in a given cell or subject. In embodiments of the present invention, the SNP utilized may or may not be associated with a disease phenotype. In embodiments of the present invention, an RNA molecule comprising a guide sequence targets the mutant allele of the gene by targeting the nucleotide base present at a heterozygous SNP in the mutant allele of the gene and therefore having a different nucleotide base from the functional allele of the gene.

In some embodiments, the method further comprises the step of knocking out expression of the mutated protein and allowing expression of the functional protein.

The present invention provides a method for inactivating in a cell a mutant allele of the elastase, neutrophil expressed gene (ELANE gene) gene having a mutation associated with severe congenital neutropenia (SCN) or cyclic neutropenia (CyN) and which cell is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising introducing to the cell a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene.

The present invention also provides a method for inactivating in a cell a mutant allele of the elastase, neutrophil expressed gene (ELANE gene) gene having a mutation associated with severe congenital neutropenia (SCN) or cyclic neutropenia (CyN) and which cell is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising introducing to the cell a composition comprising:

a CRISPR nuclease or a sequence encoding the CRISPR nuclease; and a first RNA molecule comprising a guide sequence portion, wherein the guide sequence portion of the first RNA molecule comprises 17-30 contiguous nucleotides containing nucleotides in the sequence set forth in any one of SEQ ID NOs: 1-436, wherein a complex of the CRISPR nuclease and the first RNA molecule affects a double strand break in the mutant allele of the ELANE gene.

The present invention provides for a modified cell obtained by the methods of the present invention.

The present invention provides for a modified cell lacking at least a portion of one allele of the ELANE gene.

The present invention provides for a composition comprising modified cells and a pharmaceutically acceptable carrier.

The present invention provides for an in vitro or ex vivo method of preparing a composition, comprising mixing the cells of the present invention with the pharmaceutically acceptable carrier.

The present invention provides for a method of preparing in vitro or ex vivo a composition comprising modified cells, the method comprising:

a) isolating HSPCs from cells obtained from a subject with an ELANE gene mutation related to SCN or CyN and/or suffering from SCN or CyN and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, and obtaining the cell from the subject;

b) introducing to the cells of step (a) a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene in one or more cells, optionally, introducing to the cells a second RNA molecule comprising a guide sequence portion capable of complexing with a CRISPR nuclease, wherein the complex of the second RNA molecule and CRISPR nuclease affects a second double strand break in the ELANE gene in the one or more cells so as to inactive the mutant allele of the ELANE gene in one or more cells thereby obtaining modified cells; optionally c) culture expanding the modified cells of step (b), wherein the modified cells are capable of engraftment and giving rise to progeny cells after engraftment.

The present invention provides for use of a composition prepared in vitro by a method comprising:

a) isolating HSPCs from cells obtained from a subject with an ELANE gene mutation related to SCN or CyN and/or suffering from SCN or CyN and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095;

b) introducing to the cells of step (a) a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene in one or more cells, optionally, introducing to the cells a second RNA molecule comprising a guide sequence portion capable of complexing with a CRISPR nuclease, wherein the complex of the second RNA molecule and CRISPR nuclease affects a second double strand break in the ELANE gene in the one or more cells so as to inactive the mutant allele of the ELANE gene in one or more cells thereby obtaining modified cells; optionally;

c) culture expanding the cells of step (b) wherein the modified cells are capable of engraftment and giving rise to progeny cells after engraftment; and d) administering to the subject the cells of step (b) or step (c)

for treating the SCN or CyN in the subject.

The present invention provides for a method of treating a subject afflicted with SCN or CyN, comprising administration of a therapeutically effective amount of the modified cells, compositions, or the compositions prepared by the methods of the instant invention The present invention provides for a method for treating SCN or CyN in a subject with an ELANE gene mutation relating to SCN or CYN in need thereof and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising:

a) isolating HSPCs from cells obtained from the subject;

b) introducing to the cells of step (a) a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene in one or more cells, optionally, introducing to the cells a second RNA molecule comprising a guide sequence portion capable of complexing with a CRISPR nuclease, wherein the complex of the second RNA molecule and CRISPR nuclease affects a second double strand break in the ELANE gene in the one or more cells so as to inactive the mutant allele of the ELANE gene in one or more cells thereby obtaining modified cells; optionally;

c) culture expanding the cells of step (b) wherein the modified cells are capable of engraftment and giving rise to progeny cells after engraftment; and d) administering to the subject the cells of step (b) or step (c)

thereby treating the SCN or CyN in the subject.

The present invention provides for a method for treating SCN or CyN in a subject with an ELANE gene mutation relating to SCN or CYN in need thereof and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising administering to the subject autologous modified cells or progeny of autologous modified cells, wherein the autologous modified cells are modified so as to have a double strand break in the mutant allele of the ELANE gene, wherein said double strand break results from introduction to the cells of a composition comprising a CRISPR nuclease or a sequence encoding the CRISPR nuclease and a first RNA molecule wherein a complex of the CRISPR nuclease and the first RNA molecule affects a double strand break in the mutant allele of the ELANE gene so as to inactive the mutant allele of the ELANE gene in the cell, thereby treating the SCN or CyN in the subject.

The present invention provides for a method of selecting a subject for treatment from a pool of subjects diagnosed with SCN or CyN, comprising the steps of:

a) obtaining cells from each subject in the pool of subjects;

b) screening each subject's cells for an ELANE gene mutation related to SCN or CyN, and selecting only subjects with an ELANE gene mutation related to SCN or CyN;

c) screening by sequencing the cells of the subjects selected in step (b) for heterozygosity at one or more polymorphic sites selected from the group consisting of: rs10414837, rs3761005, rs1683564,
d) selecting for treatment only subjects with cells heterozygous at the one of more polymorphic sites
e) obtaining hematopoetic stem and progenitor cells (HSPC) cells from the bone marrow of the subject either by aspiration or by mobilization and apheresis of peripheral blood; and
f) introducing to the HSPC cells of step (e):
  one or more CRISPR nucleases or sequences encoding the one or more CRISPR nuclease;
  a first RNA molecule comprising a guide sequence portion having 17-30 nucleotides containing nucleotides in the sequence set forth in any one of SEQ ID NOs: 1-436 targeting the nucleotide base of the heterozygous allele of the one or more polymorphic sites present on the mutant allele of the ELANE gene, and
  a second RNA molecule comprising a guide sequence portion targeting a sequence in intron 3, intron 4 or 3' UTR of the ELANE gene, wherein a complex of the first RNA molecule and a CRISPR nuclease affects a first double strand break in the mutant allele of the ELANE gene in one or more of the HSPC cells and a complex of the second RNA molecule and a CRISPR nuclease affect a second double strand break in intron 3, intron 4, or 3' UTR of both alleles of the ELANE gene in the one or more HSPC cells in which the complex of the first RNA molecule and the CRISPR nuclease affected a first double strand break, thereby obtaining modified cells;
g) administering to the subject the modified cells of step (0, thereby treating SCN or CyN in the subject.

The present invention provides an RNA molecule comprising a guide sequence portion having 17-30 nucleotides containing nucleotides in the sequence set forth in any one of SEQ ID NOs: 1-436.

The present invention provides a method for inactivating in a cell a mutant ELANE allele, the method comprising delivering to the cell the RNA molecules or compositions of the present invention.

The present invention provides use of the RNA molecules, the compositions, or the composition prepared by the method of the present invention for inactivating in a cell a mutant ELANE allele.

The present invention provides a medicament comprising the RNA molecules, compositions, or the compositions prepared by the methods of the instant invention for use in inactivating in a cell a mutant ELANE allele, wherein the medicament is administered by delivering to the cell the RNA molecules, compositions, or the compositions prepared by the methods of the instant invention.

The present invention provides for use of the methods, the modified cells, the compositions, or the compositions prepared by the methods, or the RNA molecules of the instant invention for treating ameliorating or preventing SCN or CyN in to a subject having or at risk of having SCN or CyN.

The present invention provides for a medicament comprising the RNA molecules, compositions, compositions prepared by the methods of the instant invention, or the modified cells of the instant invention, for use in treating ameliorating or preventing SCN or CyN, wherein the medicament is administered by delivering to a subject having or at risk of having SCN or CyN the RNA molecules, compositions, compositions prepared by the methods of the instant invention, or the modified cells of the instant invention.

The present invention provides for a kit for inactivating a mutant ELANE allele in a cell, comprising the RNA molecules of the instant invention, a CRISPR nuclease or a sequence encoding the CRISPR nuclease, and/or a tracrRNA molecule or a sequence encoding the tracrRNA; and instructions for delivering the RNA molecule; CRISPR nuclease or sequence encoding the CRISPR nuclease, and/or tracrRNA molecule or sequence encoding the tracrRNA to the cell to inactivate the mutant ELANE allele in the cell.

The present invention provides for a kit for treating SCN or CyN in a subject, comprising the RNA molecules of the instant invention, a CRISPR nuclease or sequence encoding the CRISPR nuclease, and/or a tracrRNA molecule or sequence encoding the tracrRNA molecule; and instructions for delivering the RNA molecule; CRISPR nuclease, and/or the tracrRNA to a subject having or at risk of having SCN or CyN so as to treat the SCN or CyN.

The present invention provides a kit for inactivating a mutant ELANE allele in a cell, comprising the compositions, the composition prepared by the methods of the instant invention, or the modified cells of the instant invention, and instructions for delivering the composition to the cell so as to inactivate the ELANE gene in the cell.

The present invention provides a kit for treating SCN or CyN in a subject, comprising the composition, the compositions prepared by the methods of the instant invention, or the modified cells of the instant invention, and instructions for delivering the compositions, the compositions prepared by the methods of the instant invention, or the modified cells of the instant invention, to a subject having or at risk of having SCN or CyN so as to treat SCN or CyN.

DETAILED DESCRIPTION

Figure 1:
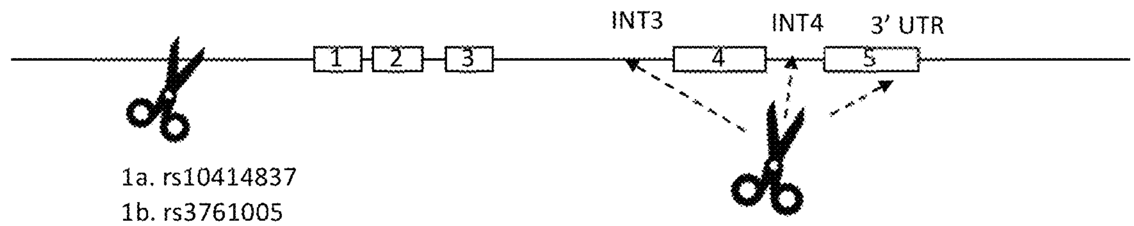
FIG. 1: excising the promoter region from an upstream SNP position until intron 3 or intron 4 or the 3' UTR. In one example, a first guide sequence targets a specific sequence of a heterozygous SNP position in an upstream region of the mutant allele (strategy 1a-rs10414837, strategy 1b-rs3761005) and a second guide sequence targets a sequence in intron 4 which is common to two alleles of the gene.

Embodiments of the present invention provide a method for inactivating in a cell a mutant allele of the elastase, neutrophil expressed gene (ELANE gene) gene having a mutation associated with severe congenital neutropenia (SCN) or cyclic neutropenia (CyN) and which cell is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising introducing to the cell a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene.

Embodiments of the present invention also provide a method for inactivating in a cell a mutant allele of the elastase, neutrophil expressed gene (ELANE gene) gene having a mutation associated with severe congenital neutropenia (SCN) or cyclic neutropenia (CyN) and which cell is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising introducing to the cell a composition comprising:

a CRISPR nuclease or a sequence encoding the CRISPR nuclease; and a first RNA molecule comprising a guide sequence portion, wherein the guide sequence portion of the first RNA molecule comprises 17-30 contiguous nucleotides containing nucleotides in the sequence set forth in any one of SEQ ID NOs: 1-436, wherein a complex of the CRISPR nuclease and the first RNA molecule affects a double strand break in the mutant allele of the ELANE gene.

In particular, in embodiments of the present invention wherein the cell (or subject) is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the guide sequence portion of the first RNA molecule comprises 17-30 contiguous nucleotides containing nucleotides in the sequence set forth in any one of SEQ ID NOs: 1-436.

In embodiments of the present invention, the CRISPR nuclease and the first RNA molecule affects a double strand break in the mutant allele of the ELANE gene, which mutant allele is targeted for the double strand break based on the one or more polymorphic sites.

In embodiments of the present invention, the CRISPR nuclease and the first RNA molecule affects a double strand break in the mutant allele of the ELANE gene, which mutant allele is targeted for the double strand break based on a sequence of the mutant allele at the one or more polymorphic sites.

In embodiments of the present invention, the CRISPR nuclease and the first RNA molecule affects a double strand break in the mutant allele of the ELANE based on the nucleotide base of the one or more polymorphic sites present on the mutant allele of the ELANE gene.

Embodiments of the present invention further comprise introduction of a second RNA molecule comprising a guide sequence portion capable of complexing with a CRISPR nuclease, wherein the complex of the second RNA molecule and CRISPR nuclease affects a second double strand break in the ELANE gene.

In embodiments of the present invention, a composition may comprise 1, 2, 3 or more CRISPR nucleases or sequencing encoding the CRISPR nucleases. In embodiments of the present invention, introducing a composition to the cell may comprise introducing 1, 2, 3, or more compositions to the cell. In embodiments of the present invention, each composition may comprise a different CRISPR nuclease or sequence encoding the CRISPR nucleases or the same CRISPR nuclease or sequence encoding the CRISPR nuclease. In embodiments of the present invention involving two RNA molecules, the second RNA molecule may form a complex with the same CRISPR nuclease as the first RNA molecule, or may form a complex with another CRISPR nuclease.

In embodiments of the present invention, the second double strand break is within a non-coding region of the ELANE gene. In embodiments of the present invention, the non-coding region of the ELANE gene is selected an intron or an untranslated region (UTR). In embodiments of the present invention, the non-coding region is in intron 3 or intron 4. In an embodiments of the present invention the UTR is the 3'UTR.

In embodiments of the present invention, the guide sequence portion of the first RNA molecule comprises 17-30 contiguous nucleotides containing nucleotides in the sequence set forth in any one of SEQ ID NOs: 1-436.

According to embodiments of the present invention, the guide sequence portion of the second RNA molecule comprises 17-30 nucleotides containing nucleotides in the sequence set forth in any one of SEQ ID NOs: 1-436.

In embodiments of the present invention, the second double strand break is within a non-coding region of the ELANE gene.

In embodiments of the present invention, the cell is heterozygous at rs10414837 or rs3761005 and the complex of the second RNA molecule and CRISPR nuclease affects a double strand break in intron 4 of the ELANE gene.

In embodiments of the present invention, the cell is heterozygous at rs10414837 or rs3761005 and the complex of the second RNA molecule and CRISPR nuclease affects a double strand break in intron 3 of the ELANE gene.

In embodiments of the present invention, the cell is heterozygous at rs10414837 or rs3761005 and the complex of the second RNA molecule and CRISPR nuclease affects a double strand break in the 3' UTR region of the ELANE gene.

In embodiments of the present invention, the cell is heterozygous at rs1683564 and the complex of the second RNA molecule and CRISPR nuclease affects a double strand break in intron 4 of the ELANE gene.

In embodiments of the present invention, the cell is heterozygous at rs1683564 and the complex of the second RNA molecule and CRISPR nuclease affects a double strand break in intron 3 of the ELANE gene.

In embodiments of the present invention, the cell is heterozygous at rs1683564 and the complex of the second RNA molecule and CRISPR nuclease affects a double strand break in the 3' UTR region of the ELANE gene.

In some embodiments, the cell is heterozygous at the polymorphic sites in the ELANE rs10414837, and a complex of a first RNA molecule comprising a guide sequence portion having 17-30 nucleotides and a CRISPR nuclease affects a double strand break in the mutant allele of the ELANE gene and not in the functional allele of the ELANE gene. In such embodiments the guide sequence portion of the first RNA molecule comprises 17-30 nucleotides may comprise a sequence of 17-20 contiguous nucleotides as set forth in any one of SEQ ID NOs: 29-32.

In some embodiments, the cell is heterozygous at the polymorphic sites in the ELANE rs3761005, and a complex of a first RNA molecule comprising a guide sequence portion having 17-30 nucleotides and a CRISPR nuclease affects a double strand break in the mutant allele of the ELANE gene and not in the functional allele of the ELANE gene. In such embodiments the guide sequence portion of the first RNA molecule comprises having 17-30 nucleotides may comprise a sequence of 17-20 contiguous nucleotides as set forth in SEQ ID NO: 63.

In some embodiments, the cell is heterozygous at the polymorphic sites in the ELANE rs1683564, and a complex of a first RNA molecule comprising a guide sequence portion having 17-30 nucleotides and a CRISPR nuclease affects a double strand break in the mutant allele of the ELANE gene and not in the functional allele of the ELANE gene. In such embodiments the guide sequence portion of the first RNA molecule comprises having 17-30 nucleotides may comprise a sequence of 17-20 contiguous nucleotides as set forth in any one of SEQ ID NOs: 335-354.

Embodiments of the present invention comprise obtaining the cell with an ELANE gene mutation associated with severe congenital neutropenia (SCN) or CyN from a subject with an ELANE gene mutation related to SCN or CyN and/or suffering from SCN or CyN and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095.

Embodiments of the present invention comprise first selecting a subject with an ELANE gene mutation related to SCN or CyN and/or suffering from SCN or CyN and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs81070954, and obtaining the cell from the subject.

Embodiments of the present invention comprise obtaining the cell from the subject by mobilization and/or by apheresis.

Embodiments of the present invention comprise obtaining the cell from the subject by bone marrow aspiration.

In embodiments of the present invention, the cell is prestimulated prior to introducing the composition to the cell.

Embodiments of the present invention comprise culture expanding the cell to obtain cells.

In embodiments of the present invention, the cells are cultured with one or more of: stem cell factor (SCF), IL-3, and GM-CSF.

In embodiments of the present invention, the cells are cultured with at least one cytokine.

In embodiments of the present invention, the at least one cytokine is a recombinant human cytokine.

In embodiments of the present invention, the cell is among a plurality of cells, wherein the composition comprising the first RNA molecule or both the first and the second RNA molecule is introduced into at least the cell as well as other cells among the plurality of cells, and the mutant allele of the ELANE gene is inactivated in at least the cell as well as in the other cells among the plurality of cells, thereby obtaining multiple modified cells.

In embodiments of the present invention, introducing the composition comprising the first RNA molecule or introduction of the second RNA molecule comprises electroporation of the cell or cells.

Embodiments of the present invention provide for a modified cell obtained by the methods of the present invention.

In embodiments of the present invention, the modified cells are further culture expanded.

In embodiments of the present invention, the modified cells are capable of engraftment.

In embodiments of the invention, modified cells are capable of long-term engraftment when infused into a patient, giving rise to differentiated hematopoietic cells for at least 12 months after infusion, preferably at least 24 months and even more preferably at least 30 months after infusion. In a further embodiment, the modified cells are capable of long-term engraftment when infused into an autologous subject. In a further embodiment, the modified cells are capable of long-term engraftment when infused into a subject without myeloablation. In an embodiment of the present invention, the modified cells are delivered to a subject in sufficient numbers that, when engrafted into a human subject, provide long term engraftment.

In embodiments of the present invention, the modified cell or cells are capable of giving rise to progeny cells.

In embodiments of the present invention, the modified cell or cells are capable of giving rise to progeny cells after engraftment.

In embodiments of the present invention, the modified cell or cells are capable of giving rise to progeny cells after an autologous engraftment.

In embodiments of the present invention, the modified cell or cells are capable of giving rise to progeny cells for at least 12 months or at least 24 months after engraftment.

In one embodiment, the cell or cells are stem cells. In one embodiment, the cell is an embryonic stem cell. In some embodiment, the stem cell is a hematopoietic stem/progenitor cell (HSPC).

In embodiments of the present invention, the modified cell or cells are CD34+ hematopoietic stem cells.

In embodiments of the present invention, the modified cell or cells are bone marrow cells or peripheral mononucleated cells (PMCs).

Embodiments of the present invention provide for a modified cell lacking at least a portion of one allele of the ELANE gene.

In embodiments of the present invention, the modified cell was modified from a cell heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095.

Embodiments of the present invention provide for a composition comprising modified cells and a pharmaceutically acceptable carrier.

Embodiments of the present invention provide for an in vitro or ex vivo method of preparing a composition, comprising mixing the cells of the present invention with the pharmaceutically acceptable carrier.

Embodiments of the present invention provide for a method of preparing in vitro or ex vivo a composition comprising modified cells, the method comprising:

a) isolating HSPCs from cells obtained from a subject with an ELANE gene mutation related to SCN or CyN and/or suffering from SCN or CyN and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, and obtaining the cell from the subject;

b) introducing to the cells of step (a) a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene in one or more cells, optionally, introducing to the cells a second RNA molecule comprising a guide sequence portion capable of complexing with a CRISPR nuclease, wherein the complex of the second RNA molecule and CRISPR nuclease affects a second double strand break in the ELANE gene in the one or more cells so as to inactive the mutant allele of the ELANE gene in one or more cells thereby obtaining modified cells; optionally c) culture expanding the modified cells of step (b), wherein the modified cells are capable of engraftment and giving rise to progeny cells after engraftment.

Embodiments of the present invention provide for use of a composition prepared in vitro by a method comprising:

a) isolating HSPCs from cells obtained from a subject with an ELANE gene mutation related to SCN or CyN and/or suffering from SCN or CyN and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095;

b) introducing to the cells of step (a) a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene in one or more cells, optionally, introducing to the cells a second RNA molecule comprising a guide sequence portion capable of complexing with a CRISPR nuclease, wherein the complex of the second RNA molecule and CRISPR nuclease affects a second double strand break in the ELANE gene in the one or more cells so as to inactive the mutant allele of the ELANE gene in one or more cells thereby obtaining modified cells; optionally;

c) culture expanding the cells of step (b) wherein the modified cells are capable of engraftment and giving rise to progeny cells after engraftment; and d) administering to the subject the cells of step (b) or step (c)

for treating the SCN or CyN in the subject.

Embodiments of the present invention provide for a method of treating a subject afflicted with SCN or CyN, comprising administration of a therapeutically effective amount of the modified cells, compositions, or the compositions prepared by the methods of the instant invention Embodiments of the present invention provide for a method for treating SCN or CyN in a subject with an ELANE gene mutation relating to SCN or CYN in need thereof and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising:

a) isolating HSPCs from cells obtained from the subject;

b) introducing to the cells of step (a) a composition comprising:

a CRISPR nuclease or a sequence encoding the CRISPR nuclease; and a first RNA molecule comprising a guide sequence portion having 17-30 nucleotides, wherein a complex of the CRISPR nuclease and the first RNA molecule affects a double strand break in the mutant allele of the ELANE gene in one or more cells, optionally, introducing to the cells a second RNA molecule comprising a guide sequence portion capable of complexing with a CRISPR nuclease, wherein the complex of the second RNA molecule and CRISPR nuclease affects a second double strand break in the ELANE gene in the one or more cells so as to inactive the mutant allele of the ELANE gene in one or more cells thereby obtaining modified cells; optionally;

c) culture expanding the cells of step (b) wherein the modified cells are capable of engraftment and giving rise to progeny cells after engraftment; and d) administering to the subject the cells of step (b) or step (c)

thereby treating the SCN or CyN in the subject.

Embodiments of the present invention provide for a method for treating SCN or CyN in a subject with an ELANE gene mutation relating to SCN or CYN in need thereof and which subject is heterozygous at one or more polymorphic sites selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising administering to the subject autologous modified cells or progeny of autologous modified cells, wherein the autologous modified cells are modified so as to have a double strand break in the mutant allele of the ELANE gene, wherein said double strand break results from introduction to the cells of a composition comprising a CRISPR nuclease or a sequence encoding the CRISPR nuclease and a first RNA molecule wherein a complex of the CRISPR nuclease and the first RNA molecule affects a double strand break in the mutant allele of the ELANE gene so as to inactive the mutant allele of the ELANE gene in the cell, thereby treating the SCN or CyN in the subject.

Embodiments of the present invention provide for a method of selecting a subject for treatment from a pool of subjects diagnosed with SCN or CyN, comprising the steps of:

a) obtaining cells from each subject in the pool of subjects;

b) screening each subject's cells for an ELANE gene mutation related to SCN or CyN, and selecting only subjects with an ELANE gene mutation related to SCN or CyN;

c) screening by sequencing the cells of the subjects selected in step (b) for heterozygosity at one or more polymorphic sites selected from the group consisting of: rs10414837, rs3761005, rs1683564, d) selecting for treatment only subjects with cells heterozygous at the one of more polymorphic sites.

e) obtaining HSPC cells from the bone marrow of the subject either by aspiration or by mobilization and apheresis of peripheral blood; and f) introducing to the HSPC cells of step (e):

one or more CRISPR nucleases or sequences encoding the one or more CRISPR nucleases a first RNA molecule comprising a guide sequence portion having 17-30 nucleotides containing nucleotides in the sequence set forth in any one of SEQ ID NOs: 1-436 targeting the nucleotide base of the heterozygous allele of the one or more polymorphic sites present on the mutant allele of the ELANE gene, and a second RNA molecule comprising a guide sequence portion targeting a sequence in intron 3, intron 4 or 3' UTR of the ELANE gene, wherein a complex of the first RNA molecule and a CRISPR nuclease affects a first double strand break in the mutant allele of the ELANE gene in one or more of the HSPC cells and a complex of the second RNA molecule and a CRISPR nuclease affect a second double strand break in intron 3, intron 4, or 3' UTR of both alleles of the ELANE gene in the one or more HSPC cells in which the complex of the first RNA molecule and the CRISPR nuclease affected a first double strand break, thereby obtaining modified cells;

g) administering to the subject the modified cells of step (0, thereby treating SCN or CyN in the subject.

Embodiments of the present invention provide an RNA molecule comprising a guide sequence portion having 17-30 nucleotides containing nucleotides in the sequence set forth in any one of SEQ ID NOs: 1-436.

Embodiments of the present invention further comprise a second RNA molecule comprising a guide sequence portion.

In embodiments of the present invention, the second RNA molecule targets a non-coding region of the ELANE gene.

In embodiments of the present invention, the nucleotide sequence of the guide sequence portion of the second RNA molecule is a different nucleotide sequence from the sequence of the guide sequence portion of the first RNA molecule.

In embodiments of the present invention, the first RNA molecule further comprise a portion having a sequence which binds to a CRISPR nuclease. In embodiments of the present invention, the second RNA molecule further comprise a portion having a sequence which binds to a CRISPR nuclease.

In embodiments of the present invention, the sequence which binds to a CRISPR nuclease is a tracrRNA sequence.

In embodiments of the present invention, the first RNA molecule further comprises a portion having a tracr mate sequence. In embodiments of the present invention, the second RNA molecule further comprises a portion having a tracr mate sequence.

In embodiments of the present invention, the first RNA molecule further comprises one or more linker portions. In embodiments of the present invention, the second RNA molecule further comprises one or more linker portions.

In embodiments of the present invention, the first RNA molecule is up to 300 nucleotides in length. In embodiments of the present invention, the second RNA molecule is up to 300 nucleotides in length.

In embodiments of the present invention, the composition further comprises one or more CRISPR nucleases or sequences encoding the one or more CRISPR nucleases. In embodiments of the present invention, the composition further comprises one or more tracrRNA molecules or sequences encoding the one or more tracrRNA molecules.

Embodiments of the present invention provide a method for inactivating in a cell a mutant ELANE allele, the method comprising delivering to the cell the RNA molecules or compositions of the present invention.

In embodiments of the present invention, the one or more CRISPR nuclease or sequences encoding the one or more CRISPR nucleases and the RNA molecule or RNA molecules are delivered to the subject and/or cells substantially at the same time or at different times.

In embodiments of the present invention, the tracrRNA molecules or sequences encoding the one or more tracrRNA molecules and the RNA molecule or RNA molecules are delivered to the subject and/or cells substantially at the same time or at different times.

In embodiments of the present invention, the method comprises removing an exon containing a disease-causing mutation from a mutant allele, wherein the first RNA molecule or the first and the second RNA molecules target regions flanking an entire exon or a portion of the exon.

In embodiments of the present invention, the method comprises removing multiple exons, the entire open reading frame of a gene, or removing the entire gene.

In embodiments of the present invention, the first RNA molecule or the first and the second RNA molecules target an alternative splicing signal sequence between an exon and an intron of a mutant allele.

In embodiments of the present invention, the second RNA molecule targets a sequence present in both a mutant allele and a functional allele.

In embodiments of the present invention, the second RNA molecule targets an intron.

In embodiments of the present invention, the method results in subjecting the mutant allele to insertion or deletion by an error prone non-homologous end joining (NHEJ) mechanism, generating a frameshift in the mutant allele's sequence.

In embodiments of the present invention, the frameshift results in inactivation or knockout of the mutant allele.

In embodiments of the present invention, the frameshift creates an early stop codon in the mutant allele or the frameshift results in nonsense-mediated mRNA decay of the transcript of the mutant allele.

In embodiments of the present invention, inactivating or treating results in a truncated protein encoded by the mutant allele and a functional protein encoded by the functional allele.

In embodiments of the present invention, the cells or the subject is heterozygous at rs10414837 or rs3761005 and wherein the complex of the second RNA molecule and CRISPR nuclease affects a double strand break in intron 4 of the ELANE gene.

In embodiments of the present invention, the cells or the subject is heterozygous at rs10414837 or rs3761005 and the complex of the second RNA molecule and CRISPR nuclease affects a double strand break in intron 3 of the ELANE gene.

In embodiments of the present invention, the cells or the subject is heterozygous at rs10414837 or rs3761005 and wherein the complex of the second RNA molecule and CRISPR nuclease affects a double strand break in the 3' UTR region of the ELANE gene.

In embodiments of the present invention, the cells or the subject is heterozygous at rs1683564 and wherein the complex of the second RNA molecule and CRISPR nuclease affects a double strand break in intron 4 of the ELANE gene.

In embodiments of the present invention, the cells or the subject is heterozygous at rs1683564 and wherein the complex of the second RNA molecule and CRISPR nuclease affects a double strand break in intron 3 of the ELANE gene.

In embodiments of the present invention, the cells or the subject is heterozygous at rs1683564 and wherein the complex of the second RNA molecule and CRISPR nuclease affects a double strand break in the 3' UTR region of the ELANE gene.

Embodiments of the present invention provide use of the RNA molecules, the compositions, or the composition prepared by the method of the present invention for inactivating in a cell a mutant ELANE allele.

Embodiments of the present invention provide a medicament comprising the RNA molecules, compositions, or the compositions prepared by the methods of the instant invention for use in inactivating in a cell a mutant ELANE allele, wherein the medicament is administered by delivering to the cell the RNA molecules, compositions, or the compositions prepared by the methods of the instant invention.

Embodiments of the present invention provide for use of the methods, the modified cells, the compositions, or the compositions prepared by the methods, or the RNA molecules of the instant invention for treating ameliorating or preventing SCN or CyN in to a subject having or at risk of having SCN or CyN.

Embodiments of the present invention provide for a medicament comprising the RNA molecules, compositions, compositions prepared by the methods of the instant invention, or the modified cells of the instant invention, for use in treating ameliorating or preventing SCN or CyN, wherein the medicament is administered by delivering to a subject having or at risk of having SCN or CyN the RNA molecules, compositions, compositions prepared by the methods of the instant invention, or the modified cells of the instant invention.

Embodiments of the present invention provide for a kit for inactivating a mutant ELANE allele in a cell, comprising the RNA molecules of the instant invention, a CRISPR nuclease or sequence encoding the CRISPR nuclease, and/or a tracrRNA molecule or sequence encoding the tracrRNA molecule; and instructions for delivering the RNA molecule; CRISPR nuclease or sequence encoding the CRISPR nuclease, and/or the tracrRNA or sequence encoding the tracrRNA molecule to the cell to inactivate the mutant ELANE allele in the cell.

Embodiments of the present invention provide for a kit for treating SCN or CyN in a subject, comprising the RNA molecules of the instant invention, a CRISPR nuclease or sequence encoding the CRISPR nuclease, and/or a tracrRNA molecule or sequence encoding the tracrRNA molecule; and instructions for delivering the RNA molecule; CRISPR nuclease or sequence encoding the CRISPR nuclease, and/or the tracrRNA or sequence encoding the tracrRNA molecule to a subject having or at risk of having SCN or CyN so as to treat the SCN or CyN.

Embodiments of the present invention provide for a kit for inactivating a mutant ELANE allele in a cell, comprising the compositions, the composition prepared by the methods of the instant invention, or the modified cells of the instant invention, and instructions for delivering the composition to the cell so as to inactivate the ELANE gene in the cell.

Embodiments of the present invention provide for a kit for treating SCN or CyN in a subject, comprising the composition, the compositions prepared by the methods of the instant invention, or the modified cells of the instant invention, and instructions for delivering the compositions, the compositions prepared by the methods of the instant invention, or the modified cells of the instant invention, to a subject having or at risk of having SCN or CyN so as to treat SCN or CyN.

DEFINITIONS

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

In the description and claims of the present application, each of the verbs, "comprise," "include" and "have" and conjugates thereof, are used to indicate that the object or objects of the verb are not necessarily a complete listing of components, elements or parts of the subject or subjects of the verb. Other terms as used herein are meant to be defined by their well-known meanings in the art.

As used herein, the term "single nucleotide polymorphism" or "SNP" refers to a single nucleotide position in a genome that differs between paired chromosomes within a population. As used herein the most common or most prevalent nucleotide base at the position is referred to as the reference (REF), wild-type (WT), common, or major form. Less prevalent nucleotide bases at the position are referred to as the alternative (ALT), minor, rare, or variant forms.

More specifically, the term "single nucleotide polymorphism (SNP) position", as used herein, refers to a position in which a single nucleotide DNA sequence variation occurs between members of a species, or between paired chromosomes in an individual. In the case that a SNP position exists at paired chromosomes in an individual, a SNP on one of the chromosomes is a "heterozygous SNP." The term SNP position refers to the particular nucleic acid position where a specific variation occurs and encompasses both a sequence including the variation from the most frequently occurring base at the particular nucleic acid position (also referred to as "SNP" or alternative "ALT") and a sequence including the most frequently occurring base at the particular nucleic acid position (also referred to as reference, or "REF"). Accordingly, the sequence of a SNP position may reflect a SNP (i.e. an alternative sequence variant relative to a consensus reference sequence within a population), or the reference sequence itself.

The "guide sequence portion" of an RNA molecule refers to a nucleotide sequence that is capable of hybridizing to a specific target DNA sequence, e.g., the guide sequence portion has a nucleotide sequence which is fully complementary to the DNA sequence being targeted along the length of the guide sequence portion. In some embodiments, the guide sequence portion is 17, 18, 19, 20, 21, 22, 23, 24, 25, 26, 27, 28, 29 or 0 nucleotides in length, or approximately 17-30, 17-29, 17-28, 17-27, 17-26, 17-25, 17-24, 18-22, 19-22, 18-20, or 17-20 nucleotides in length. The entire length of the guide sequence portion is fully complementary to the DNA sequence being targeted along the length of the guide sequence portion. The guide sequence portion may be part of an RNA molecule that can form a complex with a CRISPR nuclease with the guide sequence portion serving as the DNA targeting portion of the CRISPR complex. When the DNA molecule having the guide sequence portion is present contemporaneously with the CRISPR molecule the RNA molecule is capable of targeting the CRISPR nuclease to the specific target DNA sequence. Each possibility represents a separate embodiment. An RNA molecule can be custom designed to target any desired sequence.

The term "targets" as used herein, refers to the guide sequence portion of the RNA molecule's preferential hybridization to a nucleic acid having a targeted nucleotide sequence. It is understood that the term "targets" encompasses variable hybridization efficiencies, such that there is preferential targeting of the nucleic acid having the targeted nucleotide sequence, but unintentional off-target hybridization in addition to on-target hybridization might also occur. It is understood that where an RNA molecule targets a sequence, a complex of the RNA molecule and a CRISPR nuclease molecule targets the sequence for nuclease activity.

As used herein, the term "targeting sequence" or "targeting molecule" refers a nucleotide sequence or molecule comprising a nucleotide sequence that is capable of hybridizing to a specific target sequence, e.g., the targeting sequence has a nucleotide sequence which is at least partially complementary to the sequence being targeted along the length of the targeting sequence. The targeting sequence or targeting molecule may be part of an RNA molecule that can form a complex with a CRISPR nuclease with the targeting sequence serving as the targeting portion of the CRISPR complex. When the molecule having the targeting sequence is present contemporaneously with the CRISPR molecule the RNA molecule is capable of targeting the CRISPR nuclease to the specific target sequence.

In the context targeting a DNA sequence that is present in a plurality of cells, it is understood that the targeting encompasses hybridization of the guide sequence portion of the RNA molecule with the sequence in one or more of the cells, and also encompasses hybridization of the RNA molecule with the target sequence in fewer than all of the cells in the plurality of cells. Accordingly, it is understood that where an RNA molecule targets a sequence in a plurality of cells, a complex of the RNA molecule and a CRISPR nuclease is understood to hybridize with the target sequence in one or more of the cells, and also may hybridize with the target sequence in fewer than all of the cells. Accordingly, it is understood that the complex of the RNA molecule and the CRISPR nuclease introduces a double strand break in relation to hybridization with the target sequence in one or more cells and may also introduce a double strand break in relation to hybridization with the target sequence in fewer than all of the cells. As used herein, the term "modified cells" refers to cells in which a double strand break is effected by a complex of an RNA molecule and the CRISPR nuclease as a result of hybridization with the target sequence, i.e. on-target hybridization.

The term "non-discriminatory" as used herein refers to a guide sequence portion of an RNA molecule that targets a specific DNA sequence that is common both a mutant and functional allele of a gene In embodiments of the present invention, RNA guide molecule may target the mutant allele based on the nucleotide base present in the polymorphic site on the mutant allele.

In embodiments of the present invention, an RNA molecule comprises a guide sequence portion having 17-30 nucleotides containing nucleotides in the sequence set forth in any one of SEQ ID NOs: 1-436. Accordingly, it is understood that in any of the embodiments of the present invention the guide sequence portion of an RNA molecule may comprise 17-20 contiguous nucleotides set forth in any single sequence of SEQ ID NOs: 1-436, or in any single sequence from the above groups of sequences.

The RNA molecule and or the guide sequence portion of the RNA molecule may contain modified nucleotides. Exemplary modifications to nucleotides or polynucleotides may be synthetic and encompass polynucleotides which contain nucleotides comprising bases other than the naturally occurring adenine, cytosine, thymine, uracil, or guanine bases. Modifications to polynucleotides include polynucleotides which contain synthetic, non-naturally occurring nucleosides e.g., locked nucleic acids. Modifications to polynucleotides may be utilized to increase or decrease stability of an RNA. An example of a modified polynucleotide is an mRNA containing 1-methyl pseudouridine. For examples of modified polynucleotides and their uses, see U.S. Pat. No. 8,278,036, PCT International Publication No. WO/2015/006747, and Weissman and Kariko (2015), hereby incorporated by reference.

As used herein, "contiguous nucleotides" set forth in a SEQ ID NO refers to nucleotides in a sequence of nucleotides in the order set forth in the SEQ ID NO without any intervening nucleotides.

In embodiments of the present invention, the guide sequence portion may be 17-30 nucleotides in length and contain nucleotides in the sequence of any one of SEQ ID NOs: 1-436. In some embodiments of the present invention, the guide sequence portion may be less than 20 nucleotides in length. For example, in embodiments of the present invention the guide sequence portion may be 17, 18, or 19 nucleotides in length. In such embodiments the guide sequence portion may consist of 17, 18, or 19 nucleotides, respectively, in the sequence of 17-20 contiguous nucleotides set forth in any one of SEQ ID NOs: 1-436. For example, a guide sequence portion having 17 nucleotides in the sequence of 17 contiguous nucleotides set forth in SEQ ID NO: 444 may consist of any one of the following nucleotide sequences (nucleotides excluded from the contiguous sequence are marked in strike-through):

(SEQ ID NO: 444)
AAAAAAACACAAUGUGGGGA 17 nucleotide guide sequence 1:
(SEQ ID NO: 445)
~~AAA~~AAAACACAAUGUGGGGA 17 nucleotide guide sequence 2:
(SEQ ID NO: 446)
~~AA~~AAAAACACAAUGUGGGG~~A~~

17 nucleotide guide sequence 3:
(SEQ ID NO: 447)
~~A~~AAAAAACACAAUGUGGG~~GA~~

17 nucleotide guide sequence 4:
(SEQ ID NO: 448)
AAAAAAACACAAUGUGG~~GGA~~

In embodiments of the present invention, the guide sequence portion may be greater than 20 nucleotides in length. For example, in embodiments of the present invention the guide sequence portion may be 21, 22, 23, 24, 25, 26, 27, 28, 29 or 30 nucleotides in length. In such embodiments the guide sequence portion comprises 20 nucleotides in the sequence of 20 contiguous nucleotides set forth in any one of SEQ ID NOs: 1-436 and additional nucleotides fully complimentary to a nucleotide or sequence of nucleotides adjacent to the 3' end of the target sequence, 5' end of the target sequence, or both.

In embodiments of the present invention, a CRISPR nuclease and an RNA molecule comprising a guide sequence portion form a CRISPR complex that binds to a target DNA sequence to effect cleavage of the target DNA sequence. CRISPR nucleases, e.g. Cpf1, may form a CRISPR complex comprising a CRISPR nuclease and RNA molecule without a further tracrRNA molecule. Alternatively, CRISPR nucleases, e.g. Cas9, may form a CRISPR complex between the CRISPR nuclease, an RNA molecule, and a tracrRNA molecule.

In embodiments of the present invention, the RNA molecule may further comprise the sequence of a tracrRNA molecule. Such embodiments may be designed as a synthetic fusion of the guide portion of the RNA molecule and the trans-activating crRNA (tracrRNA). (See Jinek (2012) Science). Embodiments of the present invention may also form CRISPR complexes utilizing a separate tracrRNA molecule and a separate RNA molecule comprising a guide sequence portion. In such embodiments the tracrRNA molecule may hybridize with the RNA molecule via base pairing and may be advantageous in certain applications of the invention described herein.

The term "tracr mate sequence" refers to a sequence sufficiently complementary to a tracrRNA molecule so as to hybridize to the tracrRNA via basepairing and promote the formation of a CRISPR complex. (See U.S. Pat. No. 8,906,616). In embodiments of the present invention, the RNA molecule may further comprise a portion having a tracr mate sequence.

According to embodiments of the present invention, an RNA molecule may be up to 300, 290, 280, 270, 260, 250, 240, 230, 220, 210, 200, 190, 180, 170, 160, 150, 140, 130, 120, 110, or 100 nucleotides in length. Each possibility represents a separate embodiment. In embodiments of the present invention, the RNA molecule may be 17 up to 300 nucleotides in length, 100 up to 300 nucleotides in length, 150 up to 300 nucleotides in length, 200 up to 300 nucleotides in length, 100 to 200 nucleotides in length, or 150 up to 250 nucleotides in length. Each possibility represents a separate embodiment.

A "gene," for the purposes of the present disclosure, includes a DNA region encoding a gene product, as well as all DNA regions which regulate the production of the gene product, whether or not such regulatory sequences are adjacent to coding and/or transcribed sequences. Accordingly, a gene includes, but is not necessarily limited to, promoter sequences, terminators, translational regulatory sequences such as ribosome binding sites and internal ribosome entry sites, enhancers, silencers, insulators, boundary elements, replication origins, matrix attachment sites and locus control regions.

"Eukaryotic" cells include, but are not limited to, fungal cells (such as yeast), plant cells, animal cells, mammalian cells and human cells.

As used herein, the term HSPC refers to both hematopoietic stem cells and hematopoietic stem progenitor cells. Non-limiting examples of stem cells include a bone marrow cell, a myeloid progenitor cell, a multipotent progenitor cell, a lineage restricted progenitor cell.

As used herein, "progenitor cell" refers to a lineage cell that is derived from stem cell and retains mitotic capacity and multipotency (e.g., can differentiate or develop into more than one but not all types of mature lineage of cell). As used herein "hematopoiesis" or "hemopoiesis" refers to the formation and development of various types of blood cells (e.g., red blood cells, megakaryocytes, myeloid cells (e.g., monocytes, macrophages and neutrophil), and lymphocytes) and other formed elements in the body (e.g., in the bone marrow).

The term "nuclease" as used herein refers to an enzyme capable of cleaving the phosphodiester bonds between the nucleotide subunits of nucleic acid. A nuclease may be isolated or derived from a natural source. The natural source may be any living organism. Alternatively, a nuclease may be a modified or a synthetic protein which retains the phosphodiester bond cleaving activity. Gene modification can be achieved using a nuclease, for example a CRISPR nuclease.

In embodiments of the present invention, an RNA molecule is designed to target a heterozygous polymorphic site present in the mutant allele of the ELANE gene, wherein the RNA molecule targets the nucleotide base, REF or ALT, of the heterozygous polymorphic site present in the mutant allele of the ELANE gene The present disclosure provides a method for utilizing at least one naturally occurring nucleotide difference or polymorphism (e.g., single nucleotide polymorphism (SNP)) for distinguishing/discriminating between two alleles of a gene, one allele bearing a mutation such that it encodes a mutated protein causing a disease phenotype ("mutant allele"), and the other allele encoding for a functional protein ("functional allele"). The method further comprises the step of knocking out expression of the mutated protein and allowing expression of the functional protein. In some embodiments, the method is for treating, ameliorating, or preventing a dominant negative genetic disorder.

Embodiments of the present invention provide methods for utilizing at least one heterozygous SNP in a gene expressing a dominant mutant allele in a given cell or subject. In embodiments of the present invention, the SNP utilized may or may not be associated with a disease phenotype. In embodiments of the present invention, an RNA molecule comprising a guide sequence targets the mutant allele of the gene by targeting the nucleotide base present at a heterozygous SNP in the mutant allele of the gene and therefore having a different nucleotide base in the functional allele of the gene.

According to embodiments of the present invention, the first RNA molecule targets a first heterozygous SNP present in an exon or promoter of the ELANE gene wherein the first RNA molecule targets the nucleotide base, REF or ALT, of the first SNP present in the mutant allele of the ELANE gene, and wherein the second RNA molecule targets a second heterozygous SNP present in the same or a different exon or an intron of the ELANE gene wherein the second RNA molecule targets the nucleotide base, REF or ALT, of the second SNP present in the mutant allele of the ELANE gene, or a the second RNA molecule targets a sequence in a non-coding region present in both the mutant or functional allele.

According to embodiments of the present invention, the first RNA molecule or the first and the second RNA molecules target a heterozygous SNP present in the promoter region, the start codon, or the untranslated region (UTR) of the ELANE gene wherein the RNA molecule targets the nucleotide base, REF or ALT, of the SNP present in the mutant allele of the ELANE gene.

According to embodiments of the present invention, the first RNA molecule or the first and the second RNA molecules targets at least a portion of the promoter and/or the start codon and/or a portion of the UTR of the mutant allele of the ELANE gene.

According to embodiments of the present invention, the first RNA molecule targets a portion of the promoter, a first heterozygous SNP present in the promoter of the ELANE gene, or a heterozygous SNP present upstream to the promoter of the ELANE gene and the second RNA molecule targets a second heterozygous SNP, which is present in the ELANE gene downstream of the first heterozygous SNP, and is in the promoter, in the UTR, or in an intron or in an exon of the ELANE gene, wherein the first RNA molecule targets the nucleotide base, REF or ALT, of the first SNP present in the mutant allele of the of the ELANE gene, wherein the second RNA molecule targets the nucleotide base, REF or ALT, of the second SNP present in the mutant allele of the ELANE gene.

According to embodiments of the present invention, the first RNA molecule targets a heterozygous SNP present in the promoter, upstream of the promoter, or the UTR of a the ELANE gene wherein the RNA molecule targets the nucleotide base, REF or ALT, of the SNP present in the mutant allele of the ELANE gene and the second RNA molecule is designed to target a sequence which is present in an intron of both the mutant allele and the functional allele of the ELANE gene.

According to embodiments of the present invention, the first RNA molecule targets a sequence upstream of the promotor which is present in both a mutant and functional allele of the ELANE gene and the second RNA molecule targets a heterozygous SNP present in any location of the of the ELANE gene wherein the second RNA molecule targets the nucleotide base, REF or ALT, of the SNP present in the mutant allele of the ELANE gene.

According to embodiments of the present invention, there is provided a method comprising removing an exon containing a disease-causing mutation from a mutant allele, wherein the first RNA molecule or the first and the second RNA molecules target regions flanking an entire exon or a portion of the exon.

According to embodiments of the present invention, there is provided a method comprising removing multiple exons, the entire open reading frame of a gene, or removing the entire gene.

According to embodiments of the present invention, the first RNA molecule targets a first heterozygous SNP present in an exon or promoter of the ELANE gene, and wherein the second RNA molecule targets a second heterozygous SNP present in the same or a different exon or in an intron of the ELANE gene wherein the second RNA molecule targets the nucleotide base, REF or ALT, of the second SNP present in the mutant allele of the ELANE gene, or the second RNA molecule targets a sequence in an intron present in both the mutant and functional allele of the ELANE gene.

According to embodiments of the present invention, the first RNA molecule or the first and the second RNA molecules target an alternative splicing signal sequence between an exon and an intron of a mutant allele.

According to embodiments of the present invention, the second RNA molecule targets a sequence present in both a mutant allele and a functional allele of the ELANE gene.

According to embodiments of the present invention, the second RNA molecule targets an intron.

According to embodiments of the present invention, there is provided a method comprising subjecting the mutant allele to insertion or deletion by an error prone non-homologous end joining (NHEJ) mechanism, generating a frameshift in the mutant allele's sequence.

According to embodiments of the present invention, the frameshift results in inactivation or knockout of the mutant allele.

According to embodiments of the present invention, the frameshift creates an early stop codon in the mutant allele.

According to embodiments of the present invention, the frameshift results in nonsense-mediated mRNA decay of the transcript of the mutant allele.

According to embodiments of the present invention, the inactivating or treating results in a truncated protein encoded by the mutant allele and a functional protein encoded by the functional allele.

The compositions and methods of the present disclosure may be utilized for treating, preventing, ameliorating, or slowing progression of SCN or CyN.

In some embodiments, a mutant allele is deactivated by delivering to a cell an RNA molecule which targets a heterozygous SNP present in the promoter region, the start codon, or the untranslated region (UTR) of the ELANE gene wherein the RNA molecule targets the nucleotide base, REF or ALT, of the SNP present in the mutant allele of the ELANE gene.

In some embodiments, a mutant allele is inactivated by removing at least a portion of the promoter and/or removing the start codon and/or a portion of the UTR. In some embodiments, the method of deactivating a mutant allele comprises removing at least a portion of the promoter. In such embodiments one RNA molecule may be designed for targeting a first heterozygous SNP present in the promoter or upstream to the promoter of the ELANE gene and another RNA molecule is designed to target a second heterozygous SNP, which is downstream of the first SNP, and is present in the promoter, in the UTR, or in an intron or in an exon of the ELANE gene. Alternatively, one RNA molecule may be designed for targeting a heterozygous SNP present in the promoter, or upstream of the promoter, or the UTR of the ELANE gene and another RNA molecule is designed to target a sequence which is present in an intron of both the mutant allele and the functional allele of the ELANE gene. Alternatively, one RNA molecule may be designed for targeting a sequence upstream of the promotor which is present in both the mutant and functional allele and the other guide is designed to target a heterozygous SNP present in any location of the ELANE gene e.g., in an exon, intron, UTR, or downstream of the promoter of the ELANE gene wherein the RNA molecule targets the nucleotide base, REF or ALT, of the SNP present in the mutant allele of the ELANE gene.

In some embodiments, the method of deactivating a mutant allele comprises an exon skipping step comprising removing an exon containing a disease-causing mutation from the mutant allele. Removing an exon containing a disease-causing mutation in the mutant allele requires two RNA molecules which target regions flanking the entire exon or a portion of the exon. Removal of an exon containing the disease-causing mutation may be designed to eliminate the disease-causing action of the protein while allowing for expression of the remaining protein product which retains some or all of the wild-type activity. As an alternative to single exon skipping, multiple exons, the entire open reading frame or the entire gene can be excised using two RNA molecules flanking the region desired to be excised.

In some embodiments, the method of deactivating a mutant allele comprises delivering two RNA molecules to a cell, wherein one RNA molecule targets a first heterozygous SNP present in an exon or promoter of the ELANE gene wherein the RNA molecule targets the nucleotide base, REF or ALT, of the first SNP present in the mutant allele of the ELANE gene, and wherein the other RNA molecule targets a second heterozygous SNP present in the same or a different exon or in an intron of the ELANE gene wherein the RNA molecule targets the nucleotide base, REF or ALT, of the second SNP present in the mutant allele of the ELANE gene, or the second RNA molecule targets a sequence in an intron present in both the mutant or functional allele.

In some embodiments, an RNA molecule is used to target a CRISPR nuclease to an alternative splicing signal sequence between an exon and an intron of a mutant allele, thereby destroying the alternative splicing signal sequence in the mutant allele.

Any one of, or combination of, the above-mentioned strategies for deactivating a mutant allele may be used in the context of the invention.

Additional strategies may be used to deactivate a mutant allele. For example, in embodiments of the present invention, an RNA molecule is used to direct a CRISPR nuclease to an exon or a splice site of a mutant allele in order to create a double-stranded break (DSB), leading to insertion or deletion of nucleotides by an error-prone non-homologous end-joining (NHEJ) mechanism and formation of a frameshift mutation in the mutant allele. The frameshift mutation may result in: (1) inactivation or knockout of the mutant allele by generation of an early stop codon in the mutant allele, resulting in generation of a truncated protein; or (2) nonsense mediated mRNA decay of the transcript of the mutant allele. In further embodiments, one RNA molecule is used to direct a CRISPR nuclease to a promotor of a mutant allele.

In some embodiments, the method of deactivating a mutant allele further comprises enhancing activity of the functional protein such as by providing a protein/peptide, a nucleic acid encoding a protein/peptide, or a small molecule such as a chemical compound, capable of activating/enhancing activity of the functional protein.

According to some embodiments, the present disclosure provides an RNA molecule which binds to/associates with and/or directs the RNA guided DNA nuclease e.g., CRISPR nuclease to a sequence comprising at least one nucleotide which differs between a mutant allele and a functional allele (e.g., heterozygous SNP) of a gene of interest (i.e., a sequence of the mutant allele which is not present in the functional allele).

In some embodiments, the method comprises the steps of: contacting a mutant allele of a gene of interest with an allele-specific RNA molecule and a CRISPR nuclease e.g., a Cas9 protein, wherein the allele-specific RNA molecule and the CRISPR nuclease e.g., Cas9 associate with a nucleotide sequence of the mutant allele of the gene of interest which differs by at least one nucleotide from a nucleotide sequence of a functional allele of the gene of interest, thereby modifying or knocking-out the mutant allele.

In some embodiments, the allele-specific RNA molecule and a CRISPR nuclease is introduced to a cell encoding the gene of interest. In some embodiments, the cell encoding the gene of interest is in a mammalian subject. In some embodiments, the cell encoding the gene of interest is in a plant.

In some embodiments, the cleaved mutant allele is further subjected to insertion or deletion (indel) by an error prone non-homologous end joining (NHEJ) mechanism, generating a frameshift in the mutant allele's sequence. In some embodiments, the generated frameshift results in inactivation or knockout of the mutant allele. In some embodiments, the generated frameshift creates an early stop codon in the mutant allele and results in generation of a truncated protein. In such embodiments, the method results in the generation of a truncated protein encoded by the mutant allele and a functional protein encoded by the functional allele. In some embodiments, a frameshift generated in a mutant allele using the methods of the invention results in nonsense-mediated mRNA decay of the transcript of the mutant allele.

In some embodiments, the mutant allele is an allele of the "elastase, neutrophil expressed" gene (ELANE gene). In some embodiments, the RNA molecule targets a heterozygous SNP of the ELANE gene which co-exists with/is genetically linked to the mutated sequence associated with SCN or CyN genetic disorder. In some embodiments, the RNA molecule targets a heterozygous SNP of the ELANE gene, wherein the heterozygosity of said SNP is highly prevalent in the population. In embodiments of the present invention, the REF nucleotide is prevalent in the mutant allele and not in the functional allele of an individual subject to be treated. In embodiments of the present invention, the ALT nucleotide is prevalent in the mutant allele and not in the functional allele of an individual subject to be treated. In some embodiments, a disease-causing mutation within a mutant ELANE allele is targeted.

In embodiments of the present invention, the heterozygous SNP may or may not be associated with an ELANE related disease phenotype. In embodiments of the present invention, the heterozygous SNP is associated with an ELANE related disease phenotype. In embodiments of the present invention, the SNP is not associated with an ELANE related disease phenotype In some embodiments, the heterozygous SNP is within an exon of the gene of interest. In such embodiments, a guide sequence portion of an RNA molecule may be designed to target the exon of the gene of interest.

In some embodiments, a heterozygous SNP is within an intron or an exon of the gene of interest. In some embodiments, a heterozygous SNP is in a splice site between the intron and the exon. In some embodiments a heterozygous SNP is in a PAM site of the gene of interest.

A skilled artisan will appreciate that in each of the embodiments of the present invention, individually, each of the RNA molecules of the present invention are capable of complexing with a nuclease, e.g. a CRISPR nuclease, such as to associate with a target genomic DNA sequence of interest next to a protospacer adjacent motif (PAM). The nuclease then mediates cleavage of target DNA to create a double-stranded break within the protospacer. Accordingly, in embodiments of the present invention, the guide sequences and RNA molecules of the present invention may target a location 1, 2, 3, 4, 5, 6, 7, 8, 9, 10, 11, 12, 13, 14, 15, 16, 17, 18, 19, 20, 21, 22, 23, 24, 25, 26, 27, or 28 nucleotides upstream or downstream from a PAM site.

Therefore, in embodiments of the present invention, the RNA molecules of the present invention in complex with a nuclease, e.g., a CRISPR nuclease, may affect a double strand break in an allele of a gene 1, 2, 3, 4, 5, 6, 7, 8, 9, 10, 11, 12, 13, 14, 15, 16, 17, 18, 19, 20, 21, 22, 23, 24, 25, 26, 27, 28 upstream or downstream from a target site. A skilled artisan will appreciate that where a heterozygous polymorphic site is present and is used to define the target, an RNA molecule may be designed to target and affect a double stranded break in only the REF or ALT nucleotide base of the heterozygous polymorphic site.

Where the heterozygous polymorphic site is within the PAM site, it is understood that the RNA molecule may be designed to target a sequence 1, 2, 3, 4, 5, 6, 7, 8, 9, 10, 11, 12, 13, 14, 15, 16, 17, 18, 19, 20, 21, 22, 23, 24, 25, 26, 27, or 28 nucleotides upstream or downstream from the PAM site, and a complex of the RNA molecule and nuclease is designed to target only one of the REF or ALT nucleotide base of the heterozygous polymorphic site in the PAM site and effect a break in the PAM site, e.g. the tracrRNA is designed to target one of the REF or ALT nucleotide base of the heterozygous polymorphic site.

In embodiments of the present invention, an RNA molecule is designed to target a heterozygous polymorphic site present in the ELANE gene, wherein the RNA molecule and/or the complex of the RNA molecule and a CRISPR nuclease targets the nucleotide base, REF or ALT, of the heterozygous polymorphic site present in the mutant allele of the ELANE gene In embodiments of the present invention, the RNA molecules, compositions, methods, cells, kits, or medicaments are utilized for treating a subject having a disease phenotype resulting from the heterozygote ELANE gene. In embodiments of the present invention, the disease is SCN or CyN. In such embodiments, the method results in improvement, amelioration or prevention of the disease phenotype.

In embodiments of the present invention, the RNA molecules, compositions, methods, cells, kits, or medicaments of the present invention are utilized in combination with a second therapy for SCN or CyN to treat the subject. In embodiments of the present invention, the RNA molecules, compositions, methods, kits, or medicaments of the present invention are administered prior to administration of the second therapy, during administration of the second therapy, and/or after administration of the second therapy.

In embodiments of the present invention, the RNA molecules, compositions, methods, cells, kits, or medicaments of the present invention are administered in combination with Granulocyte colony-stimulating factor (G-CSF) therapy.

Embodiments referred to above refer to a CRISPR nuclease, RNA molecule(s), and tracrRNA being effective in a subject or cells at the same time. The CRISPR, RNA molecule(s), and tracrRNA can be delivered substantially at the same time or can be delivered at different times but have effect at the same time. For example, this includes delivering the CRISPR nuclease to the subject or cells before the RNA molecule and/or tracr RNA is substantially extant in the subject or cells.

According to embodiments of the present invention, there is provided a method for inactivating in a cell a mutant allele of the ELANE gene, the method comprising the steps of:

a) selecting a cell with an ELANE gene mutation associated with SCN or CyN and who is heterozygous at one or more polymorphic sites in the ELANE gene selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095;

b) introducing to the cell a composition comprising:
 a CRISPR nuclease or sequence encoding the CRISPR nuclease, and
 a first RNA molecule comprising a guide sequence portion having 17-30 nucleotides, wherein a complex of the CRISPR nuclease and the first RNA molecule affects a double strand break in the mutant allele of the ELANE gene and not in the functional allele of the ELANE gene in the cell;

thereby inactivating the mutant allele of the ELANE gene in the cell.

According to embodiments of the present invention, there is provided a method for inactivating in a cell a mutant allele of the ELANE gene, the method comprising the steps of:

a) selecting a cell with an ELANE gene mutation associated with SCN or CyN and who is heterozygous at one or more polymorphic sites in the ELANE gene selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095;

b) introducing to the cell a composition comprising:
 a CRISPR nuclease or sequence encoding the CRISPR nuclease, and
 a first RNA molecule comprising a guide sequence portion having 17-30 nucleotides, wherein a complex of the CRISPR nuclease and the first RNA molecule affects a double strand break in the mutant allele of the ELANE gene and not in the functional allele of the ELANE gene in the cell;

and wherein the method further comprises introduction of a second RNA molecule comprising a guide sequence portion capable of complexing with a CRISPR nuclease, wherein the complex of the second RNA molecule and the CRISPR nuclease affects a second double strand break in the ELANE gene;

thereby inactivating the mutant allele of the ELANE gene in the cell.

According to embodiments of the present invention, there is provided a method for inactivating in a cell a mutant allele of the ELANE gene having a mutation associated with SCN or CyN and which cell is heterozygous at one or more polymorphic sites in the ELANE gene selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising introducing to the cell a composition comprising:
 a CRISPR nuclease or sequence encoding the CRISPR nuclease, and
 a first RNA molecule comprising a guide sequence portion having 17-30 nucleotides, wherein a complex of the CRISPR nuclease and the first RNA molecule affects a double strand break in the mutant allele of the ELANE gene;

thereby inactivating the mutant allele of the ELANE gene in the cell.

According to embodiments of the present invention, there is provided a method for inactivating in a cell a mutant allele of the ELANE gene with an ELANE gene mutation associated with SCN or CyN and heterozygous at one or more polymorphic sites in the ELANE gene selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095, the method comprising:

introducing to the cell a composition comprising:

a CRISPR nuclease or sequence encoding the CRISPR nuclease, and a first RNA molecule comprising a guide sequence portion having 17-30 nucleotides, wherein a complex of the CRISPR nuclease and the first RNA molecule affects a double strand break in the mutant allele of the ELANE gene;

and wherein the method further comprises introduction of a second RNA molecule comprising a guide sequence portion capable of complexing with a CRISPR nuclease, wherein the complex of the second RNA molecule and CRISPR nuclease affects a second double strand break in the ELANE gene;

thereby inactivating the mutant allele of the ELANE gene in the cell.

In embodiments of the present invention, a complex of the CRISPR nuclease and the first RNA molecule affects a double strand break in the mutant allele of the ELANE gene and not in the functional allele of the ELANE gene in the cell.

In embodiments of the present invention, the cell is also heterozygous at least one additional polymorphic site in the ELANE gene selected from the group consisting of rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095.

In embodiments of the present invention, a cell with an ELANE gene mutation associated with SCN or CyN may be from a subject with the ELANE gene mutation and/or afflicted with SCN or CyN. Accordingly, selecting a cell with an ELANE gene mutation may comprise selecting a subject with the ELANE gene mutation. In further embodiments of the present invention, selecting a cell may comprise selecting a cell from a subject with the ELANE gene mutation. In embodiments of the present invention, introducing the compositions of the subject invention to the cell may comprise introducing the compositions of the invention to the cell of a subject afflicted with the ELANE gene mutation.

Accordingly, in embodiments of the present invention, there is provided a method for inactivating in a cell a mutant allele of the ELANE gene of a subject, the method comprising the step of selecting a subject with an ELANE gene mutation resulting in SCN or CyN and who is heterozygous at one or more polymorphic sites in the ELANE gene selected from the group consisting of: rs10424470, rs4807932, rs10414837, rs376107533, rs3761010, rs10413889, rs3761007, rs10409474, rs3761005, rs351107, rs3761001, rs740021, rs781452480, rs371057361, rs570466264, rs1041904080, rs7250194, rs17216649, rs199720952, rs6510983, rs17223066, rs7255385, rs112639467, rs141213775, rs28591229, rs10469327, rs3834645, rs1683564, rs71335276, and rs8107095.

Accordingly, embodiments of the present invention encompass the screening of subjects or cells for the ELANE gene. A person having ordinary skill in the art would readily understand methods of screening for mutations within the ELANE gene in the art, by way of non-limiting examples, e.g., sequencing-by-synthesis, Sanger sequencing, karyotyping, Fluorescence In situ Hybridization, and/or microarray testing. In embodiments of the present invention, mutations within the ELANE gene are screened by exon sequencing.

In embodiments of the present invention, the subject is or has been diagnosed with SCN or CyN by measuring the absolute neutrophil count (ANC) in peripheral blood. In embodiments of the present invention, SCN is or was diagnosed before the subject reaches the age 6 months. In embodiments of the present invention, CyN is or was diagnosed between the ages of 12 and 24 months, or after the age of 24 months. In embodiments of the present invention, SCN or Cyn is diagnosed by one or more of recurrent acute stomatologic disorders. In embodiments of the present invention, SCN or CyN is diagnosed by bone marrow examination, preferably the bone marrow examination is a cytogenetic bone marrow study. In embodiments of the present invention, SCN or CyN is diagnosed by one or more of: antineutrophil antibody assay, immunoglobulin assay (Ig GAM), lymphocyte immunophenotyping, pancreatic markers (serum trypsinogen and fecal elastase) and liposoluble vitamin levels (vitamins A, E and D). It is understood that any diagnostic method may be used with any other diagnostic method.

In embodiments of the present invention, a subject diagnosed with SCN or CyN is screened by Exon sequencing to identify an ELANE pathogenic mutation in the ELANE gene. In further embodiments the subject is screened by Sanger sequencing to confirm heterozygocity of at least one SNP in Table 1. In embodiments of the present invention, the SNP is one of rs1683564, rs10414837, and rs3761005. In embodiments of the present invention, the nucleotide of the heterozygous SNP on the mutant allele of the ELANE gene determined using BAC bio. In embodiments of the present invention, the guides selected are introduced to cells, e.g. PBMCs, obtained from the subject and reduction in the pathogenic ELANE mutation in the cells is measured by, e.g. Next Generation Sequencing.

It is understood that the CRISPR/Cas9 gene editing system enables targeting the nuclease to a target site in a sequence specific manner to address disease-causing mutations. Hematopoietic stem and progenitor cells (HSPCs) have therapeutic potential because of their ability to both self-renew and differentiate (Yu, Natanson, and Dunbar 2016). Accordingly, embodiments of the present invention apply genome editing to HSPCs.

In embodiments of the present invention, an autologous therapy and utilizes autologous CD34+ hematopoietic stem cells from patients diagnosed with SCN or CyN which are edited with CRISPR/Cas9. In embodiments of the present invention, CD34+ cells are isolated from bone marrow or peripheral blood mononucleated cells (PBMCs) following patient apheresis.

In the case of dominant negative (or compound heterozygous) indications, such as SCN or CyN, the strategy is to edit the mutant allele and avoid cleavage in the non-mutant allele or other off targets by targeting a heterozygous SNP sequence.

Embodiments of the present invention may include the following steps:

selection of a patient diagnosed with SCN or CyN identified as exhibiting heterozygosity in at least one of the SNPs of Table 1 hereinbelow. In embodiments of the present invention, the subject is heterozygous at rs10414837, rs3761005, or rs1683564;

selection of a therapeutic strategy based on the identified heterozygous SNP position of the candidate patient;

obtaining HSPC cells from the bone marrow of the subject either by aspiration or by mobilization and apheresis of peripheral blood, optionally, the HSPC cells are processed (e.g., enriched, stimulated, both);

introducing into the HSPC cells (e.g., by ex vivo electroporation) a composition comprising:

a CRISPR nuclease or a sequence encoding the same (e.g., mRNA), a discriminatory RNA molecule that targets a particular sequence in the identified heterozygous SNP position of the mutant allele (REF/ALT sequence), and a non-discriminatory RNA molecule targeting a sequence in intron 3, intron 4 or 3' UTR, which is common to both the mutant allele and the other allele, thereby editing the HSPC cells to knockout expression of mutant ELANE allele; and introducing the edited HSPC to the candidate patient.

In embodiments of the present invention, CD34+ cells may be isolated from bone marrow or peripheral blood mononucleated cells (PBMCs) following patient apheresis. Bone marrow or PBMCs may be collected from the patient by apheresis following HSPC mobilization. In embodiments of the invention the apheresis product may be washed to remove platelets and a CD34+ cell population may be enriched via purification using, e.g. a CliniMACS system (Miltenyi Biotec). In embodiments of the present invention, the selected cells may be prestimulated ex vivo, e.g. with a mixture of recombinant human cytokines. In embodiments of the present invention, the cells may undergo electroporation. In embodiments of the present invention, prior to electroporation, stimulated cells (e.g. CD34+ cells), the CRISPR nuclease mRNA and gRNA may be preincubated under defined conditions. In embodiments of the present invention, the cells are electroporated ex vivo with the CRISPR nuclease mRNA/gRNA mixture or with a preassembled RNPs (Ribonuclease protein of the CRISPR nuclease protein and gRNA), followed by cell washing. In embodiments of the present invention, the cells are suspended into a final formulation. In embodiments of the present invention, the cells may be resuspended. In embodiments of the present invention, the resuspended cells may be filled into bags for infusion. In embodiments of the present invention, the bags may be frozen using a freeze down step in a controlled rate freezer and/or stored in the vapor phase of liquid nitrogen. In embodiments of the present invention, the product may be administered by intravenous (IV) administration to a patient.

Dominant Genetic Disorders

One of skill in the art will appreciate that all subjects with any type of heterozygote genetic disorder (e.g., dominant genetic disorder) may be subjected to the methods described herein. In one embodiment, the present invention may be used to target a gene involved in, associated with, or causative of dominant genetic disorders such as, for example, SCN or CyN. In some embodiments, the dominant genetic disorder is SCN or CyN. In some embodiments, the target gene is the ELANE gene.

CRISPR Nucleases and PAM Recognition

In some embodiments, the sequence specific nuclease is selected from CRISPR nucleases, or a functional variant thereof. In some embodiments, the sequence specific nuclease is an RNA guided DNA nuclease. In such embodiments, the RNA sequence which guides the RNA guided DNA nuclease (e.g., Cpf1) binds to and/or directs the RNA guided DNA nuclease to the sequence comprising at least one nucleotide which differs between a mutant allele and its counterpart functional allele (e.g., SNP). In some embodiments, the CRISPR complex does not further comprise a tracrRNA. In a non-limiting example, in which the RNA guided DNA nuclease is a CRISPR protein, the at least one nucleotide which differs between the dominant mutant allele and the functional allele may be within the PAM site and/or proximal to the PAM site within the region that the RNA molecule is designed to hybridize to. A skilled artisan will appreciate that RNA molecules can be engineered to bind to a target of choice in a genome by commonly known methods in the art.

In embodiments of the present invention, a type II CRISPR system utilizes a mature crRNA:tracrRNA complex directs a CRISPR nuclease, e.g. Cas9, to the target DNA via Watson-Crick base-pairing between the crRNA and the protospacer on the target DNA next to the protospacer adjacent motif (PAM), an additional requirement for target recognition. The CRISPR nuclease then mediates cleavage of target DNA to create a double-stranded break within the protospacer. A skilled artisan will appreciate that each of the engineered RNA molecule of the present invention is further designed such as to associate with a target genomic DNA sequence of interest next to a protospacer adjacent motif (PAM), e.g., a PAM matching the sequence relevant for the type of CRISPR nuclease utilized, such as for a non-limiting example, NGG or NAG, wherein “N” is any nucleobase, for *Streptococcus pyogenes* Cas9 WT (SpCAS9); NNGRRT for *Staphylococcus aureus* (SaCas9); NNNVRYM for *Jejuni* Cas9 WT; NGAN or NGNG for SpCas9-VQR variant; NGCG for SpCas9-VRER variant; NGAG for SpCas9-EQR variant; NNNNGATT for *Neisseria meningitidis* (NmCas9); or TTTV for Cpf1. RNA molecules of the present invention are each designed to form complexes in conjunction with one or more different CRISPR nucleases and designed to target polynucleotide sequences of interest utilizing one or more different PAM sequences respective to the CRISPR nuclease utilized.

In some embodiments, an RNA-guided DNA nuclease e.g., a CRISPR nuclease, may be used to cause a DNA break at a desired location in the genome of a cell. The most commonly used RNA-guided DNA nucleases are derived from CRISPR systems, however, other RNA-guided DNA nucleases are also contemplated for use in the genome editing compositions and methods described herein. For instance, see U.S. Patent Publication No. 2015-0211023, incorporated herein by reference.

CRISPR systems that may be used in the practice of the invention vary greatly. CRISPR systems can be a type I, a type II, type III, or type V system. Non-limiting examples of suitable CRISPR proteins include Cas3, Cas4, Cas5, Cas5e (or CasD), Cas6, Cas6e, Cas6f, Cas7, Cas8a1, Cas8a2, Cas8b, Cas8c, Cas9, Cas10, Cas12a, Cas12b, Cas12c, Cas12d, Cas12d, Casl Od, CasF, CasG, CasH, Csy1, Csy2, Csy3, Cse1 (or CasA), Cse2 (or CasB), Cse3 (or CasE), Cse4 (or CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csz1, Csx15, Csf1, Csf2, Csf3, Csf4, and Cul966. (See, e.g., Koonin 2017).

In some embodiments, the RNA-guided DNA nuclease is a CRISPR nuclease derived from a type II CRISPR system (e.g., Cas9). The CRISPR nuclease may be derived from *Streptococcus pyogenes, Streptococcus thermophilus, Streptococcus* sp., *Staphylococcus aureus, Neisseria meningitidis, Treponema denticola, Nocardiopsis dassonvillei, Strep-*

*tomyces pristinaespiralis, Streptomyces viridochromogenes, Streptomyces viridochromogenes, Streptosporangiurn roseurn, Streptosporangiurn roseum, Alicyclobacillus acidocaldarius, Bacillus pseudomycoides, Bacillus selenitireducens, Exiguobacterium sibiricum, Lactobacillus delbrueckii, Lactobacillus salivarius, Microscilla marina, Burkholderiales bacterium, Polaromonas naphthalenivorans, Polaromonas* sp., *Crocosphaera watsonii, Cyanothece* sp., *Microcystis aeruginosa, Synechococcus* sp., *Acetohalobium arabaticum, Ammonifex degensii, Caldicelulosiruptor becscii, Candidatus Desulforudis, Clostridium botulinum, Clostridium Finegoldia magna, Natranaerobius thermophilus, Pelotomaculumthermopropionicum, Acidithiobacillus caldus, Acidithiobacillus ferrooxidans, Allochromatium vinosum, Marinobacter* sp., *Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc* sp., *Arthrospira maxima, Arthrospira platensis, Arthrospira* sp., *Lyngbya* sp., *Microcoleus chthonoplastes, Oscillatoria* sp., *Petrotoga mobilis, Thermosipho africanus, Acaryochloris marina, Francisella* cf *novicida* Fx1, *Alicyclobacillus acidoterrestris, Oleiphilus* sp., *Bacterium* CG09_39_24, *Deltaproteobacteria bacterium*, or any species which encodes a CRISPR nuclease with a known PAM sequence. CRISPR nucleases encoded by uncultured bacteria may also be used in the context of the invention. (See Burstein et al. Nature, 2017). Variants of CRIPSR proteins having known PAM sequences e.g., spCas9 D1135E variant, spCas9 VQR variant, spCas9 EQR variant, or spCas9 VRER variant may also be used in the context of the invention.

Thus, an RNA guided DNA nuclease of a CRISPR system, such as a Cas9 protein or modified Cas9 or homolog or ortholog of Cas9, or other RNA guided DNA nucleases belonging to other types of CRISPR systems, such as Cpf1 and its homologs and orthologs, may be used in the compositions of the present invention.

In certain embodiments, the CRIPSR nuclease may be a "functional derivative" of a naturally occurring Cas protein. A "functional derivative" of a native sequence polypeptide is a compound having a qualitative biological property in common with a native sequence polypeptide. "Functional derivatives" include, but are not limited to, fragments of a native sequence and derivatives of a native sequence polypeptide and its fragments, provided that they have a biological activity in common with a corresponding native sequence polypeptide. A biological activity contemplated herein is the ability of the functional derivative to hydrolyze a DNA substrate into fragments. The term "derivative" encompasses both amino acid sequence variants of polypeptide, covalent modifications, and fusions thereof. Suitable derivatives of a Cas polypeptide or a fragment thereof include but are not limited to mutants, fusions, covalent modifications of Cas protein or a fragment thereof. Cas protein, which includes Cas protein or a fragment thereof, as well as derivatives of Cas protein or a fragment thereof, may be obtainable from a cell or synthesized chemically or by a combination of these two procedures. The cell may be a cell that naturally produces Cas protein, or a cell that naturally produces Cas protein and is genetically engineered to produce the endogenous Cas protein at a higher expression level or to produce a Cas protein from an exogenously introduced nucleic acid, which nucleic acid encodes a Cas that is same or different from the endogenous Cas. In some cases, the cell does not naturally produce Cas protein and is genetically engineered to produce a Cas protein.

In some embodiments, the CRISPR nuclease is Cpf1. Cpf1 is a single RNA-guided endonuclease which utilizes a T-rich protospacer-adjacent motif. Cpf1 cleaves DNA via a staggered DNA double-stranded break. Two Cpf1 enzymes from Acidaminococcus and Lachnospiraceae have been shown to carry out efficient genome-editing activity in human cells. (See Zetsche et al. (2015) Cell).

Thus, an RNA guided DNA nuclease of a Type II CRISPR System, such as a Cas9 protein or modified Cas9 or homologs, orthologues, or variants of Cas9, or other RNA guided DNA nucleases belonging to other types of CRISPR systems, such as Cpf1 and its homologs, orthologues, or variants, may be used in the present invention.

In some embodiments, the guide molecule comprises one or more chemical modifications which imparts a new or improved property (e.g., improved stability from degradation, improved hybridization energetics, or improved binding properties with an RNA guided DNA nuclease). Suitable chemical modifications include, but are not limited to one or more of: modified bases, modified sugar moieties, or modified inter-nucleoside linkages. Non-limiting examples of suitable chemical modifications include: 4-acetylcytidine, 5-(carboxyhydroxymethyl)uridine, 2'-O-methylcytidine, 5-carboxymethylaminomethyl-2-thiouridine, carboxymethylaminomethyluridine, dihydrouridine, 2'-O-methylpseudouridine, "beta, D-galactosylqueuosine", 2'-O-methylguanosine, inosine, N6-isopentenyladenosine, 1-methyladenosine, ethylpseudouridine, 1-methylguanosine, 1-methylinosine, "2,2-dimethylguanosine", 2-methyladenosine, 2-methylguanosine, 3-methylcytidine, 5-methylcytidine, N6-methyladenosine, 7-methylguanosine, 5-methylaminomethyluridine, 5-methoxyaminomethyl-2-thiouridine, "beta, D-mannosylqueuosine", 5-methoxycarbonylmethyl-2-thiouridine, 5-methoxycarbonylmethyluridine, 5-methoxyuridine, 2-methylthio-N6-isopentenyladenosine, N-((9-beta-D-ribofuranosyl-2-methylthiopurine-6-yl)carbamoyl)threonine, N-((9-beta-D-ribofuranosylpurine-6-yl)N-methylcarbamoyl)threonine, uridine-5-oxyacetic acid-methylester, uridine-5-oxyacetic acid, wybutoxosine, queuosine, 2-thiocytidine, 5-methyl-2-thiouridine, 2-thiouridine, 4-thiouridine, 5-methyluridine, N-((9-beta-D-ribofuranosylpurine-6-yl)-carbamoyl)threonine, 2'-O-methyl-5-methyluridine, 2'-O-methyluridine, wybutosine, "3-(3-amino-3-carboxy-propyl)uridine, (acp3) u", 2'-0-methyl (M), 3'-phosphorothioate (MS), 3'-thioPACE (MSP), pseudouridine, or 1-methyl pseudo-uridine. Each possibility represents a separate embodiment of the present invention.

Further non-limiting examples of suitable chemical modifications include: m'A (1-methyladenosine); $m^2A$ (2-methyladenosine); Am (2'-O-methyladenosine); $ms^2$ $m^6A$ (2-methylthio-$N^6$-methyladenosine); $i^6A$ ($N^6$-isopentenyladenosine); $ms^2i6A$ (2-methylthio-$N^6$isopentenyladeno sine); $io^6A$ ($N^6$-(cis-hydroxyisopentenyl)adenosine); $ms^2io^6A$ (2-methylthio-$N^6$-(cis-hydroxyisopentenyl) adenosine); $g^6A$ ($N^6$-glycinylcarbamoyladenosine); $t^6A$ ($N^6$-threonylcarbamoyladenosine); $ms^2t^6A$ (2-methylthio-$N^6$-threonyl carbamoyladenosine); $m^6t^6A$ ($N^6$-methyl-$N^6$-threonylcarbamoyladenosine); $hn^6A$($N^6$-hydroxynorvalylcarbamoyladenosine); $ms^2hn^6A$ (2-methylthio-$N^6$-hydroxynorvalyl carbamoyladenosine); Ar(p) (2'-O-ribosyladenosine (phosphate)); I (inosine); $m^II$ (1-methylinosine); $m^IIm$ (1,2'-O-dimethylinosine); $m^3C$ (3-methylcytidine); Cm (2'-O-methylcytidine); $s^2C$ (2-thiocytidine); $ac^4C$ ($N^4$-acetylcytidine); $f^5C$ (5-formylcytidine); $m^5Cm$ (5,2'-O-dimethylcytidine); $ac^4Cm$ ($N^4$-acetyl-2'-O-methylcytidine); $k^2C$ (lysidine); $m^1G$ (1-methylguanosine); $m^2G$ ($N^2$-methylguanosine); $m^7G$ (7-methylguanosine); Gm (2'-O-methylguanosine); $m^2$ 2 G ($N^2$,$N^2$-dimethylguanosine); $m^2Gm$ ($N^{2,2'}$-O-dimethylguanosine); $m^2$ 2 Gm ($N^2$,$N^2$, 2'-O-trimethylguanosine); Gr(p) (2'-O-ribosylguanosine (phosphate)); yW (wybutosine); $o_2yW$ (peroxywybutosine); OHyW (hydroxywybutosine); OHyW* (undermodified hydroxywybutosine); imG (wyosine); mimG (methylwyosine); Q (queuosine); oQ (epoxyqueuosine); galQ (galactosyl-queuosine); manQ (mannosyl-queuosine); $preQ_0$ (7-cyano-7-deazaguanosine); $preQ_1$(7-aminomethyl-7-deazaguanosine); $G^+$ (archaeosine); D (dihydrouridine); $m^5Um$ (5,2'-O-dimethyluridine); $s^4U$ (4-thiouridine); $m^5s^2U$ (5-methyl-2-thiouridine); $s^2Um$ (2-thio-2'-O-methyluridine); $acp^3U$ (3-(3-amino-3-carboxypropyl)uridine); $ho^5U$ (5-hydroxyuridine); $mo^5U$ (5-methoxyuridine); $cmo^5U$ (uridine 5-oxyacetic acid); $mcmo^5U$ (uridine 5-oxyacetic acid methyl ester); $chm^5U$ (5-(carboxyhydroxymethyl)uridine)); $mchm^5U$ (5-(carboxyhydroxymethyl)uridine methyl ester); $mcm^5U$ (5-methoxycarbonylmethyluridine); $mcm^5Um$ (5-methoxycarbonylmethyl-2'-O-methyluridine); $mcm^5s^2U$ (5-methoxycarbonylmethyl-2-thiouridine); $nm^5S^2U$ (5-aminomethyl-2-thiouridine); $mnm^5U$ (5-methylaminomethyluridine); $mnm^5s^2U$ (5-methylaminomethyl-2-thiouridine); $mnm^5se^2U$ (5-methylaminomethyl-2-selenouridine); $ncm^5U$ (5-carbamoylmethyluridine); $ncm^5Um$ (5-carbamoylmethyl-2'-O-methyluridine); $cmnm^5U$ (5-carboxymethylaminomethyluridine); $cmnm^5Um$ (5-carboxymethylaminomethyl-2'-O-methyluridine); $cmmm^5s^2U$ (5-carboxymethylaminomethyl-2-thiouridine); dimethyladenosine); Im (2'-O-methylinosine); $m^4C$ ($N^4$-methylcytidine); $m^4Cm$ ($N^4$,2'-O-dimethylcytidine); $hm^5C$ (5-hydroxymethylcytidine); $m^3U$ (3-methyluridine); $cm^5U$ (5-carboxymethyluridine); $m^6Am$ ($N^6$,2'-O-dimethyladenosine); $m^6$ 2 Am ($N^6$,$N^6$,O-2'-trimethyladenosine); $m^{2,7}G$ ($N^2$,7-dimethylguanosine); m2,2,7G ($N^2$,$N^2$,7-trimethylguanosine); $m^3Um$ (3,2'-O-dimethyluridine); $m^5D$ (5-methyldihydrouridine); $f^5Cm$ (5-formyl-2'-O-methylcytidine); $m^1Gm$ (1,2'-O-dimethylguanosine); m'Am (1,2'-O-dimethyladenosine); $\tau m^5U$ (5-taurinomethyluridine); $\tau m^5s^2U$ (5-taurinomethyl-2-thiouridine)); imG-14 (4-demethylwyosine); imG2 (isowyosine); or $ac^6A$ ($N^6$-acetyladenosine). Each possibility represents a separate embodiment of the present invention. (See e.g. U.S. Pat. No. 9,750,824).

Guide Sequences which Specifically Target a Mutant Allele

A given gene may contain thousands of SNPs. Utilizing a 24 base pair target window for targeting each SNP in a gene would require hundreds of thousands of guide sequences. Any given guide sequence when utilized to target a SNP may result in degradation of the guide sequence, limited activity, no activity, or off-target effects. Accordingly, suitable guide sequences are necessary for targeting a given gene. By the present invention, a novel set of guide sequences have been identified for knocking out expression of a mutated protein, inactivating a mutant ELANE gene allele, and treating SCN or CyN.

The present disclosure provides guide sequences capable of specifically targeting a mutant allele for inactivation while leaving the functional allele unmodified. The guide sequences of the present invention are designed to, and are most likely to, specifically differentiate between a mutant allele and a functional allele. Of all possible guide sequences which target a mutant allele desired to be inactivated, the specific guide sequences disclosed herein are specifically effective to function with the disclosed embodiments.

Briefly, the guide sequences may have properties as follows: (1) target a heterozygous SNP/insertion/deletion/indel with a high prevalence in the general population, in a specific ethnic population or in a patient population is above 1% and the SNP/insertion/deletion/indel heterozygosity rate in the same population is above 1%; (2) target a location of a SNP/insertion/deletion/indel proximal to a portion of the gene e.g., within 5 k bases of any portion of the gene, for example, a promoter, a UTR, an exon or an intron; and (3) target a mutant allele using an RNA molecule which targets a founder or common pathogenic mutations for the disease/gene. In some embodiments, the prevalence of the SNP/insertion/deletion/indel in the general population, in a specific ethnic population or in a patient population is above 1%, 2%, 3%, 4%, 5%, 6%, 7%, 8%, 9%, 10%, 11%, 12%, 13%, 14%, or 15% and the SNP/insertion/deletion/indel heterozygosity rate in the same population is above 1%, 2%, 3%, 4%, 5%, 6%, 7%, 8%, 9%, 10%, 11%, 12%, 13%, 14%, or 15%. Each possibility represents a separate embodiment and may be combined at will.

For each gene, according to SNP/insertion/deletion/indel any one of the following strategies may be used to deactivate the mutant allele: (1) Knockout strategy using one RNA molecule—one RNA molecule is utilized to direct a CRISPR nuclease to a mutant allele and create a double-strand break (DSB) leading to formation of a frameshift mutation in an exon or in a splice site region of the mutant allele; (2) Knockout strategy using two RNA molecules—two RNA molecules are utilized. A first RNA molecule targets a region in the promoter or an upstream region of a mutant allele and another RNA molecule targets downstream of the first RNA molecule in a promoter, exon, or intron of the mutant allele; (3) Exon(s) skipping strategy—one RNA molecule may be used to target a CRISPR nuclease to a splice site region, either at the 5'end of an intron (donor sequence) or the 3' end of an intron (acceptor sequence), in order to destroy the splice site. Alternatively, two RNA molecules may be utilized such that a first RNA molecule targets an upstream region of an exon and a second RNA molecule targets a region downstream of the first RNA molecule, thereby excising the exon(s). Based on the locations of identified SNPs/insertions/deletions/indels for each mutant allele, any one of, or a combination of, the above-mentioned methods to deactivate the mutant allele may be utilized.

When only one RNA molecule is used the location of the SNP is in an exon or in close proximity (e.g., within 20 basepairs) to a splice site between the intron and the exon. When two RNA molecules are used, guide sequences may target two SNPs such that the first SNP is upstream of exon 1 e.g., within the 5' untranslated region, or within the promoter or within the first two kilobases 5' of the transcription start site, and the second SNP is downstream of the first SNP e.g., within the first 2 kilobases 5' of the transcription start site, or within intron 1, 2 or 3, or within exon 1, exon 2, or exon 3.

Guide sequences of the present invention may target a SNP in the upstream portion of the targeted gene, preferably upstream of the last exon of the targeted gene. Guide sequences may target a SNP upstream to exon 1, for example within the 5' untranslated region, or within the promoter or within the first 4-5 kilobases 5' of the transcription start site.

Guide sequences of the present invention may also target a SNP within close proximity (e.g., within 50 basepairs, more preferably with 20 basepairs) to a known protospacer adjacent motif (PAM) site.

Guide sequences of the present invention also may target: (1) a heterozygous SNP for the targeted gene; (2) a heterozygous SNPs upstream and downstream of the gene; (3) a SNPs with a prevalence of the SNP/insertion/deletion/ indel in the general population, in a specific ethnic population, or in a patient population above 1%; (4) have a guanine-cytosine content of greater than 30% and less than 85%; (5) have no repeat of 4 or more thymine/uracil or 8 or more guanine, cytosine, or adenine; (6) having no off-target identified by off-target analysis; and (7) preferably target Exons over Introns or be upstream of a SNP rather than downstream of a SNP.

In embodiments of the present invention, the SNP may be upstream or downstream of the gene. In embodiments of the present invention, the SNP is within 4,000 base pairs upstream or downstream of the gene.

The at least one nucleotide which differs between the mutant allele and the functional allele, may be upstream, downstream or within the sequence of the disease-causing mutation of the gene of interest. The at least one nucleotide which differs between the mutant allele and the functional allele, may be within an exon or within an intron of the gene of interest. In some embodiments, the at least one nucleotide which differs between the mutant allele and the functional allele is within an exon of the gene of interest. In some embodiments, the at least one nucleotide which differs between the mutant allele and the functional allele is within an intron or an exon of the gene of interest, in close proximity to a splice site between the intron and the exon e.g., 1, 2, 3, 4, 5, 6, 7, 8, 9, 10, 11, 12, 13, 14, 15, 16, 17, 18, 19, or 20 nucleotides upstream or downstream to the splice site.

In some embodiments, the at least one nucleotide is a single nucleotide polymorphisms (SNPs). In some embodiments, each of the nucleotide variants of the SNP may be expressed in the mutant allele. In some embodiments, the SNP may be a founder or common pathogenic mutation.

Guide sequences may target a SNP which has both (1) a high prevalence in the general population e.g., above 1% in the population; and (2) a high heterozygosity rate in the population, e.g., above 1%. Guide sequences may target a SNP that is globally distributed. A SNP may be a founder or common pathogenic mutation. In some embodiments, the prevalence in the general population is above 1%, 2%, 3%, 4%, 5%, 6%, 7%, 8%, 9%, 10%, 11%, 12%, 13%, 14%, or 15%. Each possibility represents a separate embodiment. In some embodiments, the heterozygosity rate in the population is above 1%, 2%, 3%, 4%, 5%, 6%, 7%, 8%, 9%, 10%, 11%, 12%, 13%, 14%, or 15%. Each possibility represents a separate embodiment.

In some embodiments, the at least one nucleotide which differs between the mutant allele and the functional allele is linked to/co-exists with the disease-causing mutation in high prevalence in a population. In such embodiments, "high prevalence" refers to at least 92%, 93%, 94%, 95%, 96%, 97%, 98%, 99%, or 100%. Each possibility represents a separate embodiment of the present invention. In one embodiment, the at least one nucleotide which differs between the mutant allele and the functional allele, is a disease-associated mutation. In some embodiments, the SNP is highly prevalent in the population. In such embodiments, "highly prevalent" refers to at least 10%, 11%, 12%, 13%, 14%, 15%, 20%, 30%, 40%, 50%, 60%, or 70% of a population. Each possibility represents a separate embodiment of the present invention.

Guide sequences of the present invention may satisfy any one of the above criteria and are most likely to differentiate between a mutant allele from its corresponding functional allele.

Figure 5:
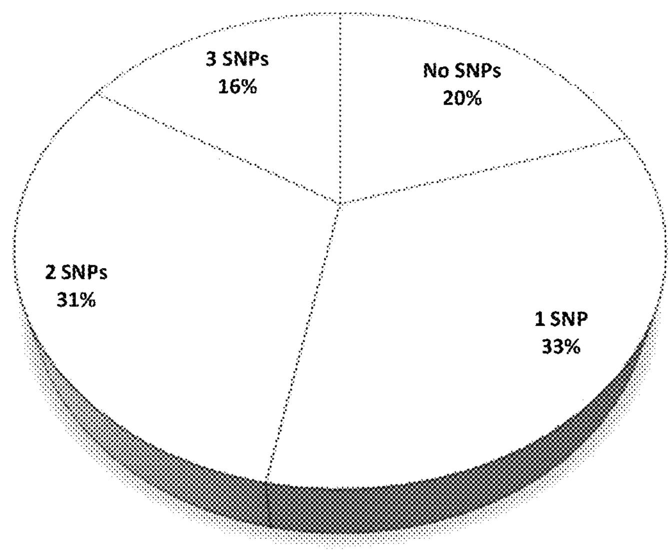
FIG. 5: The expected coverage in the population based on heterozygotes frequency and overlap/linkage between select heterozygous SNPs. Designing alternative solutions for the three therapeutic strategies may enable a coverage of about 80% of the population. It is evaluated that 80% of the population bear one or more heterozygous SNPs from the list above. From which 33% bear one heterozygous SNP, 31% two heterozygous SNPs from the list, 16% bear three heterozygous SNPs. Whereas 20% don't bear any of the SNPs listed above.

In some embodiments the RNA molecule targets a heterozygous SNP present in the ELANE gene from the SNPs as shown in Table 1. FIG. 5 discloses the heterogenicity of given selections of SNPs from Table 1 in the human population.

Figure 2:
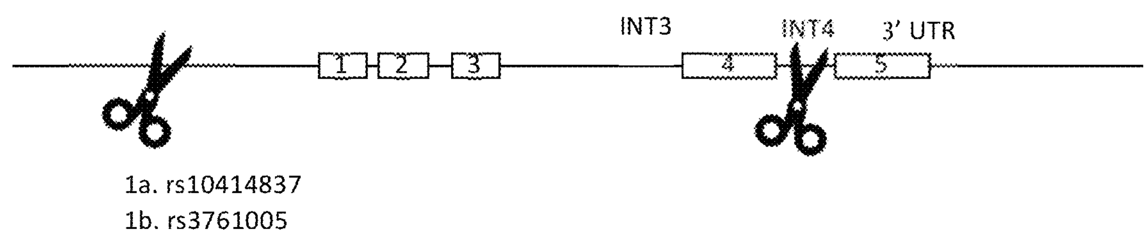
FIG. 2: excising the promoter region from an upstream SNP position until intron 3 or intron 4 or the 3' UTR. In one example, a first guide sequence targets a specific sequence of a heterozygous SNP position in an upstream region of the mutant allele (strategy 1a-rs10414837, strategy 1b-rs3761005) and a second guide sequence targets a sequence in intron 3 which is common to two alleles of the gene. In another, a first guide sequence targets a specific sequence of a heterozygous SNP position in an upstream region of the mutant allele (strategy 1a-rs10414837, strategy 1b-rs3761005) and a second guide sequence targets a sequence in 3' UTR which is common to two alleles of the gene.

Embodiments of the present invention may include excising the promoter region from an upstream SNP position until intron 3 or intron 4 or the 3' UTR. In an embodiment, a first guide sequence targets a specific sequence of a heterozygous SNP position in an upstream region of the mutant allele (strategy 1a-rs10414837, strategy 1b-rs3761005) and a second guide sequence targets a sequence in intron 4 which is common to two alleles of the gene. (FIG. 1). In a further embodiment, a first guide sequence targets a specific sequence of a heterozygous SNP position in an upstream region of the mutant allele (strategy 1a-rs10414837, strategy 1b-rs3761005) and a second guide sequence targets a sequence in intron 3 which is common to two alleles of the gene. In another, a first guide sequence targets a specific sequence of a heterozygous SNP position in an upstream region of the mutant allele (strategy 1a-rs10414837, strategy 1b-rs3761005) and a second guide sequence targets a sequence in 3' UTR which is common to two alleles of the gene. (FIG. 2).

Figure 3:
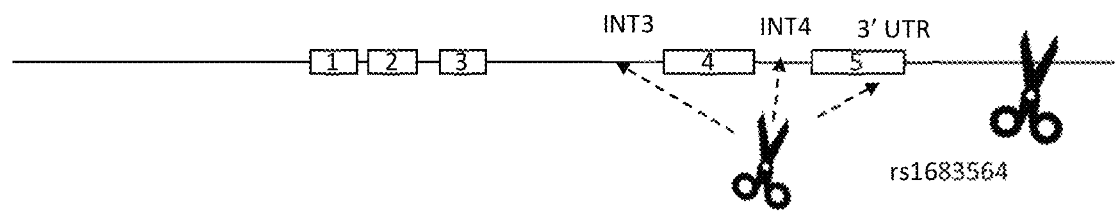
FIG. 3: excising from intron 3 or intron 4 or 3' UTR to regions downstream to the 3' UTR. In one example, a first guide sequence targets a specific sequence of a heterozygous SNP position in an upstream region of the mutant allele (strategy 2-rs1683564) and a second guide sequence targets a sequence in intron 4 which is common to two alleles of the gene. In another, a first guide sequence targets a specific sequence of a heterozygous SNP position in an upstream region of the mutant allele (strategy 2-rs1683564) and a second guide sequence targets a sequence in intron 3 which is common to two alleles of the gene. In a further, a first guide sequence targets a specific sequence of a heterozygous SNP position in an upstream region of the mutant allele (strategy 2-rs1683564) and a second guide sequence targets a sequence in 3' UTR which is common to two alleles of the gene.

Embodiments of the present invention may include excising from intron 3 or intron 4 or 3' UTR to regions downstream to the 3' UTR. In an embodiment, a first guide sequence targets a specific sequence of a heterozygous SNP position in an upstream region of the mutant allele (strategy 2-rs1683564) and a second guide sequence targets a sequence in intron 4 which is common to two alleles of the gene. In a further embodiment, a first guide sequence targets a specific sequence of a heterozygous SNP position in an upstream region of the mutant allele (strategy 2-rs1683564) and a second guide sequence targets a sequence in intron 3 which is common to two alleles of the gene. In a further, a first guide sequence targets a specific sequence of a heterozygous SNP position in an upstream region of the mutant allele (strategy 2-rs1683564) and a second guide sequence targets a sequence in 3' UTR which is common to two alleles of the gene. (FIG. 3).

Figure 4:
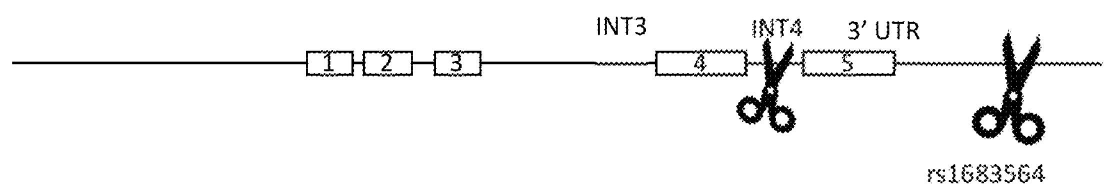
FIG. 4: excising from intron 3 or intron 4 or 3' UTR to regions downstream to the 3' UTR. The strategy is designed such as to specifically knock-out the disease-causing allele ('mutant allele'), while leaving the healthy allele intact. Allele specific editing is achieved by using guides that target discriminating (heterozygous) SNP positions with relatively high heterozygosity frequency in the population.

Embodiments of the present invention excising from intron 3 or intron 4 or 3' UTR to regions downstream to the 3' UTR. The strategy is designed such as to specifically knock-out the disease-causing allele ('mutant allele'), while leaving the healthy allele intact. Allele specific editing is achieved by using guides that target discriminating (heterozygous) SNP positions with relatively high heterozygosity frequency in the population. (FIG. 4).

Delivery to Cells

It is understood that in the methods embodied, the RNA molecules and compositions described herein may be delivered to a target cell or subject by any suitable means. The following embodiments provide non-limiting examples of methods of delivery of the RNA molecules and composition of the present invention.

In some embodiments, RNA molecule compositions of the present invention may be targeted to any cell which contains and/or expresses a dominant negative allele, including any mammalian or plant cell. For example, in one embodiment the RNA molecule specifically targets a mutant ELANE allele and the target cell is a hepatocyte cell.

Any suitable viral vector system may be used to deliver nucleic acid compositions e.g., the RNA molecule compositions of the subject invention. Conventional viral and non-viral based gene transfer methods can be used to introduce nucleic acids and target tissues. In certain embodiments, nucleic acids are administered for in vivo or ex vivo gene therapy uses. Non-viral vector delivery systems include naked nucleic acid, and nucleic acid complexed with a delivery vehicle such as a liposome or poloxamer. For a review of gene therapy procedures, see Anderson (1992) Science 256:808-813; Nabel & Felgner (1993) TIBTECH 11:211-217; Mitani & Caskey (1993) TIBTECH 11:162-166; Dillon (1993) TIBTECH 11:167-175; Miller (1992) Nature 357:455-460; Van Brunt (1988) Biotechnology 6(10):1149-1154; Vigne (1995) Restorative Neurology and Neuroscience 8:35-36; Kremer & Perricaudet (1995) British Medical Bulletin 51(1):31-44; Haddada et al. (1995) in Current Topics in Microbiology and Immunology Doerfler and Bohm (eds.); and Yu et al. (1994) Gene Therapy 1:13-26.

Methods of non-viral delivery of nucleic acids and/or proteins include electroporation, lipofection, microinjection, biolistics, particle gun acceleration, virosomes, liposomes, immunoliposomes, lipid nanoparticles (LNPs), polycation or lipid:nucleic acid conjugates, artificial virions, and agent-enhanced uptake of nucleic acids or can be delivered to plant cells by bacteria or viruses (e.g., *Agrobacterium, Rhizobium* sp. NGR234, Sinorhizoboiummeliloti, *Mesorhizobium loti*, tobacco mosaic virus, potato virus X, cauliflower mosaic virus and cassava vein mosaic virus). (See, e.g., Chung et al. (2006) Trends Plant Sci. 11(1):1-4). Sonoporation using, e.g., the Sonitron 2000 system (Rich-Mar), can also be used for delivery of nucleic acids. Cationic-lipid mediated delivery of proteins and/or nucleic acids is also contemplated as an in vivo or in vitro delivery method. (See Zuris et al. (2015) Nat. Biotechnol. 33(1):73-80; see also Coelho et al. (2013) N. Engl. J. Med. 369, 819-829; Judge et al. (2006) Mol. Ther. 13, 494-505; and Basha et al. (2011) Mol. Ther. 19, 2186-2200).

Additional exemplary nucleic acid delivery systems include those provided by Amaxa® Biosystems (Cologne, Germany), Maxcyte, Inc. (Rockville, Md.), BTX Molecular Delivery Systems (Holliston, Mass.) and Copernicus Therapeutics Inc., (see, e.g., U.S. Pat. No. 6,008,336). Lipofection is described in e.g., U.S. Pat. Nos. 5,049,386, 4,946,787; and 4,897,355, and lipofection reagents are sold commercially (e.g., Transfectam™, Lipofectin™ and Lipofectamine™ RNAiMAX). Cationic and neutral lipids that are suitable for efficient receptor-recognition lipofection of polynucleotides include those of Feigner, WO 91/17424, WO 91/16024. Delivery can be to cells (ex vivo administration) or target tissues (in vivo administration).

The preparation of lipid:nucleic acid complexes, including targeted liposomes such as immunolipid complexes, is well known to one of skill in the art (See, e.g., Crystal (1995) Science 270:404-410; Blaese et al. (1995) Cancer Gene Ther. 2:291-297; Behr et al. (1994) Bioconjugate Chem. 5:382-389; Remy et al. (1994) Bioconjugate Chem. 5:647-654; Gao et al. (1995) Gene Therapy 2:710-722; Ahmad et al. (1992) Cancer Res. 52:4817-4820; U.S. Pat. Nos. 4,186,183, 4,217,344, 4,235,871, 4,261,975, 4,485,054, 4,501,728, 4,774,085, 4,837,028, and 4,946,787).

Additional methods of delivery include the use of packaging the nucleic acids to be delivered into EnGeneIC delivery vehicles (EDVs). These EDVs are specifically delivered to target tissues using bispecific antibodies where one arm of the antibody has specificity for the target tissue and the other has specificity for the EDV. The antibody brings the EDVs to the target cell surface and then the EDV is brought into the cell by endocytosis. Once in the cell, the contents are released (See MacDiarmid et al (2009) Nature Biotechnology 27(7):643).

The use of RNA or DNA viral based systems for viral mediated delivery of nucleic acids take advantage of highly evolved processes for targeting a virus to specific cells in the body and trafficking the viral payload to the nucleus. Viral vectors can be administered directly to patients (in vivo) or they can be used to treat cells in vitro and the modified cells are administered to patients (ex vivo). Conventional viral based systems for the delivery of nucleic acids include, but are not limited to, retroviral, lentivirus, adenoviral, adeno-associated, vaccinia and herpes simplex virus vectors for gene transfer.

The tropism of a retrovirus can be altered by incorporating foreign envelope proteins, expanding the potential target population of target cells. Lentiviral vectors are retroviral vectors that are able to transduce or infect non-dividing cells and typically produce high viral titers. Selection of a retroviral gene transfer system depends on the target tissue. Retroviral vectors are comprised of cis-acting long terminal repeats with packaging capacity for up to 6-10 kb of foreign sequence. The minimum cis-acting LTRs are sufficient for replication and packaging of the vectors, which are then used to integrate the therapeutic gene into the target cell to provide permanent transgene expression. Widely used retroviral vectors include those based upon murine leukemia virus (MuLV), gibbon ape leukemia virus (GaLV), Simian Immunodeficiency virus (SIV), human immunodeficiency virus (HIV), and combinations thereof (See, e.g., Buchscher et al. (1992) J. Virol. 66:2731-2739; Johann et al. (1992) J. Virol. 66:1635-1640; Sommerfelt et al. (1990) Virol. 176:58-59; Wilson et al. (1989) J. Virol. 63:2374-2378; Miller et al. (1991) J. Virol. 65:2220-2224; PCT/US94/05700).

At least six viral vector approaches are currently available for gene transfer in clinical trials, which utilize approaches that involve complementation of defective vectors by genes inserted into helper cell lines to generate the transducing agent.

pLASN and MFG-S are examples of retroviral vectors that have been used in clinical trials (Dunbar et al. (1995) Blood 85:3048-305; Kohn et al. (1995) Nat. Med. 1:1017-102; Malech et al. (1997) PNAS 94:22 12133-12138). PA317/pLASN was the first therapeutic vector used in a gene therapy trial. (Blaese et al. (1995). Transduction efficiencies of 50% or greater have been observed for MFG-S packaged vectors. (Ellem et al. (1997) Immunol Immunother. 44(1):10-20; Dranoff et al. (1997) Hum. Gene Ther. 1:111-2).

Packaging cells are used to form virus particles that are capable of infecting a host cell. Such cells include 293 cells, which package adenovirus, AAV, and Psi-2 cells or PA317 cells, which package retrovirus. Viral vectors used in gene therapy are usually generated by a producer cell line that packages a nucleic acid vector into a viral particle. The vectors typically contain the minimal viral sequences required for packaging and subsequent integration into a host (if applicable), other viral sequences being replaced by an expression cassette encoding the protein to be expressed. The missing viral functions are supplied in trans by the packaging cell line. For example, AAV vectors used in gene therapy typically only possess inverted terminal repeat (ITR) sequences from the AAV genome which are required for packaging and integration into the host genome. Viral DNA is packaged in a cell line, which contains a helper plasmid encoding the other AAV genes, namely rep and cap, but lacking ITR sequences. The cell line is also infected with adenovirus as a helper. The helper virus promotes replication of the AAV vector and expression of AAV genes from the helper plasmid. The helper plasmid is not packaged in significant amounts due to a lack of ITR sequences. Contamination with adenovirus can be reduced by, e.g., heat treatment to which adenovirus is more sensitive than AAV. Additionally, AAV can be produced at clinical scale using baculovirus systems (see U.S. Pat. No. 7,479,554).

In many gene therapy applications, it is desirable that the gene therapy vector be delivered with a high degree of specificity to a particular tissue type. Accordingly, a viral vector can be modified to have specificity for a given cell type by expressing a ligand as a fusion protein with a viral coat protein on the outer surface of the virus. The ligand is chosen to have affinity for a receptor known to be present on the cell type of interest. For example, Han et al. (1995) Proc. Natl. Acad. Sci. USA 92:9747-9751, reported that Moloney murine leukemia virus can be modified to express human heregulin fused to gp70, and the recombinant virus infects certain human breast cancer cells expressing human epidermal growth factor receptor. This principle can be extended to other virus-target cell pairs, in which the target cell expresses a receptor and the virus expresses a fusion protein comprising a ligand for the cell-surface receptor. For example, filamentous phage can be engineered to display antibody fragments (e.g., FAB or Fv) having specific binding affinity for virtually any chosen cellular receptor. Although the above description applies primarily to viral vectors, the same principles can be applied to nonviral vectors. Such vectors can be engineered to contain specific uptake sequences which favor uptake by specific target cells.

Gene therapy vectors can be delivered in vivo by administration to an individual patient, typically by systemic administration (e.g., intravitreal, intravenous, intraperitoneal, intramuscular, subdermal, or intracranial infusion) or topical application, as described below. Alternatively, vectors can be delivered to cells ex vivo, such as cells explanted from an individual patient (e.g., lymphocytes, bone marrow aspirates, tissue biopsy) or universal donor hematopoietic stem cells, followed by reimplantation of the cells into a patient, usually after selection for cells which have incorporated the vector.

Ex vivo cell transfection for diagnostics, research, or for gene therapy (e.g., via re-infusion of the transfected cells into the host organism) is well known to those of skill in the art. In a preferred embodiment, cells are isolated from the subject organism, transfected with a nucleic acid composition, and re-infused back into the subject organism (e.g., patient). Various cell types suitable for ex vivo transfection are well known to those of skill in the art (See, e.g., Freshney et al. (1994) Culture of Animal Cells, A Manual of Basic Technique, 3rd ed, and the references cited therein for a discussion of how to isolate and culture cells from patients).

Suitable cells include, but are not limited to, eukaryotic cells and/or cell lines. Non-limiting examples of such cells or cell lines generated from such cells include COS, CHO (e.g., CHO-S, CHO-K1, CHO-DG44, CHO-DUXB11, CHO-DUKX, CHOK1SV), VERO, MDCK, WI38, V79, B14AF28-G3, BHK, HaK, NSO, SP2/0-Ag14, HeLa, HEK293 (e.g., HEK293-F, HEK293-H, HEK293-T), perC6 cells, any plant cell (differentiated or undifferentiated), as well as insect cells such as Spodopterafugiperda (Sf), or fungal cells such as *Saccharomyces, Pichia* and *Schizosaccharomyces*. In certain embodiments, the cell line is a CHO-K1, MDCK or HEK293 cell line. Additionally, primary cells may be isolated and used ex vivo for reintroduction into the subject to be treated following treatment with a guided nuclease system (e.g. CRISPR/Cas). Suitable primary cells include peripheral blood mononuclear cells (PBMC), and other blood cell subsets such as, but not limited to, CD4+ T cells or CD8+ T cells. Suitable cells also include stem cells such as, by way of example, embryonic stem cells, induced pluripotent stem cells, hematopoietic stem cells (CD34+), neuronal stem cells and mesenchymal stem cells.

In one embodiment, stem cells are used in ex vivo procedures for cell transfection and gene therapy. The advantage to using stem cells is that they can be differentiated into other cell types in vitro, or can be introduced into a mammal (such as the donor of the cells) where they will engraft in the bone marrow. Methods for differentiating CD34+ cells in vitro into clinically important immune cell types using cytokines such a GM-CSF, IFN-gamma, and TNF-alpha are known (as a non-limiting example see, Inaba et al., J. Exp. Med. 176:1693-1702 (1992)).

Stem cells are isolated for transduction and differentiation using known methods. For example, stem cells are isolated from bone marrow cells by panning the bone marrow cells with antibodies which bind unwanted cells, such as CD4+ and CD8+(T cells), CD45+(panB cells), GR-1 (granulocytes), and Tad (differentiated antigen presenting cells) (as a non-limiting example see Inaba et al. (1992) J. Exp. Med. 176:1693-1702). Stem cells that have been modified may also be used in some embodiments.

Typically, the cells are administered in a pharmaceutical composition comprising at least one pharmaceutically-acceptable carrier. The phrase "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. The phrase "pharmaceutically acceptable carrier" as used herein means a pharmaceutically-acceptable material, composition or vehicle, such as a liquid or solid filler, diluent, excipient, or solvent encapsulating material.

Any one of the RNA molecule compositions described herein is suitable for genome editing in post-mitotic cells or any cell which is not actively dividing, e.g., arrested cells. Examples of post-mitotic cells which may be edited using an RNA molecule composition of the present invention include, but are not limited to, a hepatocyte cell.

Vectors (e.g., retroviruses, liposomes, etc.) containing therapeutic nucleic acid compositions can also be administered directly to an organism for transduction of cells in vivo. Administration is by any of the routes normally used for introducing a molecule into ultimate contact with blood or tissue cells including, but not limited to, injection, infusion, topical application (e.g., eye drops and cream) and electroporation. Suitable methods of administering such nucleic acids are available and well known to those of skill in the art, and, although more than one route can be used to administer a particular composition, a particular route can often provide a more immediate and more effective reaction than another route. According to some embodiments, the composition is delivered via IV injection.

Vectors suitable for introduction of transgenes into immune cells (e.g., T-cells) include non-integrating lentivirus vectors. See, e.g., U.S. Patent Publication No. 2009-0117617.

Pharmaceutically acceptable carriers are determined in part by the particular composition being administered, as well as by the particular method used to administer the composition. Accordingly, there is a wide variety of suitable formulations of pharmaceutical compositions available, as described below (See, e.g., Remington's Pharmaceutical Sciences, 17th ed., 1989).

In accordance with some embodiments, there is provided an RNA molecule which binds to/associates with and/or directs the RNA guided DNA nuclease to a sequence comprising at least one nucleotide which differs between a mutant allele and a functional allele (e.g., SNP) of a gene of interest (i.e., a sequence of the mutant allele which is not present in the functional allele). The sequence may be within the disease associated mutation. The sequence may be upstream or downstream to the disease associated mutation. Any sequence difference between the mutant allele and the functional allele may be targeted by an RNA molecule of the present invention to inactivate the mutant allele, or otherwise disable its dominant disease-causing effects, while preserving the activity of the functional allele.

The disclosed compositions and methods may also be used in the manufacture of a medicament for treating dominant genetic disorders in a patient.

Mechanisms of Action for Several Embodiments Disclosed Herein

Mutations in ELANE that were demonstrated to lead to SCN or CyN, mediate translation from alternative in frame ORF (open reading frame) that generate truncated N-terminus protein thus causing ER and protein misfolding stress.

Without being bound by any theory or mechanism, the instant invention may be utilized to apply a CRISPR nuclease to process the mutated pathologic ELANE allele and not the functional ELANE allele, such as to prevent expression of the mutated pathologic allele or to produce a truncated non-pathologic peptide from the mutated pathologic allele, or to repair/correct the mutated pathologic ELANE allele in order to prevent ameliorate or treat SCN or CyN.

Several alternative editing strategies utilizing SNPs located upstream and downstream to the ORF may be applied. The strategies include exclusion of the whole gene, truncation of the gene to exclude the C-terminus of the gene, and attenuation of the expression of the gene.

In some embodiments, two guides (e.g., guides disclosed in Table 1) may be utilized to remove the entire gene (i.e., exons 1, 2, 3, 4, and 5) to knockout the mutant protein. In some embodiments, a first guide RNA is utilized to mediate an allele specific DSB by targeting a SNP/WT sequence located upstream to the ORF of the mutated allele of the ELANE gene, and a second guide RNA may be utilized to mediate DSB in a SNP/WT sequence located in exon 5 or downstream to the mutated allele of the ELANE gene, or a sequence located in intron 4, 3' UTR or downstream to the alleles of the ELANE gene, or a SNP/WT sequence located in intron 4 3'UTR or downstream to the alleles of the ELANE gene.

There are records of healthy individuals harboring frameshift mutation that result in gain of stop codon located till exon 3. Therefore, a potential strategy may be to truncate the mutated allele such that to include at most exons 1 till 3. In some embodiments, two guides (e.g., guides disclosed in Table 1) may be utilized to truncate the c-terminus of the mutated allele of the ELANE gene. In some embodiments, a first guide RNA may be utilized to mediate an allele specific DSB by targeting a SNP/WT sequence in exon 5 or downstream of the mutated allele, and a second guide RNA may be utilized to mediate DSB in a sequence located in intron 1, 2 or 3 of the ELANE gene, or a SNP/WT sequence. A peptide/protein encoded by the truncated mutated allele may exhibit no pathological effect. Alternatively, a nonsense-mediated mRNA decay may be triggered resulting in knockout of the expression of the mutated allele. Results may be verified by examining mRNA and protein expression.

In some embodiments, the expression of the mutated allele may be attenuated by excising elements from the proximal promoter and enhancer regions using the SNPs located upstream to the ORF. In a non-limiting example, a significant reduction may be achieved by excising most of the enhancer region by targeting a SNP.

Examples of RNA Guide Sequences which Specifically Target Mutant Alleles of ELANE Gene.

Although a large number of guide sequences can be designed to target a mutant allele, the nucleotide sequences described in Tables 1 identified by SEQ ID NOs: 1-405 below were specifically selected to effectively implement the methods set forth herein and to effectively discriminate between alleles.

Table 1 shows guide sequences designed for use as described in the embodiments above to associate with different SNPs within a sequence of a mutant ELANE allele. Each engineered guide molecule is further designed such as to associate with a target genomic DNA sequence of interest that lies next to a protospacer adjacent motif (PAM), e.g., a PAM matching the sequence NGG or NAG, where "N" is any nucleobase. The guide sequences were designed to work in conjunction with one or more different CRISPR nucleases, including, but not limited to, e.g. SpCas9WT (PAM SEQ: NGG), SpCas9.VQR.1 (PAM SEQ: NGAN), SpCas9.VQR.2 (PAM SEQ: NGNG), SpCas9.EQR (PAM SEQ: NGAG), SpCas9.VRER (PAM SEQ: NGCG), SaCas9WT (PAM SEQ: NNGRRT), NmCas9WT (PAM SEQ: NNNNGATT), Cpf1 (PAM SEQ: TTTV), or JeCas9WT (PAM SEQ: NNNVRYM). RNA molecules of the present invention are each designed to form complexes in conjunction with one or more different CRISPR nucleases and designed to target polynucleotide sequences of interest utilizing one or more different PAM sequences respective to the CRISPR nuclease utilized.

TABLE 1

Guide sequences designed to associate with specific SNPs of the ELANE gene

| Target | SEQ ID NOs of 20 base guides |
|---|---|
| 19:848798_T_C_rs10424470_REF | 1-11 |
| 19:848798_T_C_rs10424470_SNP | 2, 6, 12-26 |
| 19:849138_T_C_rs4807932_SNP | 27-28 |
| 19:849618_C_T_rs10414837_SNP | 29-32 |
| 19:849688_CTTTTTTTTTT_C_rs376107533_REF | 33-34 |
| 19:849935_A_C_rs3761010_REF | 35-45 |
| 19:850299_G_A_rs10413889_SNP | 46 |
| 19:850574_G_A_rs3761007_REF | 47-48 |
| 19:850574_G_A_rs3761007_SNP | 49-54 |
| 19:850733_C_G_rs10409474_REF | 55 |
| 19:850733_C_G_rs10409474_SNP | 56-62 |
| 19:850793_T_A_rs3761005_REF | 63 |
| 19:851401_T_G_rs351107_SNP | 64-109 |
| 19:851563_G_A_rs3761001_REF | 110-136 |
| 19:852104_C_A_rs740021_REF | 137 |
| 19:852594_AGG_A_rs781452480_REF | 138-154 |
| 19:852594_AGG_A_rs781452480_SNP | 152, 155 |
| 19:852594_AG_A_rs371057361_REF | 138-154 |
| 19:852594_A_G_rs570466264_REF | 138-154 |
| 19:852594_A_G_rs570466264_SNP | 138, 145, 149, 153, 156-158 |
| 19:852606_T_G_rs1041904080_REF | 155, 159-174 |
| 19:852606_T_G_rs1041904080_SNP | 159, 165, 173-183 |
| 19:855162_T_A_rs7250194_REF | 184-185 |
| 19:855162_T_A_rs7250194_SNP | 184-187 |
| 19:855966_C_A_rs17216649_REF | 188-195 |
| 19:855966_C_A_rs17216649_SNP | 196-222 |
| 19:856416_T_TA_rs199720952_REF | 223-230 |
| 19:856482_C_T_rs6510983_REF | 231-247 |

TABLE 1-continued

Guide sequences designed to associate with specific SNPs of the ELANE gene

| Target | SEQ ID NOs of 20 base guides |
|---|---|
| 19:856482_C_T_rs6510983_SNP | 231-232, 235, 242, 248-264 |
| 19:856530_G_A_rs17223066_REF | 265 |
| 19:856530_G_A_rs17223066_SNP | 265-273 |
| 19:856783_T_A_rs7255385_REF | 274-276 |
| 19:857848_CA_C_rs112639467_REF | 277-279 |
| 19:857848_C_CA_rs141213775_REF | 277-279 |
| 19:858296_C_A_rs28591229_REF | 280 |
| 19:858296_C_A_rs28591229_SNP | 280-288 |
| 19:858376_C_T_rs10469327_REF | 289-290 |
| 19:858376_C_T_rs10469327_SNP | 291-294 |
| 19:859067_GA_G_rs3834645_REF | 295-299 |
| 19:859067_GA_G_rs3834645_SNP | 295-296, 300-334 |
| 19:859214_C_A_rs1683564_REF | 335-340 |
| 19:859214_C_A_rs1683564_SNP | 341-354 |
| 19:859368_G_T_rs71335276_REF | 355-356 |
| 19:859368_G_T_rs71335276_SNP | 357-358 |
| 19:859831_T_G_rs8107095_REF | 359-376 |
| 19:859831_T_G_rs8107095_SNP | 377-405 |

The indicated locations listed in column 1 of the Table 1 are based on gnomAD v3 database and UCSC Genome Browser assembly ID: hg38, Sequencing/Assembly provider ID: Genome Reference Consortium Human GRCh38.p12 (GCA_000001405.27). Assembly date: December 2013 initial release; December 2017 patch release 12.

The SNP details are indicated by the listed SNP ID NOs. ("rs numbers"), which are based on the NCBI 2018 database of Single Nucleotide Polymorphisms (dbSNP)).

The indicated DNA mutations are associated with Transcript Consequence NM_001972 as obtained from NCBI RefSeq genes.

For the foregoing embodiments, each embodiment disclosed herein is contemplated as being applicable to each of the other disclosed embodiment. For example, it is understood that any of the RNA molecules or compositions of the present invention may be utilized in any of the methods of the present invention.

As used herein, all headings are simply for organization and are not intended to limit the disclosure in any manner. The content of any individual section may be equally applicable to all sections.

Examples are provided below to facilitate a more complete understanding of the invention. The following examples illustrate the exemplary modes of making and practicing the invention. However, the scope of the invention is not limited to specific embodiments disclosed in these Examples, which are for purposes of illustration only.

Further. the examples herein below disclose methods utilizing SpCas9 and guide sequences suitable to target the SpCas9 to the disclosed SNP positions. The examples demonstrate the feasibility of the strategies disclosed. A person having ordinary skill in the art would understand that the same guides sequences may be used with different CRISPR nuclease to target the disclosed SNPs to apply each of the specified strategies. Further, different guide sequences that target other CRISPR nucleases to the same SNPs may be used together with the other nucleases to apply each of the specified strategies.

EXPERIMENTAL DETAILS

Figure 6:
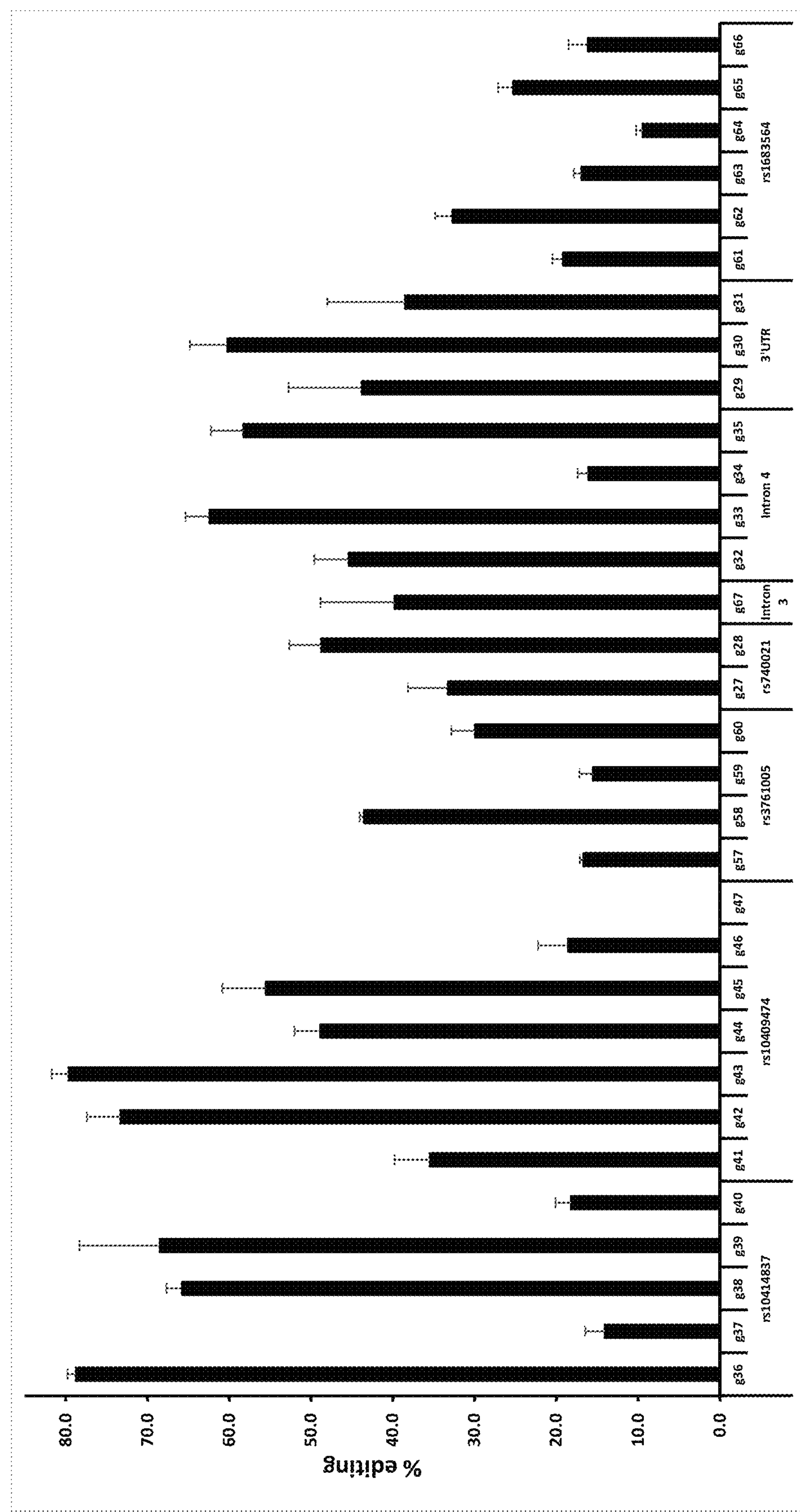
FIG. 6: HeLa cells seeded into 96 well-plate (3K/well). 24 h later were co-transfected with either 65 ng of WT-Cas9 or Dead-Cas9 and 20 ng of gRNA plasmids, identified as g36 through g66, targeting the different regions and SNPs in ELANE using Turbofect reagent (Thermo Scientific). Percent of editing was calculated according the following formula: 100%−(Intensity not edited band/Intensity total bands)*100. The mean activity of each gRNA following subtraction of the Dead-Cas9 background activity±SD of three independent experiment is shown.

Example 1: Screening Guide Sequences Suitable to Work in Conjunction with SpCas9 and Targeting SNPs and Sequences Complying with the Disclosed Strategies HeLa cells were seeded into 96 well-plate (3K/well). 24 h later, cells were co-transfected with either 65 ng of WT-Cas9 or Dead-Cas9 and 20 ng of gRNA plasmids, identified as g36 through g66, targeting the different regions and SNPs in ELANE using Turbofect reagent (Thermo Scientific). 12 hours later, fresh media was added, and 72 hours post transfection, genomic DNA were extracted, and the expected region targeted by the Cas9 was amplified and the product size was analyzed by capillary electrophoreses with a DNA ladder. The intensity of the bands was analyzed using the Peak Scanner software v1.0. The percent of editing was calculated according the following formula: 100%−(Intensity not edited band/Intensity total bands)*100. FIG. 6 represents the mean activity of each gRNA following subtraction of the Dead-Cas9 background activity±SD of three independent experiment.

TABLE 2 guides sg36 through sg66 of Example 1 as identified by SEQ ID NO.

| Guide sequence | Example 1 gID | SEQ ID NO: | SNP location |
|---|---|---|---|
| UAGGGGUGUUAUGGUCACAG | g36 | 406 | upstream -2590bp |
| CACAGCGGGUGUAGACUCCG | g37 | 407 | upstream -2590bp |
| ACAGCGGGUGUAGACUCCGA | g38 | 408 | upstream -2590bp |
| CAGCGGGUGUAGACUCCGAG | g39 | 409 | upstream -2590bp |
| AGCGGGUGUAGACUCCGAGG | g40 | 410 | upstream -2590bp |
| CCGUUGCAGCUGGAACAUCG | g41 | 411 | upstream -1475bp |
| CGUUGCAGCUGGAACAUCGU | g42 | 412 | upstream -1475bp |
| GUUGCAGCUGGAACAUCGUG | g43 | 413 | upstream -1475bp |
| UUGCAGCUGGAACAUCGUGG | g44 | 414 | upstream -1475bp |
| CUGGAACAUCGUGGGGGAGA | g45 | 415 | upstream -1475bp |
| UGGAACAUCGUGGGGGAGAU | g46 | 416 | upstream -1475bp |
| AUCGUGGGGGAGAUGGGAAG | g47 | 417 | upstream -1475bp |
| GGAGUCCCAGCUGCGGGAAA | g57 | 418 | upstream -1415bp |
| GCUGCGGGAAAGGGAUUCCC | g58 | 419 | upstream -1415bp |
| GGGAAUCCCUUUCCCGCAGC | g59 | 420 | upstream -1415bp |
| GGAAUCCCUUUCCCGCAGCU | g60 | 421 | upstream -1415bp |
| CAAAUGUCAGAUAAUCAAUG | g27 | 422 | upstream |
| AAAUGUCAGAUAAUCAAUGU | g28 | 423 | upstream |
| ACCAAGGCUCAGGGCGUUGG | g67 | 424 | Int3 |
| CCUGUUGCUGCAGUCCGGGC | g32 | 425 | Int4 |

TABLE 2-continued

| guides sg36 through sg66 of Example 1 as identified by SEQ ID NO. | | | |
|---|---|---|---|
| Guide sequence | Example 1 gID | SEQ ID NO: | SNP location |
| CCAGCCCGGACUGCAGCAAC | g33 | 426 | Int4 |
| UCCCUCCUAGGGUCUAGCCA | g34 | 427 | Int4 |
| AGUCCGGGCUGGGAGCGGGU | g35 | 428 | Int4 |
| AUGUUUAUUGUGCCAGAUGC | g29 | 429 | 3UTR |
| GUGGGCAGCUGAGGUGACCC | g30 | 430 | 3UTR |
| CACCCACACUCUCCAGCAUC | g31 | 431 | 3UTR |
| UGUCAAGCCCCAGAGGCCAC | g61 | 432 | downstream +2968bp |
| GUCAAGCCCCAGAGGCCACA | g62 | 433 | downstream +2968bp |
| GUCUCUGUCCCUGUGGCCUC | g63 | 434 | downstream +2968bp |
| UCUCUGUCCCUGUGGCCUCU | g64 | 435 | downstream +2968bp |
| CUCUGUCCCUGUGGCCUCUG | g65 | 436 | downstream +2968bp |
| UGUCAAGCCCCAGAGGCCAC | g66 | 432 | downstream +2968bp |

Example 2: Demonstrating the Feasibility of the Excision Strategies

HeLa cells were co-transfected with spCas9-WT and RNA pairs; sg35 (INT 4) with either g39 (rs10414837), g58 (rs3761005) or g62 (rs1683564) for strategies 1a, 1b and 2, respectively. 72 h post-transfection, gDNA was extracted and excision efficiency was assessed by measuring the decrease in copy number of exon 1 (strategy 1) or exon 5 (strategy 2), using droplet digital PCR (ddPCR) kits (10042958 and 10031228, Bio-Rad Laboratories). In addition, exon 1 was used to normalize the excision rate of strategy 2 while exon 5 was used to normalize the excision rate of strategy 1. The results disclosed in Table 3 represent the mean % excision±SD (standard deviation) of two independent experiments.

TABLE 3

| Tested excision rate for each strategy | | |
|---|---|---|
| Strategy | Guide-RNA pair | Excision rate (%) |
| 1.a | g39 + g35 | 49 ± 2 |
| 1.b | g58 + g35 | 45 ± 9.6 |
| 2 | g62 + g35 | 41 ± 12.6 |

Example 3: Assessing Allele Discriminating Editing with the Different sgRNAs

Ribonucleoprotein complexes (RNPs) were assembled from the relevant gRNAs, targeting the reference sequence, and WT-Cas9 (#1081058) or HiFi Cas9 (#1081060) purchased from Integrated DNA Technology (IDT) according to the manufacturer instructions. The RNPs were then nucleofected into iPSCs harboring the relevant SNPs using the 4D-Nucleofecor (R) System (Lonza). 72 h later, gDNA is extracted and the SNPs regions were amplified and sent to NGS analysis. Allele discrimination were assessed according to % of editing detected in the reference and the alternative alleles. The Indels frequency in each site was calculated using Cas-Analyzer software. Results are summarized in Table 4.

TABLE 4

| % Editing using indicated guide sequences | | | | | | |
|---|---|---|---|---|---|---|
| | % of Editing | | | | | |
| | rs10414837 (g39) | | rs3761005 (g58) | | rs1683564 (g62) | |
| spCas9 Varaint | Reference Allele | Alternative Allele | Reference Allele | Alternative Allele | Reference Allele | Alternative Allele |
| WT-Cas9 | 65.3 | 34.7 | 50 | 50 | 100 | 0 |
| HiFi-Cas9 | 94.3 | 5.7 | 49 | 51 | 100 | 0 |

Example 4: Editing Efficiency in HSCs

Figure 7:
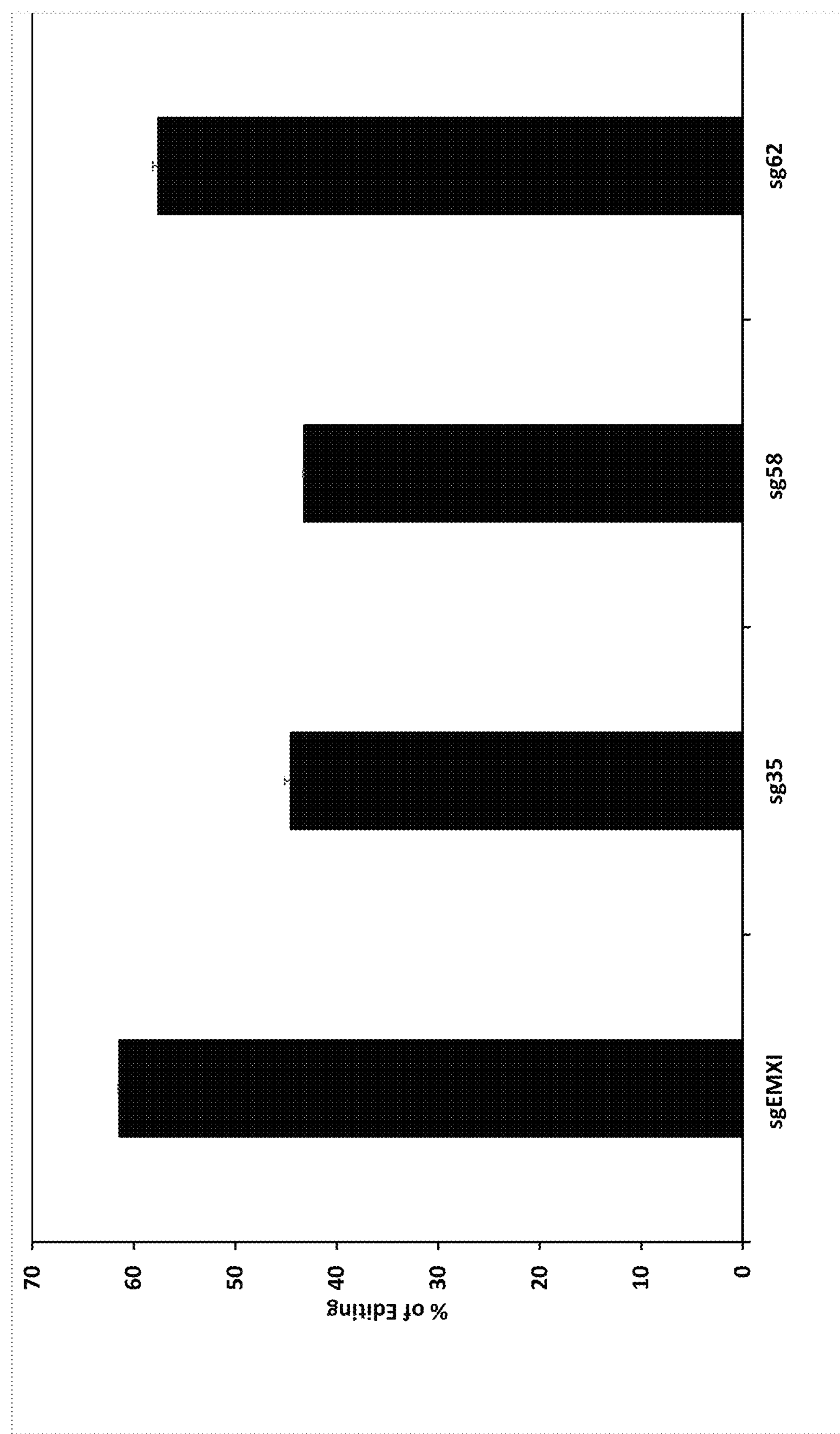
FIG. 7: HSCs from healthy donors were nucleofected with RNA components of spCas9-WT and gRNAs targeting either EMX1 (sgEMX1) or ELANE (g35: INT 4; g58: rs3761005; g62: rs1683564). 72 h post nucleofection gDNA was extracted and editing levels were assayed by IDAA. The mean % of editing±SD of two independent experiments performed in duplicates is shown.

HSCs from healthy donors were nucleofected with RNA components of spCas9-WT and gRNAs targeting either EMX1 (sgEMX1) or ELANE (g35: INT 4; g58: rs3761005; g62: rs1683564). 72 h post nucleofection gDNA was extracted and editing levels were assayed by IDAA. FIG. 7 represents the mean % of editing±SD of two independent experiments performed in duplicates.

Example 5: Functional Maturation Assay

To prove the rescue of the phenotype in corrected cells, a maturation assay starting from patient-derived induced pluripotent cells (iPSC), is prepared from reprogrammed somatic cells. The cells provide a renewable source of patient-derived cells and are shown to accurately replicate the disease phenotype. Briefly, patient PBMCs are transfected with episomal constructs expressing the reprogramming genes, Oct4, Sox2, Nanog, Lin28, L-Myc, Klf4, and SV40LT. Patient-derived iPSC and normal iPSCs harboring the same SNPs genotype are differentiated into hematopoietic progenitor cells using a commercial kit (STEMdiff™ Hematopoietic Kit, STEMCELL Technologies). After 12 days the differentiation efficiency is estimated by analyzing the cells for their expression of progenitor markers CD34 and CD45, by Flow cytometry analysis. Normal and SCN differentiated progenitor cells are be subjected to gene editing and are grown for 5 days in conditioned media containing stem cell factor (SCF), IL-3, and GM-CSF that promotes the differentiation into neutrophils. Normal unedited and edited cells, SCN edited cells differentiate into neutrophils while unedited SCN-derived cells arrest at earlier differentiation stages. The efficiency of differentiation into neutrophils is measured by detecting neutrophils surface markers (e.g. upregulation of CD16, CD66b and the pan myeloid marker CD33) by flow cytometry.

Example 6: In Vivo Pilot Dose-Range Finding and Biodistribution Study in Immunodeficient Mice The dosing schedule, dose range, and route of administration, are studied to determine the presence and number of HSCs with self-renewal and multilineage capacity in immunodeficient NSG mice, following G-CSF administration. A repopulation assay is conducted to determine the presence and number of HSCs that are able to regenerate a functional immune system to establish long term engraftment. For such verification, the NSG strain is used, which is highly supportive of human engraftment and hematopoietic repopulation. The NSG mouse is a NOD SCID mouse lacking mature T cells, B cells, and natural killer (NK) cells, in addition to being deficient in multiple cytokine signaling pathways and having many defects in innate immunity. Engraftment is assessed 16 weeks after primary transplantation (analysis after 12 weeks post-transplant).

The 16-week pilot biodistribution study in NSG mice investigates dose and maximum duration and is conducted at several cell dose levels. The study includes three dose levels plus a group of mice receiving unedited SCN cells. Duration of the pilot study is 16 weeks; however, one of two high dose groups continues for up to 6 months. Mice survive for 6 months in the pilot study, and the duration of the pivotal biodistribution study is 6 months. During the study, persistence of expression via qPCR and immune histochemistry is studied.

Example 7: Pivotal Biodistribution Study in Immunodeficient Mice

The pivotal biodistribution study utilizes NSG mice and follows the pilot dose-range findings of Example 6. This study is conducted in compliance with Good Laboratory Practice (GLP) and is a pivotal nonclinical pharmacokinetics, pharmacodynamics, and toxicology study. Assessment of toxicity is based on mortality, clinical observations, body and organ weights, and clinical and anatomic pathology following HSC infusion.

Transplantation of gene-edited CD34+ cells into NSG mice requires conditioning in order to provide depletion of endogenous bone marrow and to allow the engraftment of donor cells. Accordingly, Busulfan-conditioning is employed to mimic the clinical situation. Three groups (gene edited cells, unedited cells and busulfan vehicle only controls) of 10 male and female mice per group are utilized.

Although the NSG mouse model is not completely similar to the human neutrophil depleted situation, this does not affect the validity of the model for use in the biodistribution study of the gene-edited CD34+ cells, since the mice at any rate are treated with busulfan, depleting the bone marrow function, before the in vivo injection of ex vivo gene edited cells.

An available neutrophil-depleted mouse strain, myeloid cell leukemia 1 (Mcl-1) antiapoptotic protein in Lyz2$^{Cre/Cre}$Mcl-1$^{flox/flox}$ (Mcl-1$^{\Delta Myelo}$) shows that myeloid-specific deletion of Mcl-1 lead to very severe neutropenia (Csepregi et al. 2018). Mcl-1$^{\Delta Myelo}$ mice are able to breed and their survival is close to normal both under specific pathogen-free and conventional housing conditions. However, in contrast to the NSG mouse, there is limited experience with the Mcl-1$^{\Delta Myelo}$ mouse model.

Example 8: A Correction Analysis

Guide sequences comprising 17-30 nucleotides containing nucleotides in the sequence set forth in any one of SEQ ID NOs: 1-436 are screened for high on target activity. On target activity is determined by DNA capillary electrophoresis analysis.

According to DNA capillary electrophoresis analysis, guide sequences comprising 17-30 nucleotides containing nucleotides in the sequence set forth in any one of SEQ ID NOs: 1-436 are found to be suitable for correction of the ELANE gene.

Example 9: Efficacy of Allele Specific Knockout of ELANE

Figure 8:
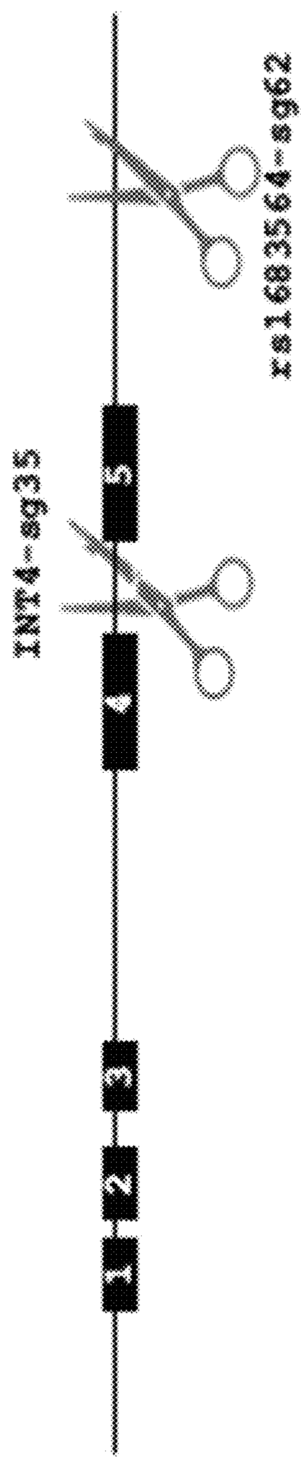
FIG. 8: Specific knock-out of the mutated allele of the ELANE gene is mediated by excising intron 4 and exon5 of the mutant allele of the ELANE gene. This is achieved by mediating a DSB in intron 4 and utilizing SNP rs1683564 for mediating an allele specific DSB.

Specific knock-out of the mutated allele of the ELANE gene is mediated by excising intron 4 and exons of the mutant allele of the ELANE gene. This is achieved by mediating a DSB in intron 4 and utilizing SNP rs1683564 for mediating an allele specific DSB as described in FIG. 8. To demonstrate that this strategy effectively enables HSCs to differentiate into mature and functional neutrophils, healthy donors are nucleofected with HSCs (Lonza) with RNPs containing g35 and g62 targeting the respective SNP of intron 4 (See Table 1). Unedited cells are used as a positive control. Forty-eight (48) hours following nucleofection, HSCs are differentiated towards neutrophils according to a published protocol (Zhenwang Jie, et al. PlosOne 2017). The differentiation efficiency of the edited and unedited cells is measured by FACS following staining with the neutrophils specific markers CD66b and CD177. To assess the function of the HSCs-mediated neutrophils, the following assays are performed:

1. Phagocytosis: is assayed using the EZCell™ Phagocytosis Assay Kit (BioVision). The kit utilizes pre-labeled Zymosan particles as a tool for rapid and accurate detection and quantification of in vitro phagocytosis by flow cytometry.
2. A killing assay is conducted by incubating the HSCs-derived neutrophils with *E. coli*, with the bacteria then seeded on agar plate for colonies formation. Untreated bacteria or bacteria that were incubated with undifferentiated HSCs are used as controls. The killing efficiency is calculated as follows: (#of colonies$_{Neutrophils}$/#of colonies$_{Control}$)×100.
3. Chemotaxis is assayed using the EZCell™ Cell Migration/Chemotaxis Assay Kit (Biovision).

Example 10: Subject Selection for Treatment

Step 1: Four patients A-D diagnosed with SCN or CyN are screened by Exon sequencing to identify an ELANE pathogenic mutation in the ELANE gene. Step 2: Subjects with an identified mutation are then screened by Sanger sequencing to confirm heterozygocity of at least one of rs1683564, rs10414837 and rs3761005. Step 3: For each subject determined to be heterozygous at at least one of rs1683564, rs10414837 and rs3761005, the nucleotide of the heterozygous SNP on the mutant allele of the ELANE gene is determined using BAC bio. Step 4: Appropriate guides are selected according to Table 5.

TABLE 5

Guides Designed for Discriminating SNPs and used for the Editing Strategy

| gRNA | SEQ ID NO: | Target SNP | DNA Sequence | Location | Mechanism |
| --- | --- | --- | --- | --- | --- |
| g39 REF | 437 | rs10414837 | CAGC**G**GGTGTAGACTCCGAG | Promoter region | Excision, allele knock out |
| ALT | 438 | | CAGC**A**GGTGTAGACTCCGAG | | |
| g58 REF | 439 | rs3761005 | GCTGCGGGAA**A**GGGATTCCC | Promoter region | Excision, allele knock out |
| ALT | 440 | | GCTGCGGGAA**T**GGGATTCCC | | |
| g62 REF | 441 | rs1683564 | GTCAAGCCCCAGAGG**C**CACA | Downstream to 3'UTR | Excision, allele knock out |
| ALT | 442 | | GTCAAGCCCCAGAGG**A**CACA | | |
| g35 | 443 | | AGTCCGGGCTGGGAGCGGGT | Intron 4 | Excision, allele knock out |

Step 5: The guides selected are introduced to PBMCs obtained from each respective subject and reduction in the pathogenic ELANE mutation in the PBMCs is verified by Next Generation Sequencing. The methodology for patients A-D is illustrated below:

1. Patient A is screened according to step 1 and found to have a known pathogenic mutation in his ELANE gene, in agreement with his phenotype and clinical condition. Patient A is screened according to step 2, around the SNPs of interest, and is found to be homozygous for all three SNP—rs10414837, rs1683564 and rs3761005. Patient A is determined to not eligible for treatment.
2. Patient B is verified for a known pathogenic ELANE mutation. Patient B is screened according to step 2 and is found to be homozygous for SNPs rs1683564 and rs10414837. Patient B is found to be heterozygous for rs3761005 in the promotor region. Patient B is determined to be eligible for treatment. According to step 3, the nucleotide of the SNP residing on the same allele as the pathogenic ELANE mutation (linkage determination) is determined. Patent B is found to have the reference nucleotide base in the rs3761005 SNP position on the same allele as the ELANE pathogenic mutation. g58ref is fully complementary to this SNP presentation and is selected in combination with g35 directed at the non-coding region of intron 4. According to step 4, the chosen guide composition includes a pair of guides g58ref and g35. Successful excision of the mutated allele using the selected pair of guides is verified according to step 5 on the patient PMBCs using NGS readout.
3. Patient C suffers from Severe Neutropenia since early childhood. Screening according to step A, no pathogenic mutation is found in his ELANE gene. Patient C is determined to not eligible for treatment.
4. Patient D is verified to have a known pathogenic mutation in ELANE gene, and when genotyping his SNPs according to step 2, he is found to be heterozygous at 2 out of 3 SNPs—both rs10414837 and rs1683564 are found to be heterozygous while rs3761005 is found to be homozygous. A selection between two possible SNPs to use for the gene manipulation is made. In order to make the selection, step 3 is performed to determine the linkage between the SNPs and the pathogenic mutation, i.e. determination of which nucleotide of the SNP (reference or alternative) resides on the same allele as the ELANE pathogenic mutation (SNP presentation). Patient D is determined to have the reference presentation of rs10414837 and sg39ref is determined to be appropriate for use. Referring to the rs1683564 SNP, the alternative presentation is found to be linked to the ELANE pathogenic mutation, sg62alt is determined to be the appropriate guide for use. Each of these guides is used in combination with g35. According to Step 4, two pairs of possible guides compositions are identifed: sg39ref+g35, and g62alt+g35. To determine which of the guide pairs is preferable, a database of editing properties and characterization of each of the guides and guide pairs is assessed to determine off-target and editing efficiencies A guide pair is selected based on the database assessment, and is utilized according to step 5 on PBCS providing an NGS readout.

REFERENCES

1. Ahmad and Allen (1992) "Antibody-mediated Specific Binging and Cytotoxicity of Lipsome-entrapped Doxorubicin to Lung Cancer Cells in Vitro", Cancer Research 52:4817-20
2. Anders (1992) "Human gene therapy", Science 256:808-13
3. Basha et al. (2011) "Influence of Cationic Lipid Composition on Gene Silencing Properties of Lipid Nanoparticle Formulations of siRNA in Antigen-Presenting Cells", Mol. Ther. 19(12):2186-200
4. Behr (1994) Gene transfer with synthetic cationic amphiphiles: Prospects for gene therapy", Bioconjuage Chem 5:382-89
5. Blaese (1995) "Vectors in cancer therapy: how will they deliver", Cancer Gene Ther. 2:291-97
6. Blaese et al. (1995) "T lympocyte-directed gene therapy for ADA-SCID: initial trial results after 4 years", Science 270(5235):475-80
7. Boxer, L. A. (2012) "How to approach neutropenia", Hematology Am Soc Hematol Educ Program 2012: 174-182
8. Buchschacher and Panganiban (1992) "Human immunodeficiency virus vectors for inducible expression of foreign genes", J. Virol. 66:2731-39

9. Burstein et al. (2017) "New CRISPR-Cas systems from uncultivated microbes", Nature 542:237-41

10. Carlsson, G et al. (2012) "Incidence of severe congenital neutropenia in Sweden and risk of evolution to myelodysplastic syndrome/leukaemia", Br J Haematol 158(3): 363-369

11. Chung et al. (2006) "*Agrobacterium* is not alone: gene transfer to plants by viruses and other bacteria", Trends Plant Sci. 11(1):1-4

12. Connelly, J. A. et al. (2012) "Hematopoietic stem cell transplantation for severe congenital neutropenia", Curr Opin Hematol 19(1): 44-51

13. Crystal (1995) "Transfer of genes to humans: early lessons and obstacles to success", Science 270(5235): 404-10

14. Dale, D. C. (2017) "How I manage children with neutropenia", Br J Haematol 178(3): 351-363

15. Dillon (1993) "Regulation gene expression in gene therapy" Trends in Biotechnology 11(5):167-173

16. Donadieu, J. et al. (2011) "Congenital neutropenia: diagnosis, molecular bases and patient management", Orphanet J Rare Dis 6: 26.

17. Dranoff et al. (1997) "A phase I study of vaccination with autologous, irradiated melanoma cells engineered to secrete human granulocyte macrophage colony stimulating factor", Hum. Gene Ther. 8(1):111-23

18. Donadieu et al. (2011) "Congenital neutropenia: diagnosis, molecular bases and patient management", Orphanet J Rare Dis. 6:26

19. Dunbar et al. (1995) "Retrovirally marked CD34-enriched peripheral blood and bone marrow cells contribute to long-term engraftment after autologous transplantation", Blood 85:3048-57

20. Ellem et al. (1997) "A case report: immune responses and clinical course of the first human use of ganulocyte/macrophage-colony-stimulating-factor-transduced autologous melanoma cells for immunotherapy", Cancer Immunol Immunother 44:10-20

21. Gao and Huang (1995) "Cationic liposome-mediated gene transfer" Gene Ther. 2(10):710-22

22. Germeshausen et al. (2013) "The spectrum of ELANE mutations and their implications in severe congenital and cyclic neutropenia", Hum Mutat. 34(6):905-14

23. Haddada et al. (1995) "Gene Therapy Using Adenovirus Vectors", in: The Molecular Repertoire of Adenoviruses III: Biology and Pathogenesis, ed. Doerfler and Bohm, pp. 297-306

24. Han et al. (1995) "Ligand-directed retro-viral targeting of human breast cancer cells", Proc Natl Acad Sci U.S.A. 92(21):9747-51

25. Horwitz, M. S. et al. (2013) "ELANE mutations in cyclic and severe congenital neutropenia: genetics and pathophysiology", Hematol Oncol Clin North Am 27(1): 19-41, vii.

26. Inaba et al. (1992) "Generation of large numbers of dendritic cells from mouse bone marrow cultures supplemented with granulocyte/macrophage colony-stimulating factor", J Exp Med. 176(6):1693-702

27. Jinek et al. (2012) "A programmable dual-RNA-guided DNA endonuclease in adaptive bacterial immunity," Science 337(6096):816-21

28. Johan et al. (1992) "GLVR1, a receptor for gibbon ape leukemia virus, is homologous to a phosphate permease of *Neurospora crassa* and is expressed at high levels in the brain and thymus", J Virol 66(3):1635-40

29. Judge et al. (2006) "Design of noninflammatory synthetic siRNA mediating potent gene silencing in vivo", Mol Ther. 13(3):494-505

30. Kohn et al. (1995) "Engraftment of gene-modified umbilical cord blood cells in neonates with adnosine deaminase deficiency", Nature Medicine 1:1017-23

31. Koonen et al. (2017) "Diversity, classification and evolution of CRISPR-Cas systems", Current Opinion in Microbiology 37:67-78

32. Kremer and Perricaudet (1995) "Adenovirus and adeno-associated virus mediated gene transfer", Br. Med. Bull. 51(1):31-44

33. Macdiarmid et al. (2009) "Sequential treatment of drug-resistant tumors with targeted minicells containing siRNA or a cytotoxic drug", Nat Biotechnol. 27(7):643-51

34. Malech et al. (1997) "Prolonged production of NADPH oxidase-corrected granulocyes after gene therapy of chronic granulomatous disease", PNAS 94(22):12133-38

35. Makaran et al. (2015) "The diversity of mutations and clinical outcomes for ELANE-associated neutropenia", Curr Opin Hematol. 22(1):3-11

36. Miller et al. (1991) "Construction and properties of retrovirus packaging cells based on gibbon ape leukemia virus", J Virol. 65(5):2220-24

37. Miller (1992) "Human gene therapy comes of age", Nature 357:455-60

38. Mitani and Caskey (1993) "Delivering therapeutic genes—matching approach and application", Trends in Biotechnology 11(5):162-66

39. Nabel and Feigner (1993) "Direct gene transfer for immunotherapy and immunization", Trends in Biotechnology 11(5):211-15

40. Remy et al. (1994) "Gene Transfer with a Series of Lipphilic DNA-Binding Molecules", Bioconjugate Chem. 5(6):647-54

41. Rosenberg, P. S. et al. (2010) "Stable long-term risk of leukaemia in patients with severe congenital neutropenia maintained on G-CSF therapy", Br J Haematol 150(2): 196-199.

42. Schaffer, A et al. (2007) "Genetic heterogeneity in severe congenital neutropenia: how many aberrant pathways can kill a neutrophil?" Curr Opin Allergy Clin Immunol 7(6): 481-494

43. Sentmanat et al. (2018) "A Survey of Validation Strategies for CRISPR-Cas9 Editing", Scientific Reports 8:888, doi:10.1038/s41598-018-19441-8

44. Skokowa, J. et al. (2017) "Severe congenital neutropenias", Nat Rev Dis Primers 3: 17032

45. Sommerfelt et al. (1990) "Localization of the receptor gene for type D simian retroviruses on human chromosome 19", J. Virol. 64(12):6214-20

46. Van Brunt (1988) "Molecular framing: transgenic animals as bioactors" Biotechnology 6:1149-54

47. Vigne et al. (1995) "Third-generation adenovectors for gene therapy", Restorative Neurology and Neuroscience 8(1,2): 35-36

48. Weissman and Kariko (2015) "mRNA:Fulfilling the promise of gene therapy", Molecular Therapy (9):1416-7

49. Wilson et al. (1989) "Formation of infectious hybrid virion with gibbon ape leukemia virus and human T-cell leukemia virus retroviral envelope glycoproteins and the gag and pol proteins of Moloney murine leukemia virus", J. Virol. 63:2374-78

50. Yu et al. (1994) "Progress towards gene therapy for HIV infection", Gene Ther. 1(1):13-26

51. Yu, K et al. (2016) "Gene Editing of Human Hematopoietic Stem and Progenitor Cells: Promise and Potential Hurdles", Hum Gene Ther 27(10): 729-740

52. Zetsche et al. (2015) "Cpf1 is a single RNA-guided endonuclease of a class 2 CRIPSR-Cas system" Cell 163(3):759-71

53. Zhenwang et al. (2017) "Large-scale ex vivo generation of human neutrophils from cord blood CD34+ cells", PLOS ONE, doi.org/10.1371/journal.pone.0180832

54. Zuris et al. (2015) "Cationic lipid-mediated delivery of proteins enables efficient protein based genome editing in vitro and in vivo" Nat Biotechnol. 33(1):73-80

The invention claimed is:

1. A method for inactivating in a cell a mutant allele of the elastase, neutrophil expressed gene (ELANE gene) having a mutation associated with severe congenital neutropenia (SCN) or cyclic neutropenia (CyN) and which cell is heterozygous at the polymorphic site rs1683564, the method comprising introducing to the cell a composition comprising:

a Cas9 CRISPR nuclease or a sequence encoding said CRISPR nuclease; and a first RNA molecule comprising a guide sequence portion having 17-30 nucleotides, wherein the guide sequence portion of the first RNA molecule comprises 17-30 nucleotides which comprise 17-20 contiguous nucleotides set forth in any one of SEQ ID NOs: 335-354; and wherein a complex of the CRISPR nuclease and the first RNA molecule affects a double strand break in the mutant allele of the ELANE gene.

2. The method of claim 1, wherein the CRISPR nuclease is an spCas9 nuclease and wherein the complex of the CRISPR nuclease and the first RNA molecule affects a double strand break in the mutant allele of the ELANE gene.

3. The method of claim 1, further comprising introduction of a second RNA molecule and a Cas9 CRISPR nuclease or a sequence encoding the Cas 9 CRISPR nuclease, wherein the complex of the second RNA molecule and the CRISPR nuclease affects a second double strand break in the ELANE gene, and wherein the second RNA molecule comprises a guide sequence portion having 17-30 nucleotides guide sequence which comprise 17-20 contiguous nucleotides set forth in SEQ ID NO: 428.

4. The method of claim 1, comprising obtaining the cell with an ELANE gene mutation associated with SCN or CyN from a subject with an ELANE gene mutation related to SCN or CyN and/or suffering from SCN or CyN.

5. The method of claim 4, comprising obtaining the cell from the subject by mobilization and/or by apheresis or by bone marrow aspiration.

6. The method of claim 4, wherein the cell is exposed ex vivo to one or more human cytokines prior to introducing the composition to the cell.

7. The method of claim 4, wherein the cell is culture expanded to obtain cells, and wherein the cells are cultured with one or more of: stem cell factor (SCF), interleukin-3 ("IL-3"), and granulocyte-macrophage colony-stimulating factor ("GM-CSF");

wherein the cells are cultured with at least one cytokine; and/or wherein the at least one cytokine is a recombinant human cytokine.

* * * * *